United States Patent
Ishii et al.

(10) Patent No.: US 12,436,448 B2
(45) Date of Patent: Oct. 7, 2025

(54) VIBRATION DEVICE AND VIBRATION CONTROL METHOD

(71) Applicant: Murata Manufacturing Co., Ltd., Nagaokakyo (JP)

(72) Inventors: Yuuki Ishii, Nagaokakyo (JP); Kenji Nishiyama, Nagaokakyo (JP); Noritaka Kishi, Nagaokakyo (JP); Takaaki Mori, Nagaokakyo (JP); Masaaki Takata, Nagaokakyo (JP); Takahide Nakadoi, Nagaokakyo (JP); Nobumasa Kitamori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 940 days.

(21) Appl. No.: 17/574,609

(22) Filed: Jan. 13, 2022

(65) Prior Publication Data

US 2023/0004072 A1 Jan. 5, 2023

Related U.S. Application Data

(63) Continuation of application No. PCT/JP2021/002476, filed on Jan. 25, 2021.

(30) Foreign Application Priority Data

Mar. 19, 2020 (JP) .................................. 2020-049769
Nov. 4, 2020 (JP) .................................. 2020-184296

(51) Int. Cl.
*B06B 1/06* (2006.01)
*B06B 1/02* (2006.01)
(Continued)

(52) U.S. Cl.
CPC ............ *G03B 17/56* (2013.01); *B06B 1/0207* (2013.01); *B06B 1/0651* (2013.01); *G02B 27/0006* (2013.01); *G03B 2205/0061* (2013.01)

(58) Field of Classification Search
CPC .. B06B 1/0207; B06B 1/0651; G02B 27/0006
See application file for complete search history.

(56) References Cited

U.S. PATENT DOCUMENTS

2011/0073142 A1 3/2011 Hattori et al.
2012/0162500 A1* 6/2012 Yoshida ............... H04N 23/811
348/373
(Continued)

FOREIGN PATENT DOCUMENTS

JP 0532191 U 4/1993
JP 2004162461 A 6/2004
(Continued)

OTHER PUBLICATIONS

English Translation of JP 2013080177, Daigo (Year: 2013).*
(Continued)

*Primary Examiner* — Bryan P Gordon
(74) *Attorney, Agent, or Firm* — Keating & Bennett, LLP

(57) ABSTRACT

A vibration device includes a light-transmissive body, and a vibrator to vibrate the light-transmissive body at a vibration acceleration of equal to or more than about $1.5 \times 10^5$ m/s$^2$ and equal to or less than about $8.0 \times 10^5$ m/s$^2$.

19 Claims, 34 Drawing Sheets

(51) Int. Cl.
    *G02B 27/00*     (2006.01)
    *G03B 17/56*     (2021.01)

(56) References Cited

U.S. PATENT DOCUMENTS

| | | | |
|---|---|---|---|
| 2019/0151897 A1 | 5/2019 | Fujimoto et al. | |
| 2020/0057301 A1* | 2/2020 | Kuratani | G03B 17/08 |
| 2020/0379320 A1* | 12/2020 | Fujimoto | H04N 23/00 |
| 2021/0154702 A1* | 5/2021 | Fujimoto | G03B 17/08 |

FOREIGN PATENT DOCUMENTS

| | | | |
|---|---|---|---|
| JP | 2007082062 A | 3/2007 | |
| JP | 2011244417 A | 12/2011 | |
| JP | 2012150234 A | 8/2012 | |
| JP | 2013080177 A | 5/2013 | |
| JP | 2017085276 A | 5/2017 | |
| WO | 2018100796 A1 | 6/2018 | |
| WO | 2018198465 A1 | 11/2018 | |
| WO | 2020003573 A1 | 1/2020 | |

OTHER PUBLICATIONS

English Translation of JP 2012150234, Kawai (Year: 2012).*
International Search Report in PCT/JP2021/002476, mailed Apr. 13, 2021, 4 pages.
Written Opinion in PCT/JP2021/002476, mailed Apr. 13, 2021, 5 pages.

* cited by examiner

FIG. 17

```
                    START
                      │
        ┌─────────────┴─────────────┐
        │ VIBRATE LIGHT-TRANSMISSIVE BODY BY
        │ VIBRATING PORTION AT PREDETERMINED
        │      VIBRATION ACCELERATION
ST10    │  ┌─────────────────────────┐
        │  │ CONTROL VALUE OF VOLTAGE │ ─── ST11
        │  │  APPLIED TO PIEZOELECTRIC│
        │  │         ELEMENT          │
        │  └─────────────────────────┘
        └─────────────┬─────────────┘
                      │
        ┌─────────────┴─────────────┐
ST20    │   SPRAY GAS ONTO SURFACE OF │
        │     LIGHT-TRANSMISSIVE BODY │
        └─────────────┬─────────────┘
                      │
                    END
```

VIBRATION DEVICE AND VIBRATION CONTROL METHOD

CROSS REFERENCE TO RELATED APPLICATIONS

This application claims the benefit of priority to Japanese Patent Application No. 2020-184296 filed on Nov. 4, 2020 and Japanese Patent Application No. 2020-049769 filed on Mar. 19, 2020, and is a Continuation Application of PCT Application No. PCT/JP2021/002476 filed on Jan. 25, 2021. The entire contents of each application are hereby incorporated herein by reference.

BACKGROUND OF THE INVENTION

1. Field of the Invention

The present invention relates to a vibration device and a vibration control method for removing liquid droplets or the like by vibration.

2. Description of the Related Art

Japanese Unexamined Patent Application Publication No. 2011-244417 discloses an in-vehicle optical sensor cover for removing a substance adhering to a lens. The in-vehicle optical sensor cover described in Japanese Unexamined Patent Application Publication No. 2011-244417 includes an ultrasonic vibration unit that ultrasonically vibrates a lens or a cover glass. The ultrasonic vibration unit ultrasonically vibrates the lens or the cover glass while or after a cleaning operation by a cleaning nozzle is performed.

A device disclosed in Japanese Unexamined Patent Application Publication No. 2011-244417 still has room for improvement in terms of improving liquid droplet removal performance.

SUMMARY OF THE INVENTION

A vibration device according to a preferred embodiment of the present invention includes a light-transmissive body, and a vibrator to vibrate the light-transmissive body at a vibration acceleration of equal to or more than about $1.5 \times 10^5$ m/s$^2$ and equal to or less than about $8.0 \times 10^5$ m/s$^2$.

A vibration control method according to a preferred embodiment of the present invention for a vibration device including a light-transmissive body and a vibrator to vibrate the light-transmissive body includes vibrating, by the vibrator, the light-transmissive body at a vibration acceleration of equal to or more than about $1.5 \times 10^5$ m/s$^2$ and equal to or less than about $8.0 \times 10^5$ m/s$^2$.

According to preferred embodiments of the present invention, it is possible to provide vibration devices and vibration control methods each with improved performance of removing liquid droplets.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 17 is a flowchart of an example of a vibration control method according to Preferred Embodiment 2 of the present invention.

DETAILED DESCRIPTION OF THE PREFERRED EMBODIMENTS

Figure 1:
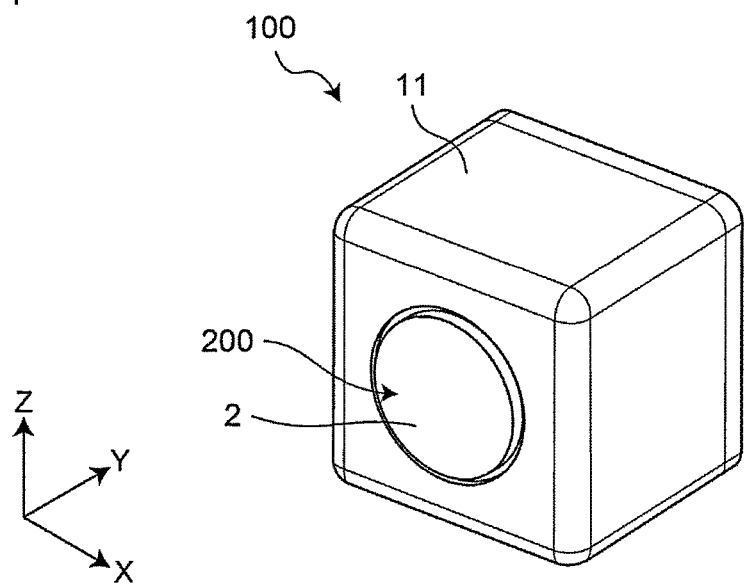
FIG. 1 is a schematic perspective view illustrating an example of an imaging unit including a vibration device according to Preferred Embodiment 1 of the present invention.

The in-vehicle optical sensor cover described in Japanese Unexamined Patent Application Publication No. 2011-244417 includes a vibration mechanism including a piezoelectric element and an electrode that are provided in a housing of a camera cover and vibrate the cover glass by generating an ultrasonic wave or a low frequency wave. In the in-vehicle optical sensor cover described in Japanese Unexamined Patent Application Publication No. 2011-244417, the cover glass is vibrated by the vibration mechanism while or after a cleaning liquid is ejected from an ejection port of the cleaning nozzle toward the glass surface of the cover glass.

However, the in-vehicle optical sensor cover described in Japanese Unexamined Patent Application Publication No. 2011-244417 still has room for improvement from the viewpoint of removing liquid droplets. In the in-vehicle optical sensor cover described in Japanese Unexamined Patent Application Publication No. 2011-244417, when a light-transmissive body, which is a cover glass to which liquid droplets adhere, is vibrated, the liquid droplets may remain in the light-transmissive body due to the vibration, therefore, there is a problem in that it is difficult for the in-vehicle optical sensor cover described in Japanese Unexamined Patent Application Publication No. 2011-244417 to remove liquid droplets adhering to the light-transmissive body.

Further, in the in-vehicle optical sensor cover described in Japanese Unexamined Patent Application Publication No. 2011-244417, it is difficult to remove liquid droplets containing a foreign matter adhering to the light-transmissive body. The liquid droplets containing the foreign matter are, for example, muddy water. Muddy water is more likely to remain in the light-transmissive body than liquid droplets that do not contain the foreign matter, such as rainwater, for example. Therefore, there is a problem in that it is difficult to remove muddy water from the light-transmissive body even when the light-transmissive body is cleaned with the cleaning liquid.

These problems are novel problems discovered by the inventors of preferred embodiments of the present invention.

As a result of intensive studies to solve these problems, the inventors of preferred embodiments of the present invention have discovered that the sliding angle of a liquid droplet adhering to the light-transmissive body changes when the vibration acceleration at which the light-transmissive body is vibrated is changed.

In view of the above, the inventors of preferred embodiments of the present invention have discovered configurations to control the vibration acceleration to vibrate the light-transmissive body, and have developed the following preferred embodiments of the present invention.

A vibration device according to a preferred embodiment of the present invention includes a light-transmissive body, and a vibrator to vibrate the light-transmissive body at a vibration acceleration of, for example, equal to or more than about $1.5 \times 10^5$ m/s$^2$ and equal to or less than about $8.0 \times 10^5$ m/s$^2$.

With such a configuration, it is possible to improve the liquid droplet removal performance.

The vibrator may vibrate the light-transmissive body at a vibration acceleration of, for example, equal to or more than about $3.5 \times 10^5$ m/s$^2$ and equal to or less than about $5.5 \times 10^5$ m/s$^2$.

With such a configuration, it is possible to further improve the liquid droplet removal performance.

The vibration device may further includes a controller to control the vibration acceleration of the vibrator.

With such a configuration, the vibration acceleration can be easily controlled.

The vibrator may include a piezoelectric element, and the controller may control a value of a voltage applied to the piezoelectric element to be equal to or more than about 2 Vp-p and equal to or less than about 15 Vp-p.

With such a configuration, the vibration acceleration can be controlled more easily.

The vibrator may include a vibrating body between the piezoelectric element and the light-transmissive body, the piezoelectric element has an annular or substantially annular plate shape, the vibrating body has a cylindrical or substantially cylindrical shape, and the light-transmissive body may have a circular or substantially circular plate shape or a dome or substantially dome shape, for example.

With such a configuration, it is possible to further improve the liquid droplet removal performance.

The controller may include a first vibration mode in which the light-transmissive body is vibrated at a vibration acceleration of, for example, equal to or more than about $8.1 \times 10^5$ m/s$^2$ and equal to or less than about $1.7 \times 10^6$ m/s$^2$, and a second vibration mode in which the light-transmissive body is vibrated at a vibration acceleration of, for example, equal to or more than about $1.5 \times 10^5$ m/s$^2$ and equal to or less than about $8.0 \times 10^5$ m/s$^2$, and the controller may control the vibrator to execute the second vibration mode after executing the first vibration mode.

With such a configuration, it is possible to further improve the liquid droplet removal performance.

The vibrator may include a piezoelectric element, and the controller may control a value of a voltage applied to the piezoelectric element to be, for example, equal to or more than about 16 Vp-p and equal to or less than about 60 Vp-p in the first vibration mode, and may control a value of a voltage applied to the piezoelectric element to be, for example, equal to or more than about 2 Vp-p and equal to or less than about 15 Vp-p in the second vibration mode.

With such a configuration, the vibration acceleration can be controlled more easily.

The vibration device may further include a displacement detection sensor to detect information related to a displacement amount of the light-transmissive body and transmit the information to the controller, and the controller may control the vibration acceleration of the vibrator based on the information.

With such a configuration, the vibration acceleration of the vibrator can be controlled based on the information related to the displacement amount of the light-transmissive body.

The vibration device may further include a blower to spray gas onto a surface of the light-transmissive body.

With such a configuration, it is possible to further improve the liquid droplet removal performance.

The vibration device may further include a discharge device to discharge liquid onto the surface of the light-transmissive body.

With such a configuration, the liquid can be discharged onto the surface of the light-transmissive body, and the discharged liquid can be removed from the surface of the light-transmissive body.

A water-repellent coating layer may be provided on the surface of the light-transmissive body.

With such a configuration, it is possible to further improve the liquid droplet removal performance.

A vibration control method according to a preferred embodiment of the present invention for a vibration device including a light transmissive body and a vibrator to vibrate the light transmissive body includes vibrating, by the vibrator, the light-transmissive body at a vibration acceleration of, for example, equal to or more than about $1.5 \times 10^5$ m/s$^2$ and equal to or less than about $8.0 \times 10^5$ m/s$^2$.

With such a configuration, it is possible to improve the liquid droplet removal performance.

The vibrating may include vibrating the light-transmissive body at a vibration acceleration of, for example, equal to or more than about $3.5 \times 10^5$ m/s$^2$ and equal to or less than about $5.5 \times 10^5$ m/s$^2$.

With such a configuration, it is possible to further improve the liquid droplet removal performance.

The vibrator may include a piezoelectric element, and the vibrating may include controlling, by a controller, a value of a voltage applied to the piezoelectric element to be, for example, equal to or more than about 2 Vp-p and equal to or less than about 15 Vp-p.

With such a configuration, the vibration acceleration can be easily controlled.

The vibrator may include a piezoelectric element, the vibrating may include vibrating the light-transmissive body in a first vibration mode at a vibration acceleration of, for example, equal to or more than about $8.1 \times 10^5$ m/s$^2$ and equal to or less than about $1.7 \times 10^6$ m/s$^2$, and vibrating the light-transmissive body in a second vibration mode at a vibration acceleration of, for example, equal to or more than about $1.5 \times 10^5$ m/s$^2$ and equal to or less than about $8.0 \times 10^5$ m/s$^2$, and the vibrating of the light-transmissive body in the second vibration mode may be performed after vibrating of the light-transmissive body in the first vibration mode is performed.

With such a configuration, it is possible to further improve the liquid droplet removal performance.

Vibrating of the light-transmissive body in the first vibration mode may include controlling, by the controller, a value of a voltage applied to the piezoelectric element to be, for example, equal to or more than about 16 Vp-p and equal to or less than about 60 Vp-p, and vibrating of the light-transmissive body in the second vibration mode may include controlling, by the controller, a value of a voltage applied to the piezoelectric element to be, for example, equal to or more than about 2 Vp-p and equal to or less than about 15 Vp-p.

With such a configuration, the vibration acceleration can be controlled more easily.

The vibration control method may further include detecting information related to a displacement amount of the light-transmissive body, and vibrating may include controlling, by a controller, the vibration acceleration of the vibrator based on the information.

With such a configuration, the vibration acceleration of the vibrator can be controlled based on the information related to the displacement amount of the light-transmissive body.

The vibration control method may further include spraying gas onto a surface of the light-transmissive body by a blower.

With such a configuration, it is possible to further improve the liquid droplet removal performance.

The vibration control method may further include discharging liquid onto a surface of the light-transmissive body by a discharge device.

With such a configuration, the liquid can be discharged onto the surface of the light-transmissive body, and the discharged liquid can be removed from the surface of the light-transmissive body.

Hereinafter, preferred embodiments of the present invention will be described with reference to the accompanying drawings. The following description is merely exemplary in nature, and is not intended to be limited to scope of the present invention, its applications, or its uses. Further, the drawings are schematic, and ratios of each of dimensions and the like do not necessarily coincide with actual ones.

Preferred Embodiment 1

A vibration device according to Preferred Embodiment 1 of the present invention is applicable to an in-vehicle imaging unit. Therefore, in Preferred Embodiment 1, a vibration device applied to an imaging unit will be described as an example. Note that the vibration device is not limited to use as an in-vehicle imaging unit. For example, the vibration device can be applied to a monitoring camera for security, an imaging unit for a drone, and the like.

Imaging Unit

Figure 2:
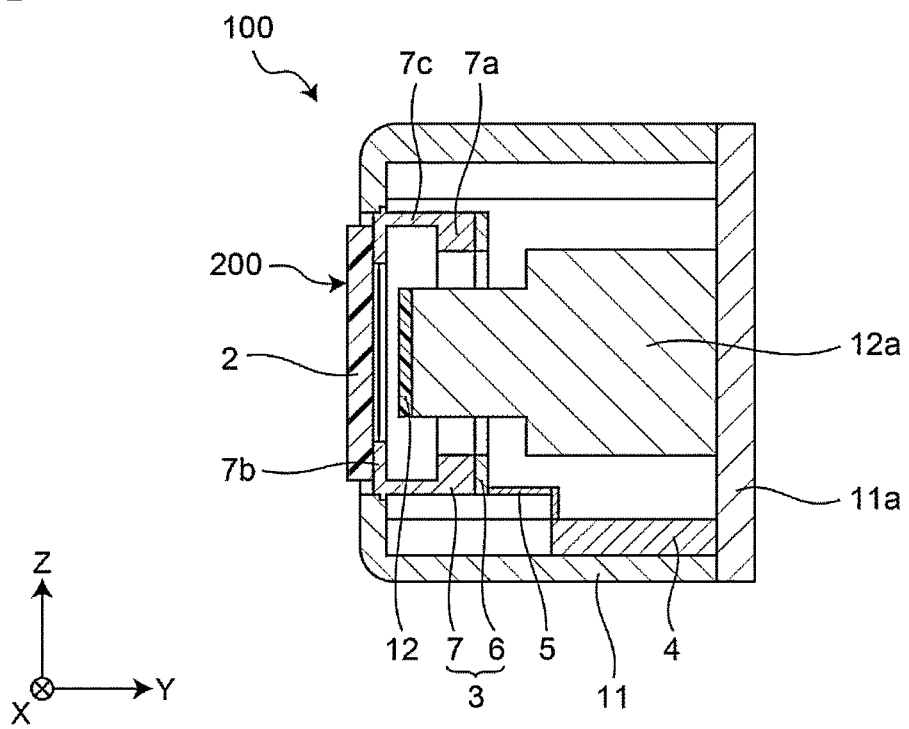
FIG. 2 is a schematic cross-sectional view of the imaging unit of FIG. 1.

FIG. 1 is a schematic perspective view illustrating an example of an imaging unit 100 including a vibration device 200 according to Preferred Embodiment 1 of the present invention. FIG. 2 is a schematic cross-sectional view of the imaging unit 100 of FIG. 1. Note that X, Y, and Z directions in FIG. 1 and FIG. 2 respectively indicate a longitudinal direction, a lateral direction, and a height direction of the imaging unit 100.

As illustrated in FIG. 1 and FIG. 2, the imaging unit 100 includes a housing 11, an imaging portion 12, and the vibration device 200.

The housing 11 houses the vibration device 200 and the imaging portion 12. For example, the housing 11 has a tubular shape and is made of metal, synthetic resin, or the like. In Preferred Embodiment 1, as illustrated in FIG. 1, the housing 11 has a rectangular or substantially rectangular tube shape, but may have another shape, such as a cylindrical or substantially cylindrical shape, for example. A base plate 11a is fixed to one end portion side of the housing 11, and a light-transmissive body 2 of the vibration device 200 is provided on the other end portion side so as to be exposed to the outside.

As illustrated in FIG. 2, the imaging portion 12 is supported by a main body member 12a and fixed to the base plate 11a fixed to the housing 11. Further, a circuit (not illustrated) including an imaging element is built in the imaging portion 12. Examples of the imaging element include a CMOS, a CCD, a bolometer, and a thermopile that receive light having any wavelength in a visible region to a far-infrared region. In addition, a lens unit including a plurality of lenses (not illustrated) may be fixed in an imaging direction of the imaging portion 12. Note that the structure of the imaging portion 12 is not particularly limited as long as an imaging target located in front of the lens can be captured.

The vibration device 200 is attached to the housing 11 such that the light-transmissive body 2 is exposed. The vibration device 200 is disposed along an optical path of the imaging portion 12. In Preferred Embodiment 1, in the vibration device 200, the surface of the light-transmissive body 2 extends along the height direction (Z direction) of the imaging unit 100.

Vibration Device

Next, the vibration device 200 will be described in detail.

Figure 3:
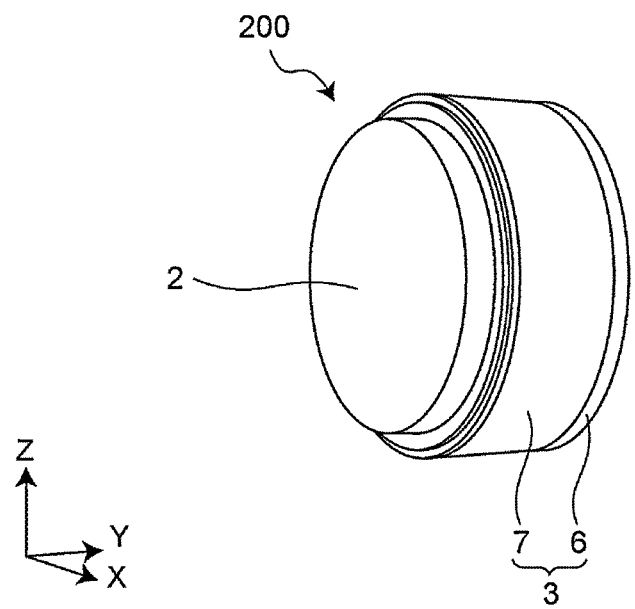
FIG. 3 is a schematic perspective view of an example of the vibration device according to Preferred Embodiment 1 of the present invention.
Figure 4:
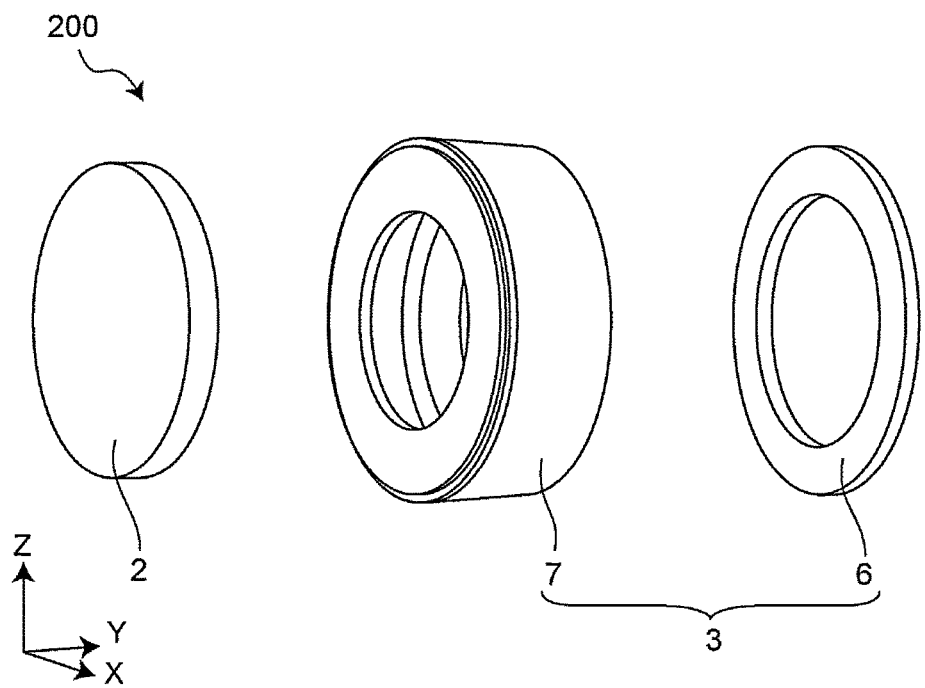
FIG. 4 is an exploded perspective view of the vibration device of FIG. 3.
Figure 5:
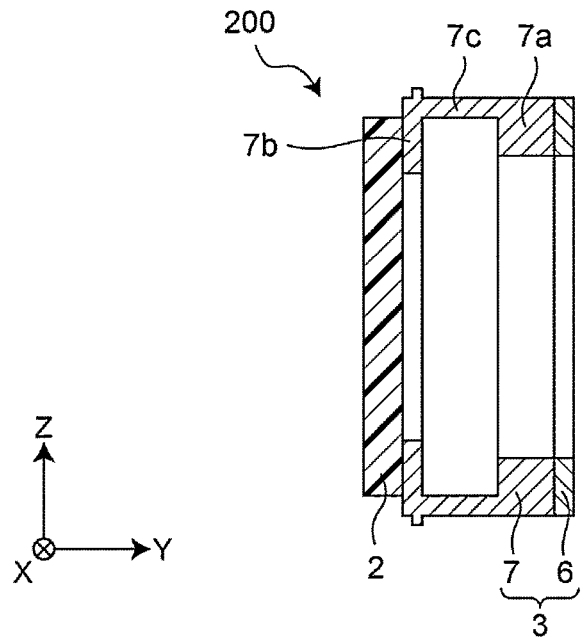
FIG. 5 is a schematic cross-sectional view of the vibration device of FIG. 3.
Figure 6:
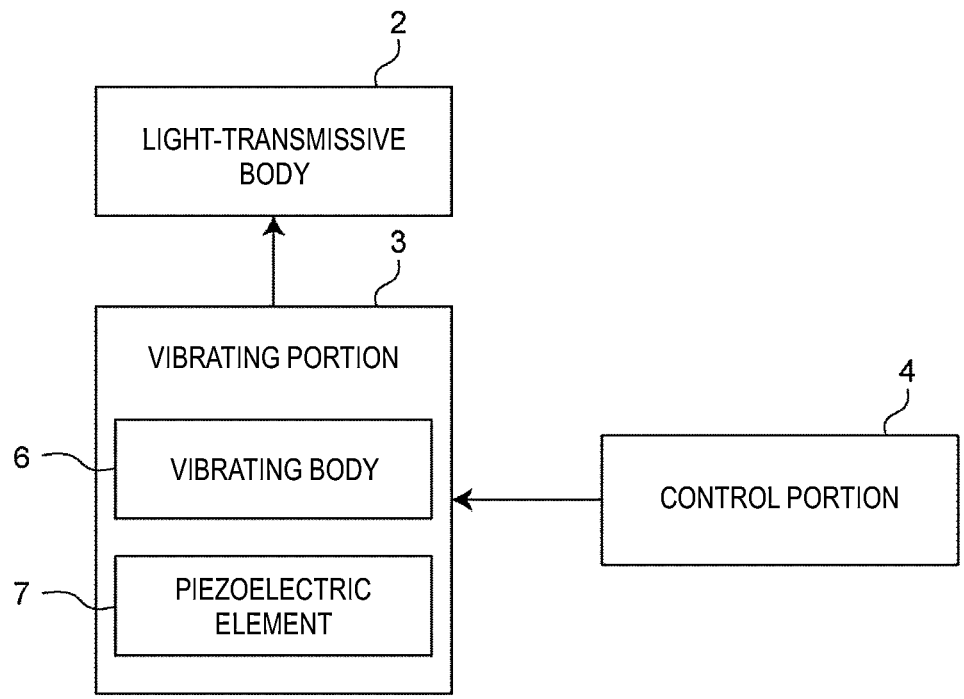
FIG. 6 is a block diagram of an example of the vibration device according to Preferred Embodiment 1 of the present invention.

FIG. 3 is a schematic perspective view of an example of the vibration device 200 according to Preferred Embodiment 1 of the present invention. FIG. 4 is an exploded perspective view of the vibration device 200 of FIG. 3. FIG. 5 is a schematic cross-sectional view of the vibration device 200 of FIG. 3. FIG. 6 is a block diagram of an example of the vibration device 200 according to Preferred Embodiment 1 of the present invention. Note that the X, Y, and Z directions in the drawings respectively indicate a lateral direction, a thickness direction, and a longitudinal direction of the vibration device 200.

As illustrated in FIG. 1 to FIG. 6, the vibration device 200 includes the light-transmissive body 2, a vibrator 3, a controller 4, and a power supply conductor 5. In the vibration device 200, the controller 4 and the power supply conductor 5 are not necessary configurations.

Light-Transmissive Body

The light-transmissive body 2 has a light-transmissive property of transmitting an energy line or light having a wavelength detected by an optical detection element such as an imaging element included in the imaging portion 12. In Preferred Embodiment 1, the light-transmissive body 2 is a cover that protects the imaging portion 12 from adhesion of a foreign matter. The imaging portion 12 is inside the light-transmissive body 2, and imaging of an imaging target outside the imaging unit 100 is performed through the light-transmissive body 2.

As a material for the light-transmissive body 2, for example, light-transmissive plastic, quartz, glass such as borosilicate, light-transmissive ceramic, or synthetic resin can be used. By forming the light-transmissive body 2 of, for example, tempered glass, it is possible to increase the strength of the light-transmissive body 2.

The light-transmissive body 2 has a circular or substantially circular plate shape. Specifically, the light-transmissive body 2 has a circular or substantially circular shape when viewed from the thickness direction (Y direction) of the vibration device 200. Note that the shape of the light-transmissive body 2 is not limited thereto. For example, when viewed from the thickness direction (Y direction) of the vibration device 200, the light-transmissive body 2 may have a polygonal shape, an elliptical shape, a triangular shape, or the like.

An outer peripheral end portion of the light-transmissive body 2 is bonded to the vibrator 3. The light-transmissive body 2 and the vibrator 3 can be bonded to each other using, for example, an adhesive or a brazing material. Alternatively, for example, thermocompression bonding, anodic bonding, or the like can be used.

In Preferred Embodiment 1, the light-transmissive body 2 has, for example, a circular or substantially circular plate shape with an outer-diameter of about 20 mm and a thickness of about 2 mm. In addition, the light-transmissive body 2 is made of, for example, glass having light-transmissive property.

Vibrator

The vibrator 3 vibrates the light-transmissive body 2. The vibrator 3 vibrates the light-transmissive body 2 in the thickness direction (Y direction) of the vibration device 200. The vibrator 3 is configured to vibrate the light-transmissive body 2 at predetermined vibration acceleration. The predetermined vibration acceleration is preferably, for example, equal to or more than about $1.5 \times 10^5$ m/s$^2$ and equal to or less than about $8.0 \times 10^5$ m/s$^2$. More preferably, the predetermined vibration acceleration is, for example, equal to or more than about $3.5 \times 10^5$ m/s$^2$ and equal to or less than about $5.5 \times 10^5$ m/s$^2$.

The vibrator 3 has a cylindrical shape. In Preferred Embodiment 1, the vibrator 3 has, for example, a cylindrical shape with an inner-diameter of about 16 mm, an outer-diameter of about 20 mm, and a height of about 11 mm. Note that the vibrator 3 may have a cylindrical or substantially cylindrical shape, for example, with the inner-diameter of equal to or more than about 16 mm and equal to or less than about 36 mm, the outer-diameter of equal to or more than about 22 mm and equal to or less than about 40 mm, and the height of equal to or more than about 9 mm and equal to or less than about 40 mm.

The vibrator 3 includes a piezoelectric element 6 and a vibrating body 7.

The piezoelectric element 6 vibrates the light-transmissive body 2 via the vibrating body 7. In addition, the piezoelectric element 6 is connected to the power supply conductor 5. The piezoelectric element 6 vibrates by being supplied with power from the power supply conductor 5. That is, the piezoelectric element 6 vibrates due to a voltage being applied from the power supply conductor 5.

For example, the piezoelectric element 6 has an annular plate shape. The annular plate shape is a shape in which a plate-shaped member has an annular shape or a substantially annular shape.

The piezoelectric element 6 includes a piezoelectric body and an electrode connected to the power supply conductor 5. As a material for the piezoelectric body, for example, appropriate piezoelectric ceramics such as barium titanate ($BaTiO_3$), lead titanate zirconate (PZT: $PbTiO_3$, $PbZrO_3$), lead titanate ($PbTiO_3$), lead metaniobate ($PbNb_2O_6$), bismuth titanate ($Bi_4Ti_3O_{12}$), (K, Na) $NbO_3$ and the like, or appropriate piezoelectric single crystals such as $LiTaO_3$, $LiNbO_3$ and the like can be used. The electrode may be, for example, a Ni electrode. The electrode may be, for example, an electrode formed by a sputtering method, and being made of a metal thin film such as Ag, Au or the like. Alternatively, the electrode can be formed by, for example, plating or vapor deposition in addition to sputtering.

In Preferred Embodiment 1, the piezoelectric element 6 has, for example, an annular or substantially annular plate shape with an outer-diameter of about 22 mm, an inner-diameter of about mm, and a thickness of about 1 mm. In addition, the piezoelectric body of the piezoelectric element 6 is made of, for example, lead zirconate titanate (PZT: Pb (Zr, Ti) $O_3$).

The vibrating body 7 is between the piezoelectric element 6 and the light-transmissive body 2. The vibrating body is bonded to the piezoelectric element 6 and the light-transmissive body 2 by, for example, an adhesive. The vibrating body 7 amplifies vibration of the piezoelectric element 6 and transmits the amplified vibration to the light-transmissive body 2.

For example, the vibrating body 7 has a cylindrical or substantially cylindrical shape extending in the thickness direction (Y direction) of the vibration device 200. To be specific, the vibrating body 7 has a circular or substantially circular cylindrical body 7a and an annular or substantially annular plate-shaped portion 7b provided at an end portion on a side connected to the light-transmissive body 2.

The cylindrical body 7a includes a thin portion 7c having a smaller thickness. The thin portion 7c is provided in the cylindrical body 7a between an end portion to which the light-transmissive body 2 is connected and an end portion to which the piezoelectric element 6 is connected. Thus, vibration caused by the piezoelectric element 6 can be efficiently transmitted to the light-transmissive body 2.

The annular or substantially annular plate-shaped portion 7b is a plate-shaped member extending toward the center of the cylindrical body 7a. The light-transmissive body 2 is bonded to the annular or substantially annular or substantially annular plate-shaped portion 7b. For example, the thickness of the annular or substantially annular plate-shaped portion 7b is smaller than the thickness of the cylindrical body 7a and is the same or substantially the same as that of the thin portion 7c.

For example, the vibrating body 7 is made of metal. As the metal for the vibrating body 7, for example, stainless steel, 42 alloy, 50 alloy, invar, super invar, kovar, aluminum, duralumin, or the like can be used. Alternatively, the vibrating body 7 may be made of ceramic such as alumina or zirconia, for example. The vibrating body 7 may be made of a semiconductor such as Si, for example. The vibrating body 7 may be covered with an insulating material.

In Preferred Embodiment 1, the vibrating body 7 has, for example, a cylindrical or substantially cylindrical shape with an inner-diameter of about 16 mm, an outer-diameter of about 22 mm, and a height of about 8 mm. In addition, the vibrating body 7 is made of, for example, stainless steel (SUS303).

Controller

The controller 4 controls vibration acceleration of the vibrator 3. The controller 4 is connected to the piezoelectric element 6 of the vibrator 3 via the power supply conductor 5. The controller 4 includes a power supply circuit and supplies power to the piezoelectric element 6 via the power supply conductor 5. That is, the controller 4 applies a voltage to the piezoelectric element 6 via the power supply conductor 5. Thus, the controller 4 controls the vibration of the vibrator 3.

In Preferred Embodiment 1, the controller 4 controls the value of a voltage applied to the piezoelectric element 6 to be, for example, equal to or more than about 2 Vp-p and equal to or less than about 15 Vp-p. As a result, the controller 4 can control the magnitude of vibration of the vibrator 3 and control the vibration acceleration of the light-transmissive body 2 to be, for example, equal to or more than about $1.5 \times 10^5$ m/s$^2$ and equal to or less than about $8.0 \times 10^5$ m/s$^2$.

Preferably, the controller 4 controls the value of a voltage applied to the piezoelectric element 6 to be, for example, equal to or more than about 5 Vp-p and equal to or less than about 8 Vp-p. As a result, the controller 4 can control the magnitude of vibration of the vibrator 3 and control the vibration acceleration of the light-transmissive body 2 to be, for example, equal to or more than about $3.5 \times 10^5$ m/s$^2$ and equal to or less than about $5.5 \times 10^5$ m/s$^2$.

The controller 4 includes, for example, a central processing unit (CPU) defining and functioning as a control center and the like. In addition, the controller 4 includes a read only memory (ROM) that stores a program, control data, or the like for the CPU to operate, a random access memory (RAM) that defines and functions as a work area of the CPU, an input/output interface for maintaining signal consistency with peripheral devices, and the like.

Power Supply Conductor

The power supply conductor 5 connects the controller 4 and the piezoelectric element 6. The power supply conductor 5 is connected to a power supply circuit included in the controller 4 and supplies power from the power supply circuit to the piezoelectric element 6.

The power supply conductor 5 is made of a material having conductivity. The material of the power supply conductor 5 is, for example, a metal such as stainless steel, beryllium copper, nickel silver, copper or the like.

Relationship Between Sliding Angle and Adhesion Energy

Next, the relationship between the sliding angle and the adhesion energy will be described.

Figure 7:
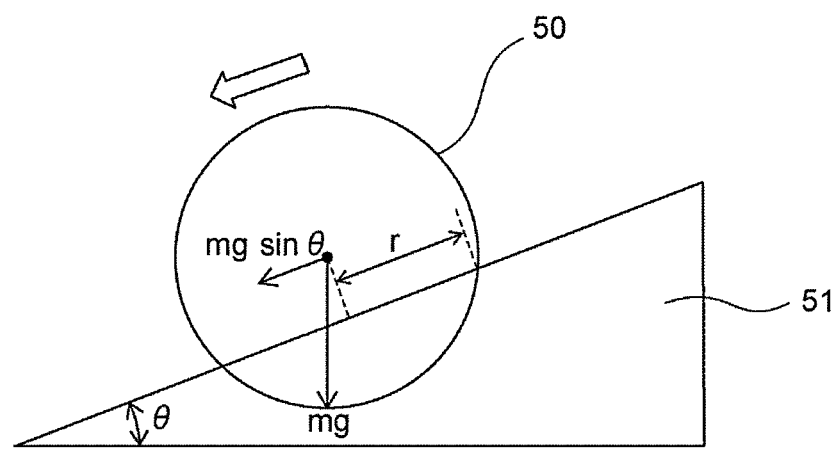
FIG. 7 is a schematic diagram illustrating an example of a relationship between a sliding angle and adhesion energy.

When a liquid droplet is attached to a horizontal solid surface and the solid surface is gradually inclined from a horizontal attitude, the sliding angle is an angle between a horizontal plane and the solid surface at the time of starting of sliding downward of the liquid droplet. FIG. 7 is a schematic diagram illustrating an example of the relationship between the sliding angle and the adhesion energy. The relationship illustrated in FIG. 7 can be expressed by a formula for calculating an adhesion energy proposed by Wolfram.

$$E = \frac{mg\sin\theta}{2\pi r} \qquad \text{Equation 1}$$

E is adhesion energy, r is contact radius, m is droplet mass, g is gravitational acceleration, and θ is sliding angle. In the above equation, a value is experimentally determined from the fact that the sliding angle θ of water and paraffin is proportional to the radius r of the contact surface between a liquid droplet 50 and a solid 51, and it is assumed that the component of the gravity of the liquid droplet 50 in an inclination direction and adhesive force acting on a contact circumferential edge portion are balanced at the sliding angle θ. In addition, this index is an evaluation index that is not experimentally affected by the amount of liquid, the angle of inclination, or the like, and is uniquely determined only by the combination of liquid and solid.

From the above equation, it can be seen that the adhesion energy E decreases as the sliding angle θ decreases. That is, when the sliding angle θ is small, the liquid droplet 50 is less likely to adhere to the solid surface.

In the vibration device 200, the light-transmissive body 2 is vibrated at a predetermined vibration acceleration, such that the sliding angle θ is reduced and the adhesion energy E with which the liquid droplets tend to remain on the surface of the light-transmissive body 2 is reduced. This makes it easy to remove liquid droplets adhering to the light-transmissive body 2.

Relationship Between Sliding Angle and Vibration Acceleration

Figure 8:
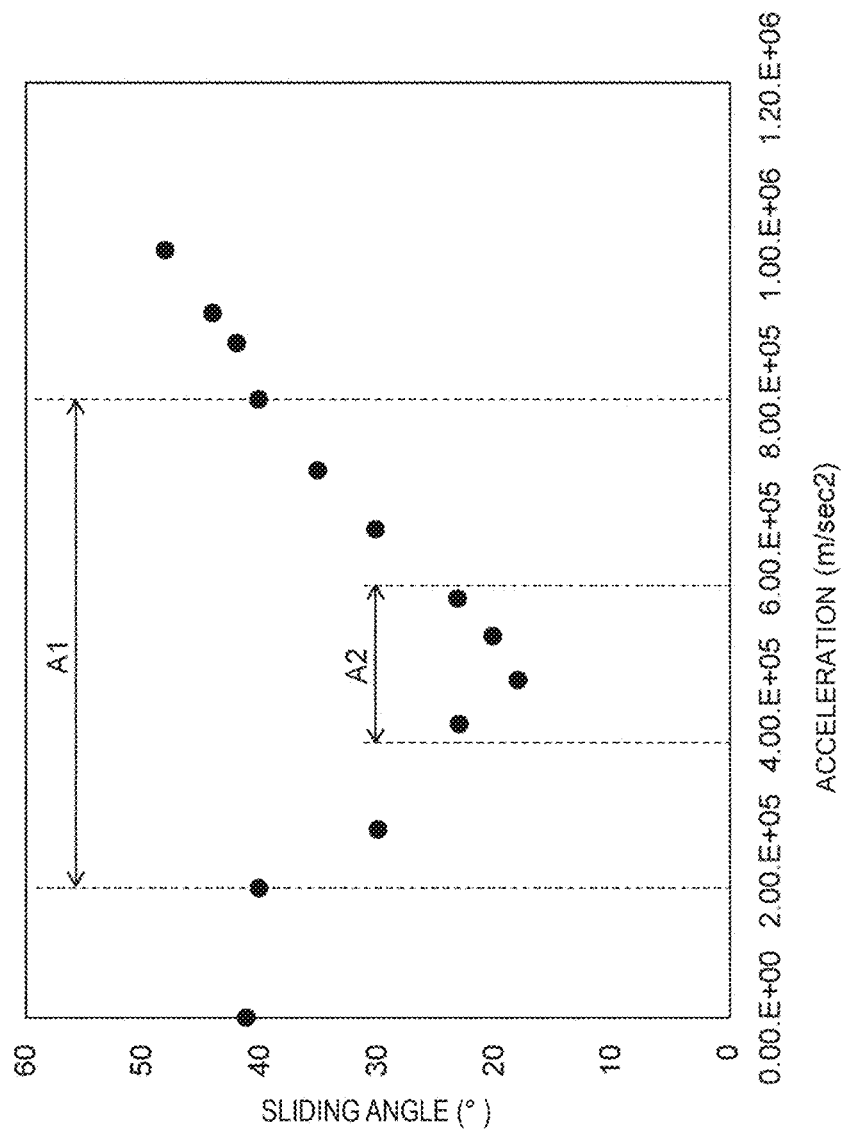
FIG. 8 is a schematic diagram illustrating an example of a relationship between a sliding angle and acceleration.

FIG. 8 is a schematic diagram illustrating an example of the relationship between the sliding angle and the vibration acceleration. FIG. 8 illustrates a change in the sliding angle with respect to a change in the vibration acceleration. Note that the vibration acceleration was calculated by the method described below.

Signals are supplied to the piezoelectric element 6 of the vibrator 3 in the vicinity of the resonant frequency 60 kHz by a power source (Keysight: E26104A) and a function generator (Tektronix Inc.: AGF1022) to excite vibration. The displacement of the light-transmissive body 2 excited by the vibration of the vibrator 3 was detected by a laser displacement meter (Olympus Corporation: BX51M) and measured by a multimeter (Keysight: 2110) and an oscilloscope (Tektro: Oscilloscope TBS1104). The vibration acceleration was calculated by an equation $\alpha=(2\pi f)^2 A$, where α is vibration acceleration, f is frequency, and A is amplitude (displacement amount).

As illustrated in FIG. 8, when the vibration acceleration α is equal to or more than about $1.5\times10^5$ m/s$^2$ and equal to or less than about $8.0\times10^5$ m/s$^2$, the sliding angle θ is equal to or less than about 40 degrees (see "A1" in FIG. 8). When the sliding angle θ is equal to or less than about 40 degrees, the adhesion energy E of the liquid droplet is smaller than the force with which the liquid droplet slides down from the surface of the light-transmissive body 2 to the outside. For this reason, the liquid droplets are less likely to remain in the light-transmissive body 2, and the liquid droplets flow to the outside of the light-transmissive body 2. As a result, the liquid droplet removal performance is improved.

Further, when the vibration acceleration α is equal to or more than about $3.5\times10^5$ m/s$^2$ and equal to or less than about $5.5\times10^5$ m/s$^2$, the sliding angle θ is equal to or less than about 22 degrees (see "A2" in FIG. 8). When the sliding angle θ is equal to or less than about 22 degrees, the adhesion energy E of the liquid droplet is further reduced. For this reason, the liquid droplets easily flow to the outside of the light-transmissive body 2, and the liquid droplet removal performance is further improved.

When the vibration acceleration α is smaller than about $1.5\times10^5$ m/s$^2$ or larger than about $8.0\times10^5$ m/s$^2$, the sliding angle θ is larger than about 40 degrees. When the sliding angle θ is larger than about 40 degrees, the adhesion energy E of the liquid droplet becomes larger than the force of sliding from the surface of the light-transmissive body 2 to the outside. Therefore, the liquid droplets are less likely to slide down than when the vibration acceleration α is equal to or more than about $3.5\times10^5$ m/s$^2$ and equal to or less than about $5.5\times10^5$ m/s$^2$.

Therefore, the vibration acceleration α is preferably equal to or more than about $1.5\times10^5$ m/s$^2$ and equal to or less than about $8.0\times10^5$ m/s$^2$. More preferably, the vibration acceleration α is equal to or more than about $3.5\times10^5$ m/s$^2$ and equal to or less than about $5.5\times10^5$ m/s$^2$. By controlling the vibration acceleration α to be within the predetermined range, the slip-down property of liquid droplets adhering to the surface of the light-transmissive body 2 is improved as compared to the case being within other ranges.

In Preferred Embodiment 1, the controller 4 controls the vibration acceleration α by controlling the value of a voltage applied to the piezoelectric element 6 of the vibrator 3. Specifically, the controller 4 applies a voltage to the piezoelectric element 6 via the power supply conductor 5. The controller 4 controls the peak-to-peak value (Vp-p) of the AC voltage applied to the piezoelectric element 6.

Figure 9:
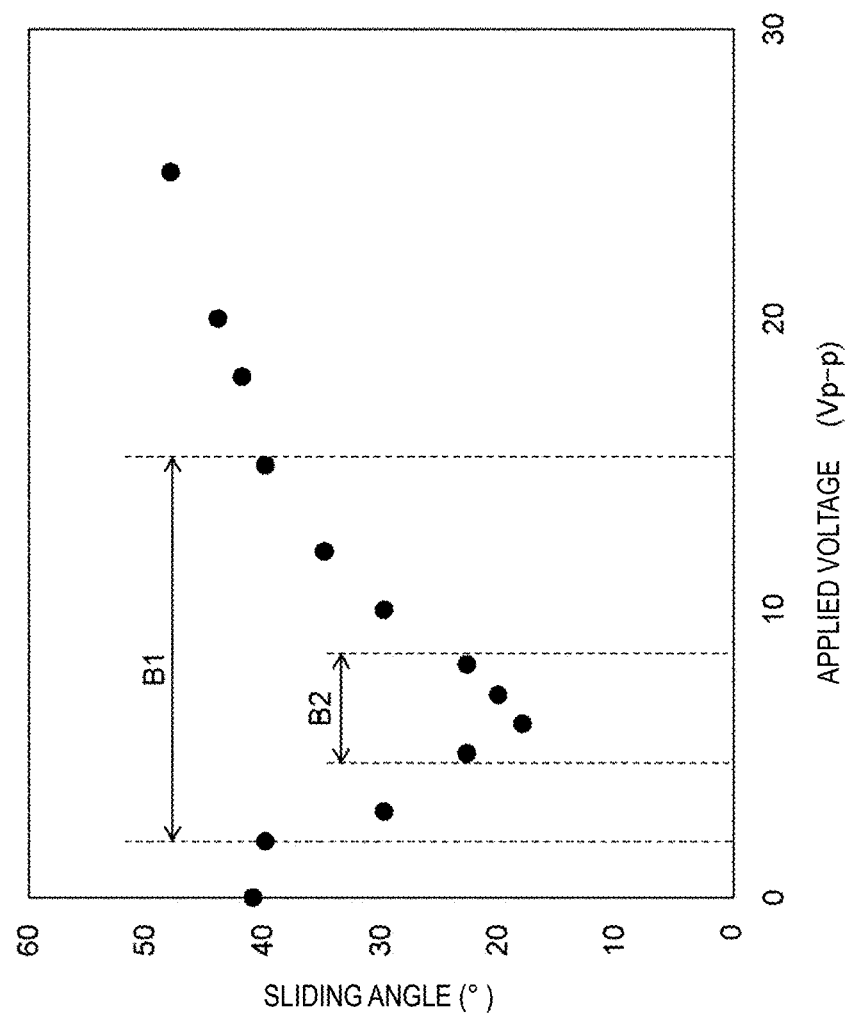
FIG. 9 is a schematic diagram illustrating an example of a relationship between a sliding angle and an applied voltage.

FIG. 9 is a schematic diagram illustrating an example of the relationship between the sliding angle and the applied voltage. As illustrated in FIG. 9, by controlling the voltage applied to the piezoelectric element 6 to be equal to or more than about 2 Vp-p and equal to or less than about 15 Vp-p, the controller 4 can set the vibration acceleration α to be equal to or more than about $1.5\times10^5$ m/s$^2$ and equal to or less than about $8.0\times10^5$ m/s$^2$. This makes it possible to set the sliding angle θ to be equal to or less than about 40 degrees (see "B1" in FIG. 9).

Further, the controller 4 controls the voltage applied to the piezoelectric element 6 to be equal to or more than about 5 Vp-p and equal to or less than about 8 Vp-p, so that the vibration acceleration α can be set to be equal to or more than about $3.5\times10^5$ m/s$^2$ and equal to or less than about $5.5\times10^5$ m/s$^2$. As a result, the sliding angle θ can be set to be equal to or less than about 22 degrees (see "B2" in FIG. 9).

Operation

An example of an operation of the vibration device 200, that is, an example of a vibration control method will be described. Note that the vibration control method is a method of controlling the vibration device 200.

Figure 10:
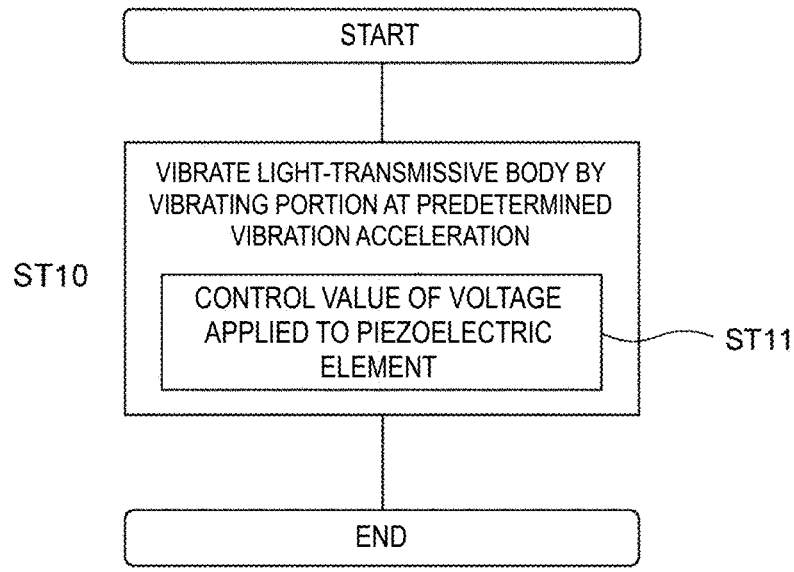
FIG. 10 is a flowchart of an example of a vibration control method according to Preferred Embodiment 1 of the present invention.
Figure 11:
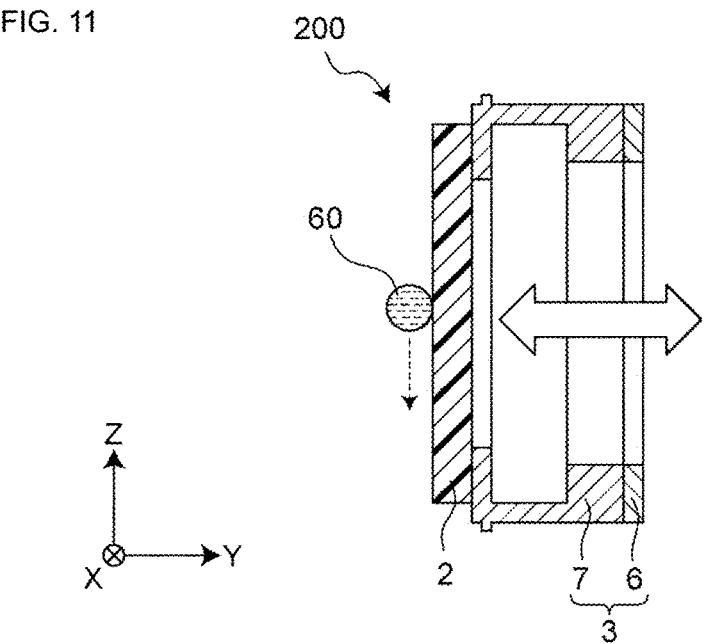
FIG. 11 is a schematic diagram illustrating an example of an operation of the vibration device according to Preferred Embodiment 1 of the present invention.

FIG. 10 is a flowchart illustrating a non-limiting example of the vibration control method according to Preferred Embodiment 1 of the present invention. FIG. 11 is a schematic diagram illustrating an example of an operation of the vibration device 200 according to Preferred Embodiment 1 of the present invention.

As illustrated in FIG. 10, in step ST10, the light-transmissive body 2 is vibrated at predetermined vibration acceleration by the vibrator 3. The predetermined vibration acceleration is preferably equal to or more than about $1.5 \times 10^5$ m/s$^2$ and equal to or less than about $8.0 \times 10^5$ m/s$^2$. More preferably, the predetermined vibration acceleration is equal to or more than about $3.5 \times 10^5$ m/s$^2$ and equal to or less than about $5.5 \times 10^5$ m/s$^2$.

As illustrated in FIG. 11, the light-transmissive body 2 vibrates in the thickness direction (Y direction) of the light-transmissive body 2 at predetermined vibration acceleration. As a result, a liquid droplet 60 adhering to the surface of the light-transmissive body 2 slides down and is removed from the surface of the light-transmissive body 2.

Returning to FIG. 10, in Preferred Embodiment 1, step ST10 includes step ST11 of controlling, by the controller 4, the value of a voltage applied to the piezoelectric element 6 of the vibrator 3.

In step ST11, the controller 4 controls the value of a voltage applied to the piezoelectric element 6 to be equal to or more than about 2 Vp-p and equal to or less than about 15 Vp-p. Preferably, the controller 4 controls the value of the voltage applied to the piezoelectric element 6 to be equal to or more than about 5 Vp-p and equal to or less than about 8 Vp-p.

As described above, in the vibration control method according to Preferred Embodiment 1, steps ST10 and ST11 are performed to vibrate the light-transmissive body 2, and to remove the liquid droplets adhering to the light-transmissive body 2.

Advantageous Effects

According to the vibration device 200 and the vibration control method of Preferred Embodiment 1, the following advantageous effects can be achieved.

The vibration device 200 includes the light-transmissive body 2 and the vibrator 3. The vibrator 3 is configured to vibrate the light-transmissive body at a vibration acceleration of equal to or more than about $1.5 \times 10^5$ m/s$^2$ and equal to or less than about $8.0 \times 10^5$ m/s$^2$. With such a configuration, it is possible to improve the performance of removing liquid droplets adhering to the light-transmissive body 2. Specifically, by reducing the sliding angle of the liquid droplet adhering to the light-transmissive body 2, the adhesion energy of the liquid droplet can be reduced. This makes it easier for liquid droplets to slide off the surface of the light-transmissive body 2, and makes it easier to remove liquid droplets from the surface of the light-transmissive body 2.

The vibrator 3 preferably vibrates the light-transmissive body 2 at a vibration acceleration of equal to or more than about $3.5 \times 10^5$ m/s$^2$ and equal to or less than about $5.5 \times 10^5$ m/s$^2$. With such a configuration, it is possible to further improve the liquid droplet removal performance. Specifically, by making the sliding angle be smaller, the adhesion energy of the liquid droplet can be further reduced. This makes it easier for liquid droplets to slide off the surface of the light-transmissive body 2, and makes it easier to remove liquid droplets from the surface of the light-transmissive body 2.

The vibration device 200 further includes the controller 4 that controls vibration acceleration of the vibrator 3. With such a configuration, the vibration acceleration of the vibrator 3 can be easily controlled.

The vibrator 3 includes the piezoelectric element 6. The controller 4 controls the value of the voltage applied to the piezoelectric element 6 to be equal to or more than about 2 Vp-p and equal to or less than about 15 Vp-p. With such a configuration, it is possible to easily control vibration acceleration to be equal to or more than about $1.5 \times 10^5$ m/s$^2$ and equal to or less than about $8.0 \times 10^5$ m/s$^2$.

The vibrator 3 includes the vibrating body 7 between the piezoelectric element 6 and the light-transmissive body 2. The piezoelectric element 6 has an annular or substantially annular plate shape. The vibrating body 7 has a cylindrical or substantially cylindrical shape. The light-transmissive body 2 has a circular or substantially circular plate shape. With such a configuration, it is possible to further improve the liquid droplet removal performance.

The vibration control method is a vibration control method for the vibration device 200 including the light-transmissive body 2 and the vibrator 3 that vibrates the light-transmissive body, and includes step ST10 of vibrating the light-transmissive body 2 by the vibrator 3 at the vibration acceleration of equal to or more than about $1.5 \times 10^5$ m/s$^2$ and equal to or less than about $8.0 \times 10^5$ m/s$^2$. With such a configuration, it is possible to improve the performance of removing liquid droplets adhering to the light-transmissive body 2. Specifically, by reducing the sliding angle of the liquid droplet adhering to the light-transmissive body 2, the adhesion energy of the liquid droplet is reduced. This makes it easier for liquid droplets to slide off the surface of the light-transmissive body 2, and makes it easier to remove liquid droplets from the surface of the light-transmissive body 2.

Step ST10 of vibrating includes vibrating the light-transmissive body 2 at the vibration acceleration of equal to or more than about $3.5 \times 10^5$ m/s$^2$ and equal to or less than about $5.5 \times 10^5$ m/s$^2$. With such a configuration, the liquid droplet removal performance can be further improved.

The vibrator 3 includes the piezoelectric element 6, and step ST10 of vibrating includes step ST11 of controlling the value of a voltage applied to the piezoelectric element 6 to be equal to or more than about 2 Vp-p and equal to or less than about 15 Vp-p. With such a configuration, it is possible to easily control the vibration acceleration to be equal to or more than about $1.5 \times 10^5$ m/s$^2$ and equal to or less than about $8.0 \times 10^5$ m/s$^2$.

Figure 12:
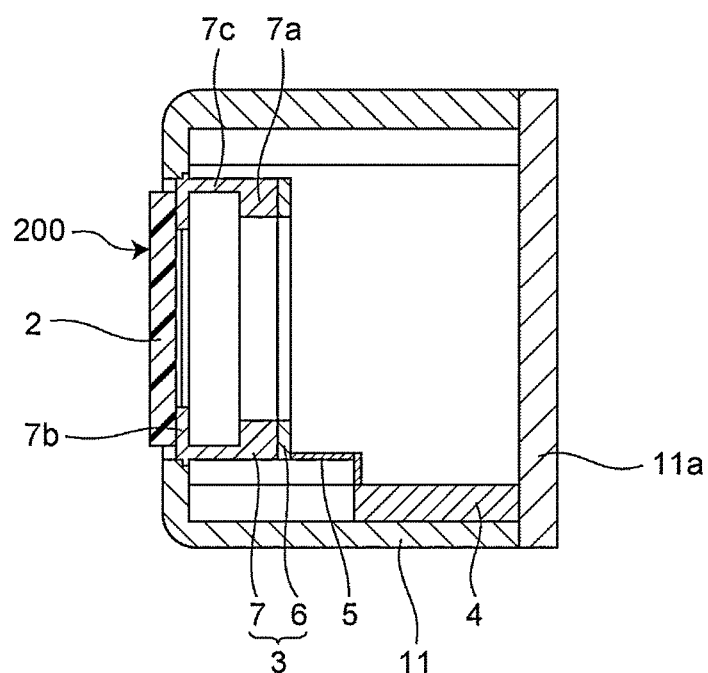
FIG. 12 is a schematic cross-sectional view of an example of the vibration device according to Preferred Embodiment 1 of the present invention.

Although an example of the vibration device 200 applied to the imaging unit 100 has been described in Preferred Embodiment 1, the present invention is not limited thereto. FIG. 12 is a diagram schematically illustrating the vibration device 200 according to Preferred Embodiment 1. As illustrated in FIG. 12, the vibration device 200 may be used alone. Alternatively, the vibration device 200 may be applied to a unit including an optical detection element other than the imaging element.

Although an example in which the light-transmissive body 2 has a circular or substantially circular plate shape has been described in Preferred Embodiment 1, the present invention is not limited thereto. The light-transmissive body 2 may have a plate shape. For example, when viewed from the thickness direction (Y direction) of the vibration device 200, the shape of the light-transmissive body 2 may be a polygon, an ellipse, a triangle, or the like.

Figure 13:
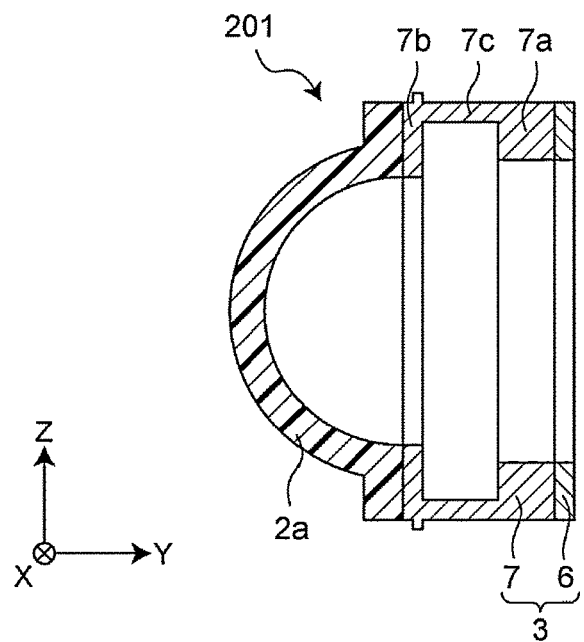
FIG. 13 is a schematic cross-sectional view of a vibration device according to a modification of Preferred Embodiment 1 of the present invention.

FIG. 13 is a schematic cross-sectional view of a vibration device 201 according to a modification of Preferred Embodiment 1 of the present invention. As illustrated in FIG. 13, the vibration device 201 includes a light-transmissive body 2a and the vibrator 3. In the vibration device 201, the light-transmissive body 2 has a dome shape. The dome shape is a shape in which a plate member is formed in a hemispherical shape or substantially hemispherical. Even with such a configuration, an advantageous effect the same as or similar to that of the vibration device 200 is achieved. In addition, in the imaging unit, in the case where the light-transmissive body 2a has a dome shape or substantially dome shape, the field of view of the imaging portion 12 can be widened.

Although an example in which the vibrator 3 includes the vibrating body 7 has been described in Preferred Embodiment 1, the present invention is not limited thereto. The vibrating body 7 is not a necessary element. The vibrator 3 may include an element that vibrates the light-transmissive body 2. For example, the vibrator 3 may include only the piezoelectric element 6.

Although an example in which the vibration device 200 includes the controller 4 has been described in Preferred Embodiment 1, the present invention is not limited thereto. For example, the controller 4 may be included in a device separate from the vibration device 200.

Although an example in which the vibration control method includes steps ST10 and ST11 has been described in Preferred Embodiment 1, the present invention is not limited thereto. For example, steps ST10 and ST11 illustrated in FIG. 10 may be integrated or separate. Alternatively, the flowchart illustrated in FIG. 10 may include additional steps. For example, a step of acquiring trigger information for starting vibration may be added. In this case, step ST10 may start vibration by the vibrator 3 based on the trigger information.

Although an example in which the light-transmissive body 2 is a light-transmissive cover has been described in Preferred Embodiment 1, the present invention is not limited thereto. For example, the light-transmissive body 2 may be a lens.

Preferred Embodiment 2

A vibration device according to Preferred Embodiment 2 of the present invention will be described. Note that in Preferred Embodiment 2, differences from Preferred Embodiment 1 will be mainly described. In Preferred Embodiment 2, configurations that are the same as or equivalent to those of Preferred Embodiment 1 are denoted by the same reference numerals. In addition, in Preferred Embodiment 2, description overlapping with Preferred Embodiment 1 will be omitted.

Figure 14:
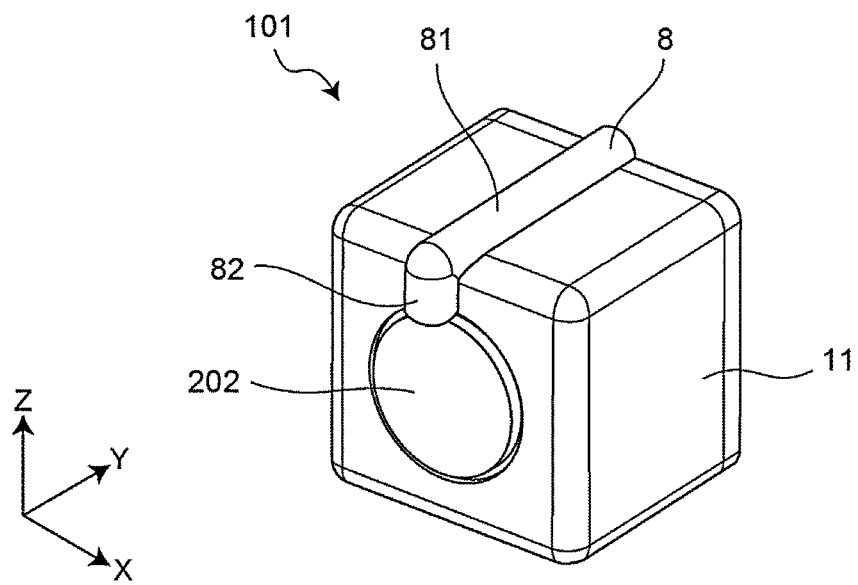
FIG. 14 is a schematic perspective view illustrating an example of an imaging unit including a vibration device according to Preferred Embodiment 2 of the present invention.
Figure 15:
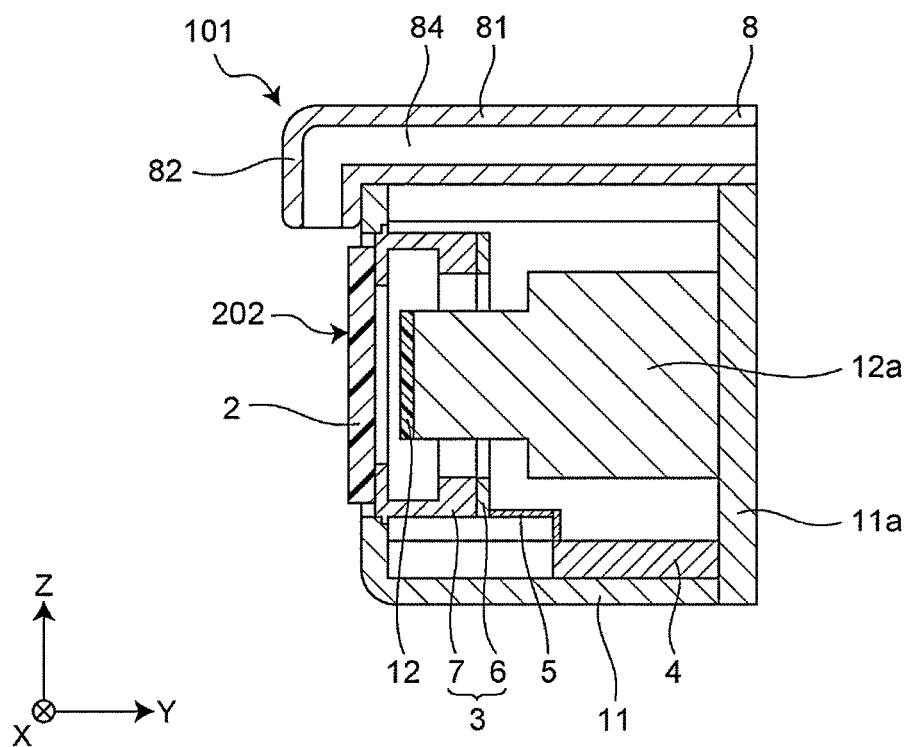
FIG. 15 is a schematic cross-sectional view of the imaging unit of FIG. 14.
Figure 16:
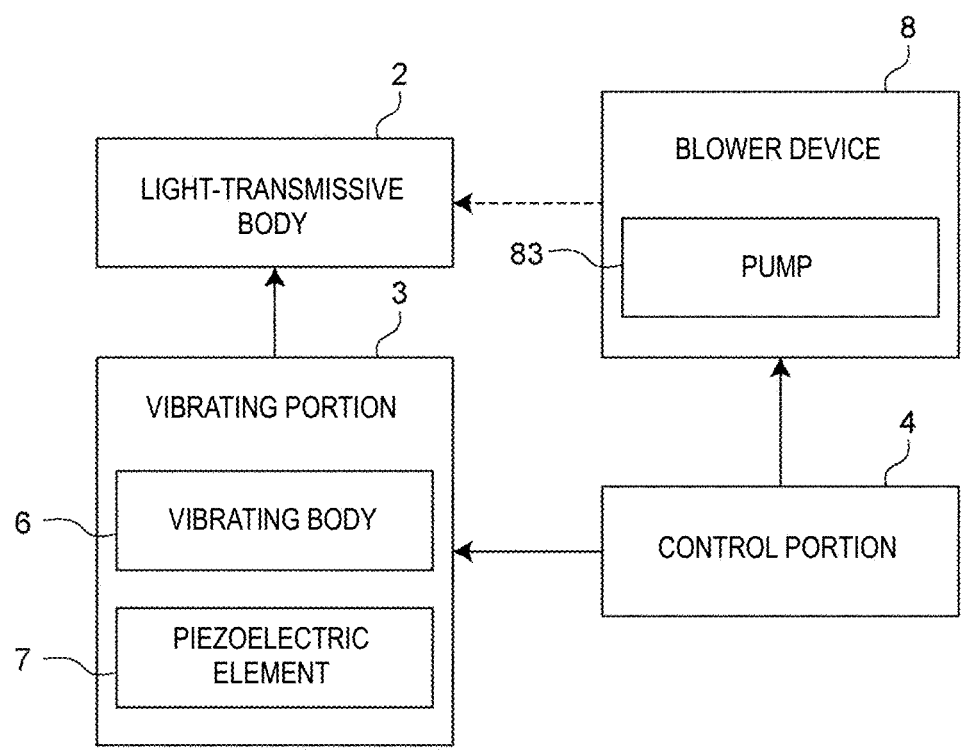
FIG. 16 is a block diagram of an example of the vibration device according to Preferred Embodiment 2 of the present invention.

FIG. 14 is a schematic perspective view illustrating an example of an imaging unit 101 including a vibration device 202 according to Preferred Embodiment 2 of the present invention. FIG. 15 is a schematic cross-sectional view of the imaging unit 101 of FIG. 14. FIG. 16 is a block diagram of an example of the vibration device 202 according to Preferred Embodiment 2 of the present invention.

Preferred Embodiment 2 is different from Preferred Embodiment 1 in that a blower 8 is provided.

As illustrated in FIG. 14 to FIG. 16, the vibration device 202 includes the blower 8 in addition to the configuration of the vibration device 200 according to Preferred Embodiment 1.

Blower

The blower 8 sprays gas onto the surface of the light-transmissive body 2. The blower 8 is arranged on an upper surface of the housing 11. The blower 8 includes a pipe 81, a blower head 82 provided at a tip of the pipe 81, and a pump 83 that supplies gas to the pipe 81. A flow path 84 through which the gas flows is provided inside the pipe 81 and the blower head 82.

For example, the gas ejected from the blower 8 is air.

The pipe 81 is disposed on the upper surface of the housing 11 and extends toward the light-transmissive body 2. In Preferred Embodiment 2, the pipe 81 extends in a thickness direction (Y direction) of the vibration device 202. The pipe 81 is connected to the pump 83.

The blower head 82 is provided at the tip of the pipe 81 and defines the direction in which the gas is ejected. The blower head 82 is provided toward the light-transmissive body 2. In Preferred Embodiment 2, the blower head 82 is oriented in a longitudinal direction (Z direction) of the vibration device 202. For example, the blower head 82 may be oriented in a direction in which gravity acts.

The pump 83 is connected to the pipe 81 and supplies gas to the flow path 84 provided inside the pipe 81 and the blower head 82.

In Preferred Embodiment 2, the blower 8 is controlled by the controller 4. Specifically, the controller 4 controls the ejection of gas from the blower head 82 by controlling the pump 83.

Operation

An example of an operation of the vibration device 202, that is, a non-limiting example of a vibration control method will be described. Note that the vibration control method is a method of controlling the vibration device 202.

Figure 18:
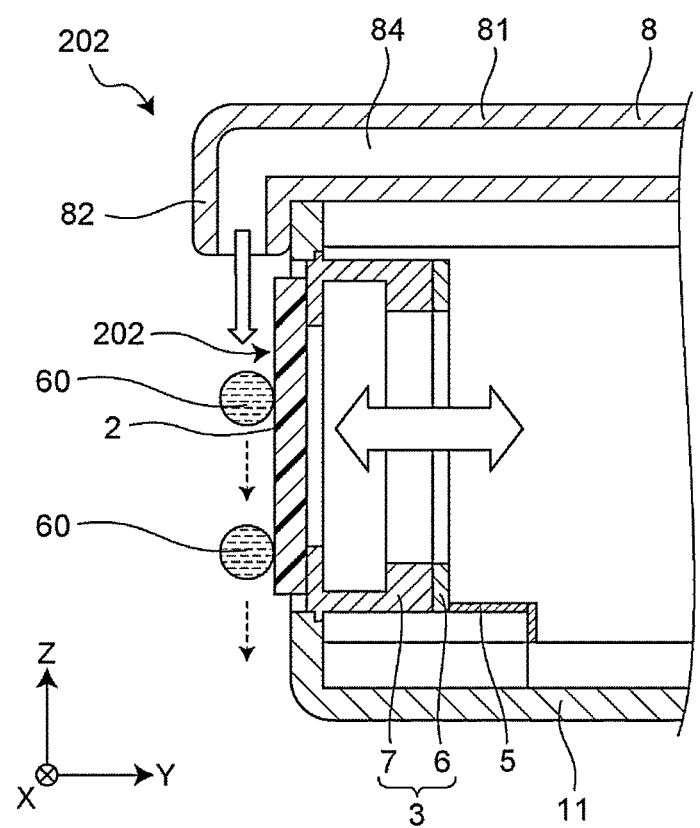
FIG. 18 is a schematic diagram illustrating an example of an operation of the vibration device according to Preferred Embodiment 2 of the present invention.

FIG. 17 is a flowchart of an example of a vibration control method according to Preferred Embodiment 2 of the present invention. Since steps ST10 and ST11 illustrated in FIG. 17 are the same or substantially the same as steps ST10 and ST11 illustrated in FIG. 10 of Preferred Embodiment 1, detailed description thereof will be omitted. FIG. 18 is a schematic diagram illustrating an example of the operation of the vibration device 202 according to Preferred Embodiment 2 of the present invention.

As illustrated in FIG. 17, in step ST20, gas is sprayed onto the surface of the light-transmissive body 2 by the blower 8. To be specific, in step ST20, the controller 4 supplies gas to the pipe 81 by controlling the pump 83. The gas supplied from the pump 83 passes through the flow path 84 provided inside the pipe 81 and is ejected from the blower head 82. The blower head 82 is directed towards the surface of the light-transmissive body 2. Therefore, the gas is ejected from the blower head 82 towards the surface of the light-transmissive body 2. The air pressure of the gas ejected from the blower head 82 promotes sliding of the liquid droplets adhering to the surface of the light-transmissive body 2.

As illustrated in FIG. 18, when gas is sprayed onto the surface of the light-transmissive body 2 by the blower 8, the liquid droplet 60 adhering to the surface of the light-transmissive body 2 easily slides down. Specifically, since the sliding angle θ of the liquid droplet 60 is reduced due to the vibration of the vibrator 3, the liquid droplet 60 easily slides down by the flow of the gas. Thus, the liquid droplet 60 can be more easily removed from the surface of the light-transmissive body 2.

Advantageous Effects

According to the vibration device 202 and the vibration control method of Preferred Embodiment 2, the following advantageous effects can be achieved.

The vibration device 202 includes the blower 8 that sprays gas onto the surface of the light-transmissive body 2. With such a configuration, the liquid droplets adhering to the surface of the light-transmissive body 2 can be easily removed by the gas ejected from the blower 8. Specifically, the sliding angle θ of the liquid droplet 60 adhering to the surface of the light-transmissive body 2 is reduced by the vibration of the vibrator 3, and the liquid droplet 60 easily slides down. In this state, by spraying gas onto the surface of the light-transmissive body 2, liquid droplets easily slide off from the surface of the light-transmissive body 2. As a result, the liquid droplet removal performance can be further improved.

According to the vibration device 202, it is possible to remove liquid droplets adhering to the surface of the light-transmissive body 2 in a shorter time by the vibration of the vibrator 3 and the ejection of gas by the blower 8.

In addition, according to a vibration device 203, since the liquid droplets easily slide down by the vibration of the vibrator 3, it is possible to reduce the output of the pump 83, and it is possible to achieve low cost and low power consumption.

The vibration control method according to Preferred Embodiment 2 includes step ST20 of spraying gas onto the surface of the light-transmissive body 2. With such a configuration, the liquid droplets adhering to the surface of the light-transmissive body 2 can be easily removed by the gas ejected from the blower 8.

Note that in Preferred Embodiment 2, an example in which the pipe 81 of the blower 8 is provided on the upper surface of the housing 11 has been described, but the present invention is not limited thereto. The pipe 81 of the blower 8 may be provided inside the housing 11 or may be provided on a side surface or a bottom surface of the housing 11.

Although an example in which the blower 8 includes the pump 83 has been described in Preferred Embodiment 2, the present invention is not limited thereto. The blower 8 may include a device that can be controlled by the controller 4 and can supply gas.

In Preferred Embodiment 2, an example in which the blower head 82 is oriented in the longitudinal direction (Z direction) of the vibration device 202 has been described, but the present invention is not limited thereto. The blower head 82 may be oriented in a direction in which gas can be sprayed onto the surface of the light-transmissive body 2. For example, the blower head 82 may be disposed obliquely with respect to the surface of the light-transmissive body 2.

Although an example in which the vibration control method includes steps ST10, ST11, and ST20 has been described in Preferred Embodiment 2, the present invention is not limited thereto. For example, steps ST10, ST11, and ST20 illustrated in FIG. 17 may be integrated or separate. Alternatively, the flowchart illustrated in FIG. 17 may include additional steps.

Preferred Embodiment 3

A vibration device according to Preferred Embodiment 3 of the present invention will be described. Note that in Preferred Embodiment 3, differences from Preferred Embodiment 1 will be mainly described. In Preferred Embodiment 3, configurations that are the same as or equivalent to those of Preferred Embodiment 1 are denoted by the same reference numerals. In addition, in Preferred Embodiment 3, description overlapping with Preferred Embodiment 1 will be omitted.

Figure 19:
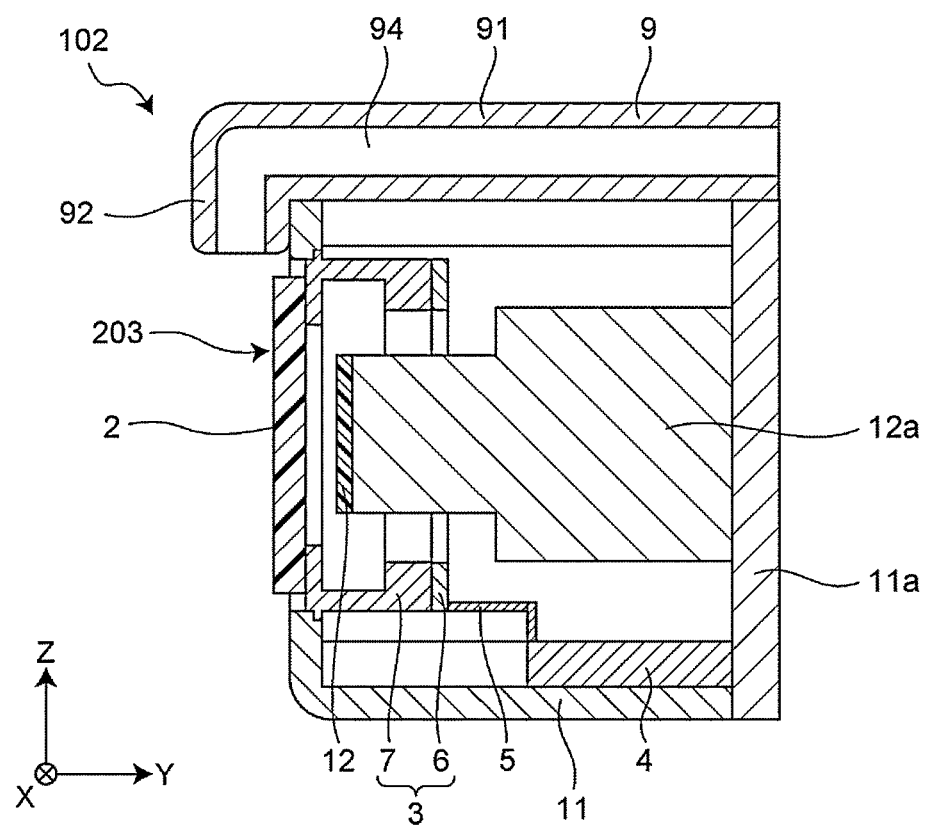
FIG. 19 is a schematic cross-sectional view illustrating an example of an imaging unit including a vibration device according to Preferred Embodiment 3 of the present invention.
Figure 20:
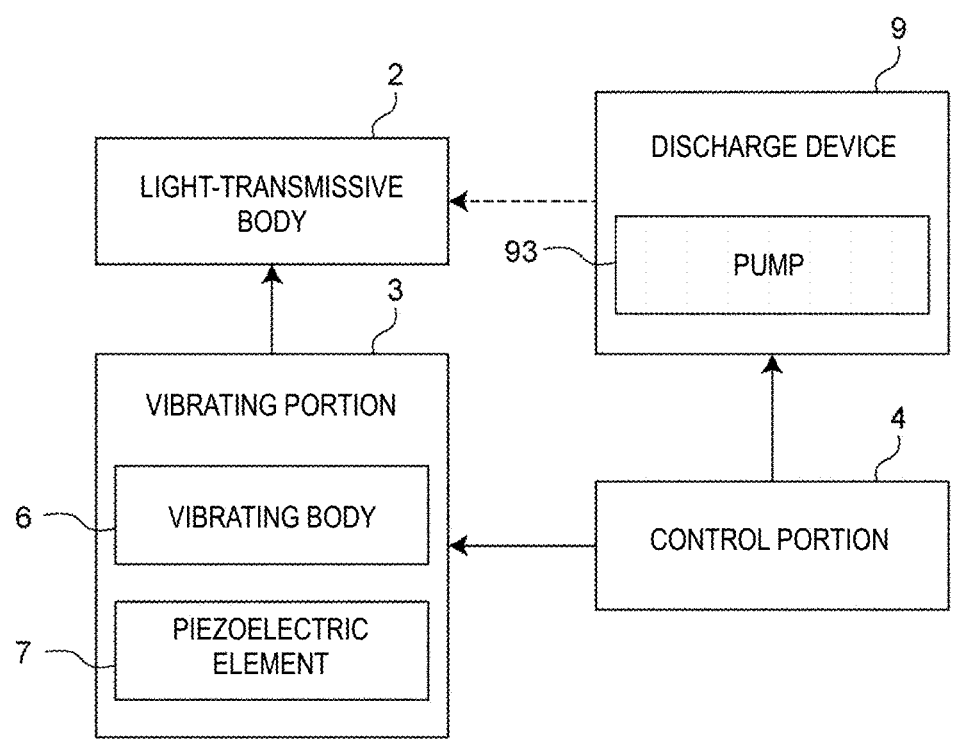
FIG. 20 is a block diagram of an example of the vibration device according to Preferred Embodiment 3 of the present invention.

FIG. 19 is a schematic cross-sectional view illustrating an example of an imaging unit 102 including a vibration device 203 according to Preferred Embodiment 3 of the present invention. FIG. 20 is a block diagram of an example of the vibration device 203 according to Preferred Embodiment 3 of the present invention.

Preferred Embodiment 3 is different from Preferred Embodiment 1 in that a discharge device 9 is provided.

As illustrated in FIG. 19 and FIG. 20, the vibration device 203 includes the discharge device 9 in addition to the configuration of the vibration device 200 according to Preferred Embodiment 1.

Discharge Device

The discharge device 9 discharges liquid onto the surface of the light-transmissive body 2. The discharge device 9 is provided on the upper surface of the housing 11. The discharge device 9 includes a pipe 91, a discharge head 92 provided at a tip of the pipe 91, and a pump 93 that supplies liquid to the pipe 91. A flow path 94 through which the liquid flows is provided inside the pipe 91 and the discharge head 92.

For example, the liquid discharged from the discharge device 9 is a cleaning liquid.

The pipe 91 is provided on the upper surface of the housing 11 and extends toward the light-transmissive body 2. In Preferred Embodiment 3, the pipe 91 extends in a thickness direction (Y direction) of the vibration device 203. The pipe 91 is connected to the pump 93.

The discharge head 92 is provided at the tip of the pipe 91 and defines the direction of the liquid to be discharged. The discharge head 92 is provided toward the light-transmissive body 2. In Preferred Embodiment 3, the discharge head 92 is oriented in a longitudinal direction (Z direction) of the vibration device 203. For example, the discharge head 92 may be oriented in a direction in which gravity acts.

The pump 93 is connected to the pipe 91, and supplies liquid to the flow path 94 provided inside the pipe 91 and the discharge head 92.

In Preferred Embodiment 3, the discharge device 9 is controlled by the controller 4. Specifically, the controller 4 controls the discharge of the liquid from the discharge head 92 by controlling the pump 93.

Operation

An example of an operation of the vibration device 203, that is, a non-limiting example of a vibration control method will be described. Note that the vibration control method is a method of controlling the vibration device 203.

Figure 21:
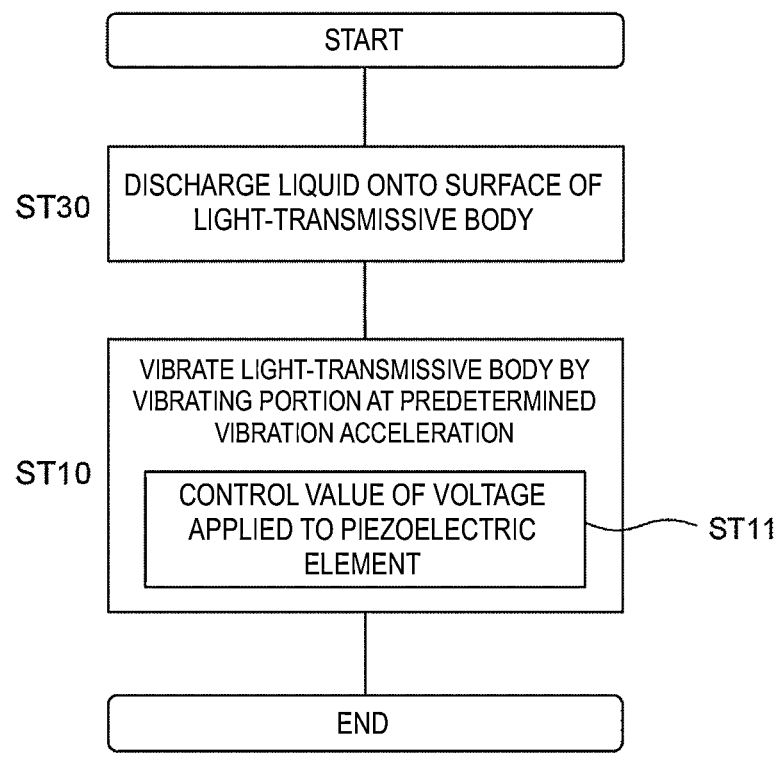
FIG. 21 is a flowchart of an example of a vibration control method according to Preferred Embodiment 3 of the present invention.
Figure 22:
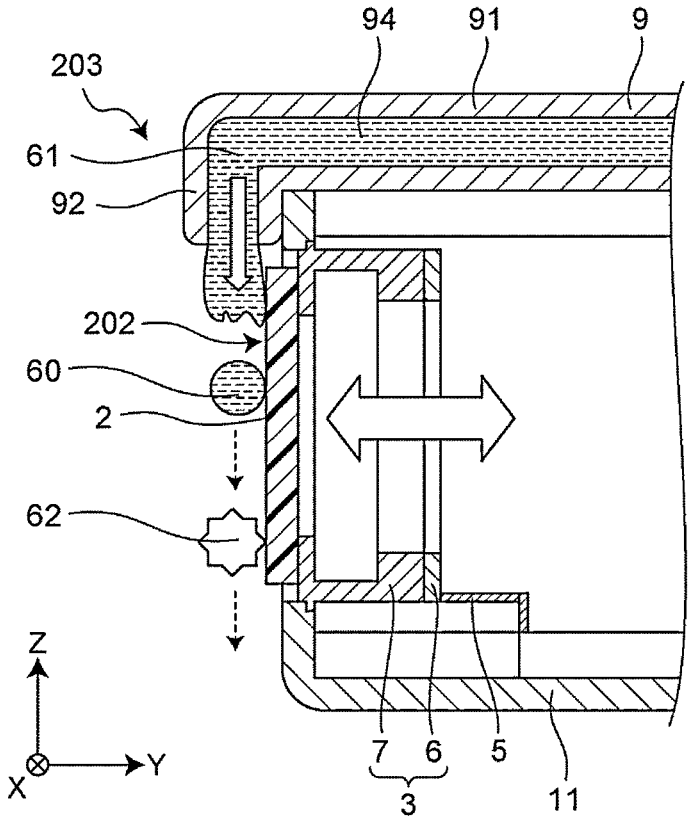
FIG. 22 is a schematic diagram illustrating an example of an operation of the vibration device according to Preferred Embodiment 3 of the present invention.

FIG. 21 is a flowchart of an example of a vibration control method according to Preferred Embodiment 3 of the present invention. Since steps ST10 and ST11 illustrated in FIG. 21 are the same or substantially the same as steps ST10 and ST11 illustrated in FIG. 10 of Preferred Embodiment 1, detailed description thereof will be omitted. FIG. 22 is a schematic diagram illustrating an example of the operation of the vibration device 203 according to Preferred Embodiment 3 of the present invention.

As illustrated in FIG. 21, in step ST30, the liquid is discharged onto the surface of the light-transmissive body 2 by the discharge device 9. To be specific, in step ST30, the controller 4 controls the pump 93, such that the liquid is supplied to the pipe 91. The gas supplied from the pump 93 passes through the flow path 94 provided inside the pipe 91 and is ejected from the discharge head 92. The discharge head 92 is disposed toward the surface of the light-transmissive body 2. Therefore, the liquid is discharged from the discharge head 92 toward the surface of the light-transmissive body 2.

As illustrated in FIG. 22, the discharge device 9 discharges liquid 61 onto the surface of the light-transmissive body 2. In a case where the liquid 61 is a cleaning liquid, a foreign matter 62 such as dirt adhering to the surface of the light-transmissive body 2 is removed by the liquid 61.

After the liquid 61 is discharged onto the surface of the light-transmissive body 2, steps ST10 and ST11 are performed to remove the liquid droplet 60 adhering to the surface of the light-transmissive body 2.

Advantageous Effects

According to the vibration device 203 and the vibration control method of Preferred Embodiment 3, the following advantageous effects can be achieved.

The vibration device 203 includes the discharge device 9 that discharges the liquid 61 onto the surface of the light-transmissive body 2. With such a configuration, the liquid 61 can be discharged onto the surface of the light-transmissive body 2. In addition, after the liquid 61 is discharged onto the surface of the light-transmissive body 2, the liquid droplet 60 adhering to the surface of the light-transmissive body 2 can be removed by the vibration of the vibrator 3.

According to the vibration device 203, since the liquid droplet 60 easily slides down by the vibration of the vibrator 3, it is possible to reduce the output of the pump 93, and it is possible to achieve low cost and low power consumption.

For example, in a case where the liquid 61 discharged from the discharge device 9 is a cleaning liquid, the surface of the light-transmissive body 2 can be cleaned by the liquid 61. Thus, the foreign matter 62 such as dirt adhering to the surface of the light-transmissive body 2 can be removed. After the surface of the light-transmissive body 2 is cleaned with the liquid 61, the liquid droplet 60 can be easily removed from the surface of the light-transmissive body 2 by the vibration of the vibrator 3.

The vibration control method according to Preferred Embodiment 3 includes step ST30 of discharging the liquid 61 onto the surface of the light-transmissive body 2. With such a configuration, the liquid 61 can be discharged onto the surface of the light-transmissive body 2. In addition, after the liquid 61 is discharged onto the surface of the light-transmissive body 2, the liquid droplet 60 adhering to the surface of the light-transmissive body 2 can be removed by the vibration of the vibrator 3.

In Preferred Embodiment 3, an example in which the pipe 91 of the discharge device 9 is provided on the upper surface of the housing 11 has been described, but the present invention is not limited thereto. The pipe 91 of the discharge device 9 may be provided inside the housing 11 or may be provided on a side surface or a bottom surface of the housing 11.

Although an example in which the discharge device 9 includes the pump 93 has been described in Preferred Embodiment 3, the present invention is not limited thereto. The discharge device 9 may include a device that can be controlled by the controller 4 and can supply liquid.

In Preferred Embodiment 3, an example in which the discharge head 92 is oriented in the longitudinal direction (Z direction) of the vibration device 203 has been described, but the present invention is not limited thereto. The discharge head 92 may be oriented in a direction in which the liquid 61 can be discharged onto the surface of the light-transmissive body 2. For example, the discharge head 92 may be disposed obliquely with respect to the surface of the light-transmissive body 2.

Although an example in which the liquid 61 discharged from the discharge device 9 is the cleaning liquid has been described in Preferred Embodiment 3, the present invention is not limited thereto. For example, the liquid 61 discharged from the discharge device 9 may be a coating material.

In Preferred Embodiment 3, an example in which the vibration device 203 performs the vibration by vibrator 3 after the discharge device 9 discharges the liquid 61 has been described, but the present invention is not limited thereto. For example, the vibration device 203 may perform the discharge of the liquid 61 by the discharge device 9 and the vibration by the vibrator 3 in parallel. Alternatively, the vibration device 203 may perform the discharge of the liquid 61 by the discharge device 9 in the middle of performing the vibration by the vibrator 3.

Although an example in which the vibration control method includes steps ST10, ST11, and ST30 has been described in Preferred Embodiment 3, the present invention is not limited thereto. For example, steps ST10, ST11, and ST30 illustrated in FIG. 21 may be integrated or separate. Alternatively, the flowchart illustrated in FIG. 21 may include additional steps.

Although an example in which steps ST10 and ST11 are performed after step ST30 has been described in Preferred Embodiment 3, the present invention is not limited thereto. For example, steps ST10 and ST11 may be performed in parallel with step ST30, or may be performed before step ST30 is performed.

Preferred Embodiment 4

A vibration device according to Preferred Embodiment 4 of the present invention will be described. Note that in Preferred Embodiment 4, differences from Preferred Embodiment 1 will be mainly described. In Preferred Embodiment 4, configurations that are the same as or equivalent to those of Preferred Embodiment 1 are denoted by the same reference numerals. In addition, Preferred Embodiment 4, description overlapping with Preferred Embodiment 1 will be omitted.

Figure 23:
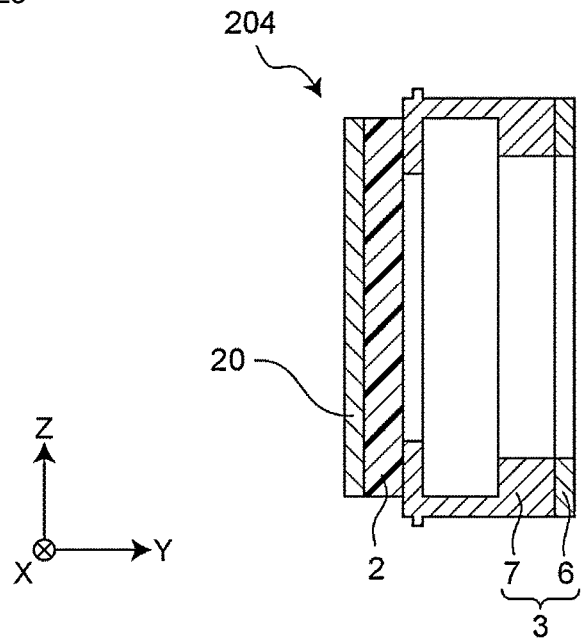
FIG. 23 is a schematic cross-sectional view of an example of a vibration device according to Preferred Embodiment 4 of the present invention.

FIG. 23 is a partially enlarged cross-sectional view of an example of a vibration device 204 according to Preferred Embodiment 4 of the present invention.

Preferred Embodiment 4 is different from Preferred Embodiment 1 in that a water-repellent coating layer 20 is provided.

As illustrated in FIG. 23, in the vibration device 204, the water-repellent coating layer 20 is provided on the surface of the light-transmissive body 2.

Water-Repellent Coating Layer

The water-repellent coating layer 20 is a layer that repels liquid. For example, the water-repellent coating layer 20 is a member having a larger contact angle than that of the surface of the light-transmissive body 2. In Preferred Embodiment 4, the water-repellent coating layer 20 is provided on the entire or substantially the entire surface of the light-transmissive body 2.

The water-repellent coating layer 20 can be formed, for example, by applying a fluorine-based coating material or a silicone-based coating material to the surface of the light-transmissive body 2. Examples of the fluorine-based coating material include a material including a compound with a perfluoroalkyl group as a main component, a material including a compound with a perfluoroalkyl group (H in an alkyl group is substituted with F) as a main component, and the like. Specific examples of the fluorine-based coating material include a fluorine-based polymer, polytetrafluoroethylene (PTFE), and the like. The silicone-based coating material is, for example, a material in which a main chain portion includes a portion formed of a direct bond of silicon (Si) and oxygen (O), and an example thereof is silicone oil, or the like.

Advantageous Effects

The vibration device 204 according to Preferred Embodiment 4 can achieve the following advantageous effects.

In the vibration device 204, the water-repellent coating layer 20 is provided on the surface of the light-transmissive body 2. With such a configuration, it is possible to easily remove liquid droplets adhering to the surface of the light-transmissive body 2. Specifically, the water-repellent coating layer 20 can make the contact angle larger than that of the surface of the light-transmissive body 2. As a result, adhesion energy of the liquid droplet is reduced, and the liquid droplet can be easily removed from the surface of the light-transmissive body 2.

In addition, liquid droplets can be removed from the surface of the light-transmissive body 2 in a shorter time.

In addition, the water-repellent coating layer 20 can also prevent liquid droplets from adhering to the surface of the light-transmissive body 2.

Note that although an example in which the water-repellent coating layer 20 is provided on the entire or substantially the entire surface of the light-transmissive body 2 has been described in Preferred Embodiment 4, the present invention is not limited thereto. For example, the water-repellent coating layer 20 may be provided on a portion of the surface of the light-transmissive body 2.

Although an example in which the water-repellent coating layer 20 is a fluorine-based coating material or a silicone-based coating material has been described in Preferred Embodiment 4, the present invention is not limited thereto. For example, the water-repellent coating layer 20 may have a configuration in which liquid is repelled by irregularities.

Figure 24:
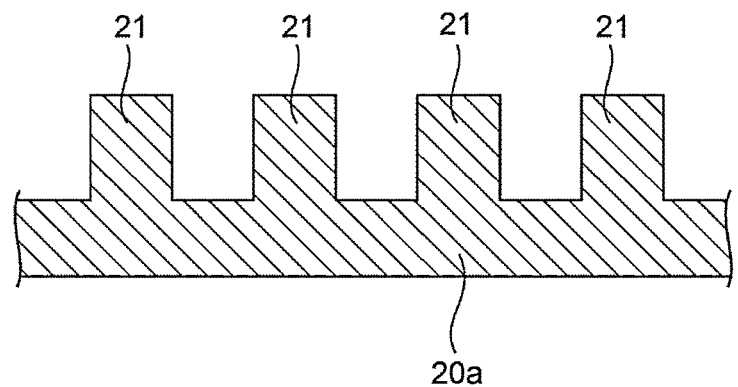
FIG. 24 is a schematic view of an example of a water-repellent coating layer.

FIG. 24 is a schematic view of an example of a water-repellent coating layer 20a. As illustrated in FIG. 24, the water-repellent coating layer 20a includes a plurality of protrusions 21. The plurality of protrusions 21 have, for example, a cylindrical or substantially cylindrical shape. The plurality of protrusions 21 are spaced apart from one another. The size (for example, a diameter or a side length) and an arrangement distance of the plurality of protrusions 21 may be equal to or less than about 500 nm, for example.

The plurality of protrusions 21 can be formed, for example, by spin coating solutions including silica nanoparticles having diameters of about 40 nm to about 100 nm on the surface of the light-transmissive body 2 and causing a sol-gel reaction. Alternatively, it can be formed by transferring a shape to the surface of the light-transmissive body 2 using a mold having a fine uneven shape on the surface.

Preferred Embodiment 5

A vibration device according to Preferred Embodiment 5 of the present invention will be described. In Preferred Embodiment 5, differences from Preferred Embodiment 1 will be mainly described. In Preferred Embodiment 5, configurations that are the same as or equivalent to those of Preferred Embodiment 1 are denoted by the same reference numerals. In addition, in Preferred Embodiment 5, description overlapping with Preferred Embodiment 1 will be omitted.

Figure 25:
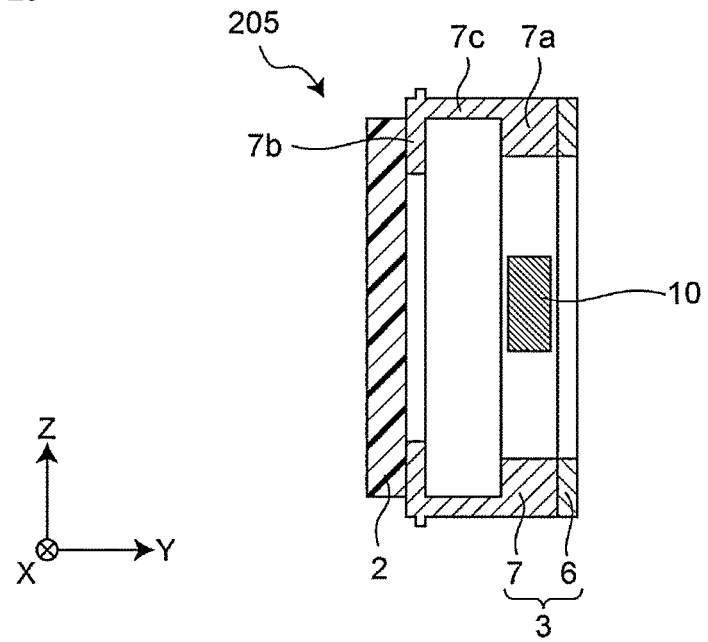
FIG. 25 is a schematic cross-sectional view of an example of a vibration device according to Preferred Embodiment 5 of the present invention.
Figure 26:
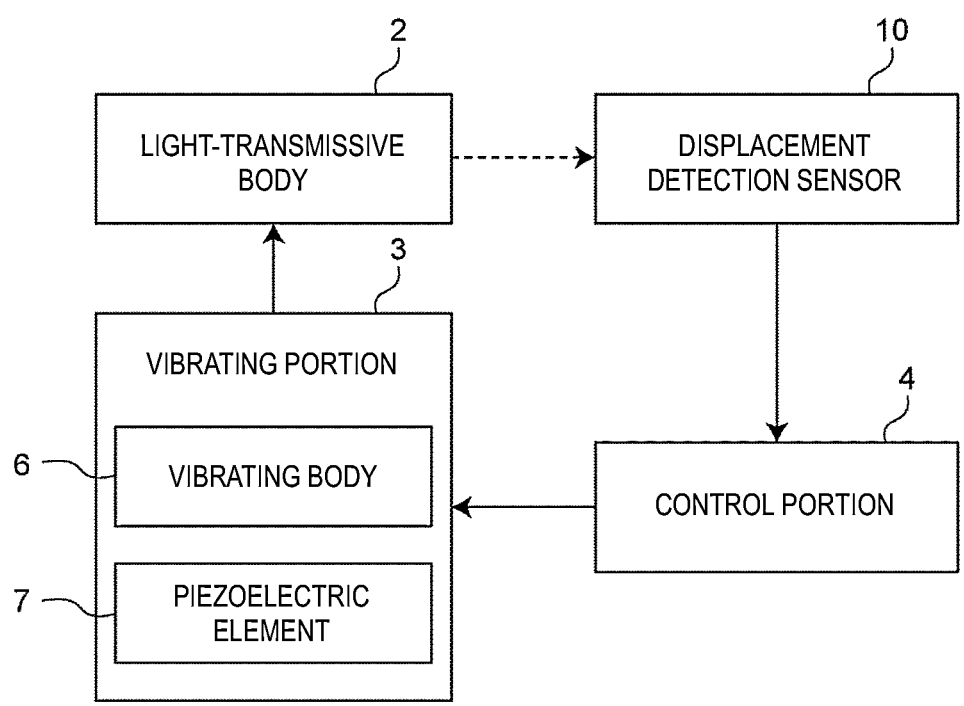
FIG. 26 is a block diagram of an example of the vibration device according to Preferred Embodiment 5 of the present invention.

FIG. 25 is a schematic cross-sectional view illustrating an example of a vibration device 205 according to Preferred Embodiment 5 of the present invention. FIG. 26 is a block diagram of an example of the vibration device 205 according to Preferred Embodiment 5 of the present invention.

Preferred Embodiment 5 is different from Preferred Embodiment 1 in that a displacement detection sensor 10 is provided.

As illustrated in FIG. 25 and FIG. 26, the vibration device 205 includes the displacement detection sensor 10 in addition to the configuration of the vibration device 200 according to Preferred Embodiment 1.

Displacement Detection Sensor

The displacement detection sensor 10 detects information related to a displacement amount of the light-transmissive body 2. The information related to the displacement amount is information from which the displacement amount in a thickness direction of the light-transmissive body 2 can be calculated. In Preferred Embodiment 5, the displacement detection sensor 10 is, for example, a laser Doppler displacement meter, and the information related to the displacement amount is a voltage value. The displacement detection sensor 10 irradiates the back surface of the light-transmissive body 2 with laser light from an inner side of the vibration device 204, and acquires information related to the displacement amount in a non-contact manner using Doppler of the laser light.

Note that the displacement detection sensor 10 is not limited to a laser Doppler displacement meter, and may be any sensor capable of acquiring information related to the displacement amount of the light-transmissive body 2. For example, the displacement detection sensor 10 may be an ultrasonic sensor, a microphone, or a laser sensor. Further, the information related to the displacement amount is not limited to the voltage value, and may be any information capable of calculating the displacement amount of the light-transmissive body 2. Alternatively, the information related to the displacement amount may be the displacement amount of the light-transmissive body 2.

The displacement detection sensor 10 transmits detected information to the controller 4.

The controller 4 receives information related to the displacement amount from the displacement detection sensor 10, and controls the vibration acceleration of the vibrator 3 based on the received information. Specifically, the controller 4 calculates the displacement amount of the light-transmissive body 2 based on the received information. The controller 4 controls the vibration acceleration of the vibrator 3 based on the calculated displacement amount.

Operation

An example of an operation of the vibration device 205, that is, a non-limiting example of a vibration control method will be described. Note that the vibration control method is a method of controlling the vibration device 205.

Figure 27:
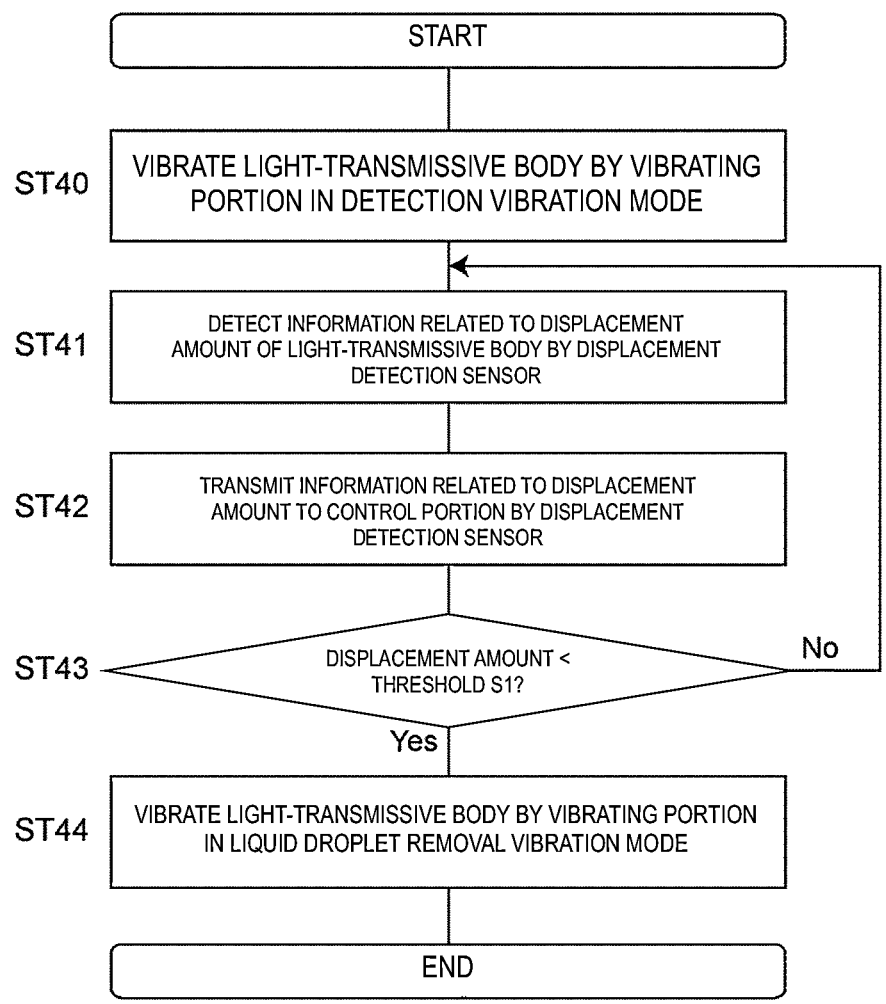
FIG. 27 is a flowchart of an example of a vibration control method according to Preferred Embodiment 5 of the present invention.
Figure 28A:
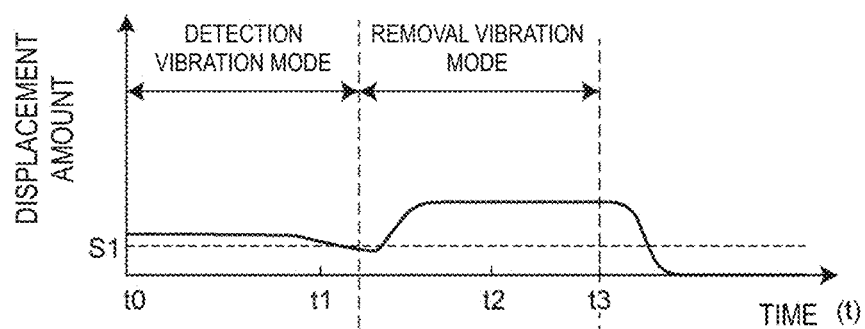
FIGS. 28A to 28C are schematic diagrams illustrating an example of an operation of the vibration device according to Preferred Embodiment 5 of the present invention.
Figure 28B:
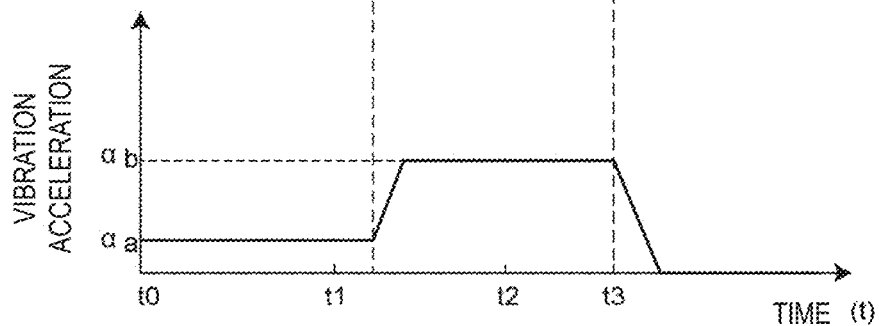
Figure 28C:
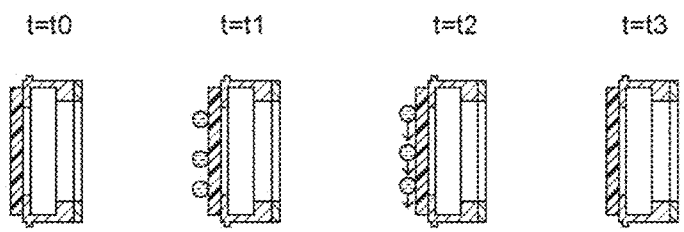
Figure 29:
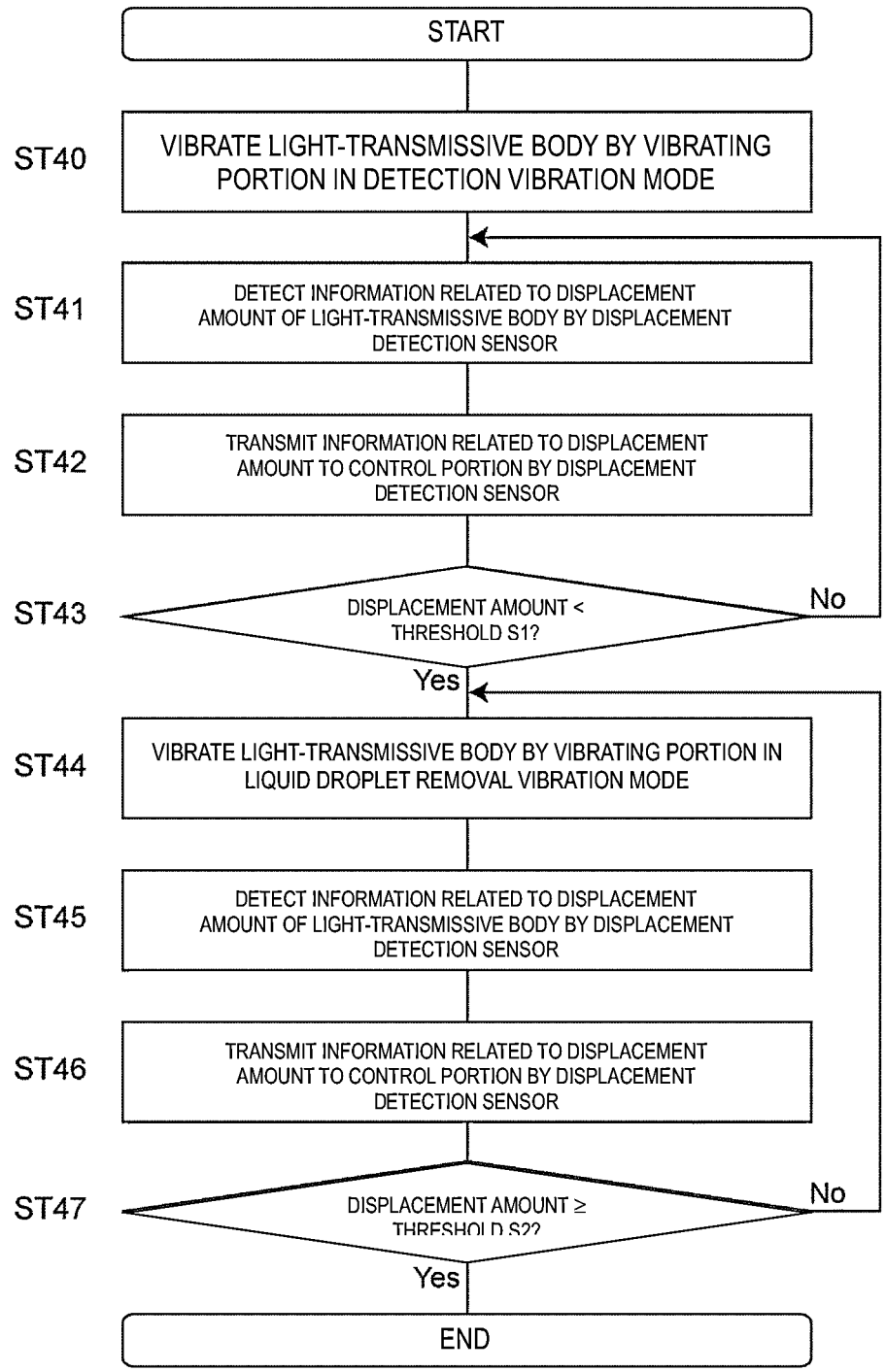
FIG. 29 is a flowchart of an example of a vibration control method according to a modification of Preferred Embodiment 5 of the present invention.

FIG. 27 is a flowchart of an example of a vibration control method according to Preferred Embodiment 5 of the present invention. Since step ST44 illustrated in FIG. 27 is the same or substantially the same as step ST10 illustrated in FIG. 10 of Preferred Embodiment 1, detailed description thereof will be omitted. FIGS. 28A to 28C are schematic diagrams illustrating an example of the operation of the vibration device 205 according to Preferred Embodiment 5 of the present invention. FIGS. 28A to 28C illustrate examples of a temporal change in the displacement amount of the light-transmissive body 2. FIG. 28B illustrates an example of a temporal change in the vibration acceleration of the vibrator 3. FIG. 28C illustrates an example of the operation of the vibration device 205 at each time.

As illustrated in FIG. 27 and FIGS. 28A to 28C, in step ST40, the light-transmissive body 2 is vibrated in a detection vibration mode by the vibrator 3. The detection vibration mode is a mode in which the light-transmissive body 2 is vibrated in order to detect the displacement amount of the light-transmissive body 2. In the detection vibration mode, the controller 4 controls the vibrator 3 to vibrate the light-transmissive body 2 at detection vibration acceleration $\alpha_a$. The detection vibration acceleration $\alpha_a$ is set to a value at which a change in the displacement amount of the light-transmissive body 2 can be detected by the displacement detection sensor 10. The detection vibration acceleration $\alpha_a$ is set to be, for example, less than about $1.5 \times 10^5$ m/s². In this case, the light-transmissive body 2 is displaced by, for example, less than about 1 μm in the thickness direction.

In step ST41, the displacement detection sensor 10 detects information related to the displacement amount of the light-transmissive body 2. In Preferred Embodiment 5, since the displacement detection sensor 10 is a laser Doppler displacement meter, information of a voltage value is acquired as information related to a displacement amount.

In step ST42, information related to the displacement amount is transmitted to the controller 4 by the displacement detection sensor 10. The controller 4 receives information related to the displacement amount from the displacement detection sensor 10, and calculates the displacement amount of the light-transmissive body 2 based on the received information.

As illustrated in FIGS. 28A to 28C, when no liquid droplet is attached to the light-transmissive body 2 in the detection vibration mode (t=t0), the displacement amount of the light-transmissive body 2 is constant or substantially constant. When the liquid droplet adheres to the light-transmissive body 2 (t=t1), the displacement amount of the light-transmissive body 2 decreases. That is, as the amount of liquid droplets adhering to the light-transmissive body 2 increases, the displacement amount of the light-transmissive body 2 decreases. As described above, the amount of liquid droplets adhering to the light-transmissive body 2 and the displacement amount of the light-transmissive body 2 are inversely proportional to each other. Therefore, the controller 4 can estimate the amount of liquid droplets adhering to the light-transmissive body 2 based on the displacement amount of the light-transmissive body 2.

In step ST43, the controller 4 determines whether or not the displacement amount of the light-transmissive body 2 is smaller than a threshold S1. In step ST43, in the case where the displacement amount is equal to or greater than the threshold S1, the flow returns to step ST41. In the case where the displacement amount is smaller than the threshold S1, the flow proceeds to ST44.

In step ST44, the light-transmissive body 2 is vibrated in a liquid droplet removal vibration mode by the vibrator 3. Step ST44 is the same or substantially the same as step ST10 in Preferred Embodiment 1. After performing step ST44 for a predetermined time, the controller 4 ends step ST44. The light-transmissive body 2 vibrates in the liquid droplet removal vibration mode, thus removing the liquid droplets from the surface of the light-transmissive body 2. Note that the liquid droplet removal vibration mode is a mode in which the vibration described in step ST10 of Preferred Embodiment 1 is generated, and the light-transmissive body 2 is vibrated at predetermined vibration acceleration, that is, the vibration acceleration of, for example, equal to or more than about $1.5 \times 10^5$ m/s² and equal to or less than about $8.0 \times 10^5$ m/s².

As illustrated in FIGS. 28A to 28C, when the light-transmissive body 2 vibrates in the liquid droplet removal vibration mode (t=t2), the liquid droplets adhering to the light-transmissive body 2 slide down. When the liquid droplet removal vibration mode is executed for a predetermined time (t=t3), the liquid droplets adhering to the light-transmissive body 2 substantially slide down. Thereafter, the controller 4 returns to the detection vibration mode.

As described above, in the vibration device 205 according to Preferred Embodiment 5, the vibration acceleration of the light-transmissive body 2 is controlled based on the displacement amount of the light-transmissive body 2.

Advantageous Effects

The vibration device 205 according to Preferred Embodiment 5 can achieve the following advantageous effects.

The vibration device 205 includes the displacement detection sensor 10 that detects information related to the displacement amount of the light-transmissive body 2 and transmits the detected information to the controller 4. The controller 4 controls the vibration acceleration of the vibrator 3 based on the received information.

The vibration control method includes step ST41 of detecting information related to the displacement amount of the light-transmissive body 2. The step of vibrating includes steps ST42 to ST44 of controlling, by the controller 4, the vibration acceleration of the vibrator 3 based on the detected information. With such a configuration, the vibration acceleration of the vibrator 3 can be controlled based on the information related to the displacement amount of the light-transmissive body 2.

With such a configuration, the vibration acceleration of the vibrator 3 can be controlled based on the information related to the displacement amount of the light-transmissive body 2. Accordingly, the light-transmissive body 2 can be vibrated at predetermined vibration acceleration, that is, the vibration acceleration of, for example, equal to or more than about $1.5 \times 10^5$ m/s² and equal to or less than about $8.0 \times 10^5$ m/s², at an appropriate timing when the amount of liquid droplets adhering to the light-transmissive body 2 increases.

Note that although an example in which the detection vibration acceleration $\alpha_a$ is set to be less than about $1.5 \times 10^5$ m/s² has been described in Preferred Embodiment 5, the present invention is not limited thereto. The detection vibration acceleration $\alpha_a$ may be set to vibration acceleration capable of detecting a change in the displacement amount of the light-transmissive body 2.

In Preferred Embodiment 5, an example in which the controller 4 executes the liquid droplet removal mode in step ST44 for a predetermined time, thereafter ending the mode has been described, but the present invention is not limited thereto. For example, the controller 4 may determine the end timing of the liquid droplet removal mode based on the displacement amount of the light-transmissive body 2. Alternatively, the detection vibration mode may be started after step ST44 ends. The detection vibration mode may be constantly executed, or may be periodically executed.

Figure 30:
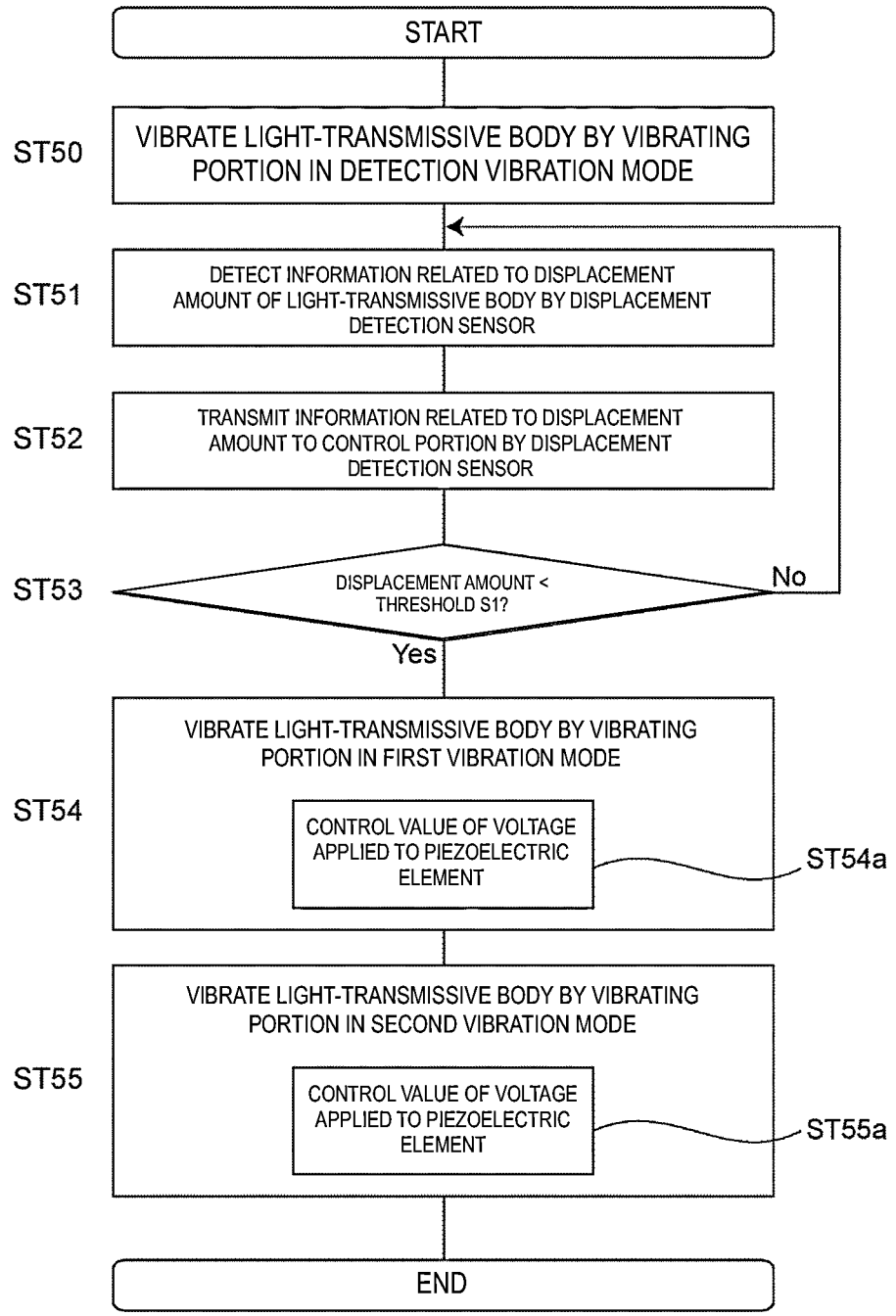
FIG. 30 is a flowchart of an example of a vibration control method according to Preferred Embodiment 6 of the present invention.

FIG. 30 is a flowchart of an example of a vibration control method according to a modification of Preferred Embodiment of the present invention. As illustrated in FIG. 30, the vibration control method of the modification further includes steps ST45 to ST47.

In step ST45, similarly to step ST41, information related to the displacement amount of the light-transmissive body 2 is detected by the displacement detection sensor 10.

In step ST46, similarly to step ST42, information related to the displacement amount is transmitted to the controller by the displacement detection sensor 10. The controller 4 receives information related to the displacement amount from the displacement detection sensor 10, and calculates the displacement amount of the light-transmissive body 2 based on the received information.

In step ST47, the controller 4 determines whether or not the displacement amount of the light-transmissive body 2 is equal to or greater than a threshold S2. In step ST47, in the case where the displacement amount is smaller than the threshold S2, the flow returns to step ST44. Thus, the vibration in the liquid droplet removal vibration mode in step ST44 is continued. In the case where the displacement amount is equal to or greater than the threshold S2, the flow ends. Thus, the vibration in the liquid droplet removal vibration mode in step ST44 is ended.

In this way, by determining the end of vibration in the liquid droplet removal vibration mode based on the displacement amount of the light-transmissive body 2, it is possible to end vibration for removing liquid droplets at a more appropriate timing.

Preferred Embodiment 6

A vibration device according to Preferred Embodiment 6 of the present invention will be described. In Preferred Embodiment 6, differences from Preferred Embodiment 5 will be mainly described. In Preferred Embodiment 6, configurations that are the same as or equivalent to those of Preferred Embodiment 5 are denoted by the same reference numerals. In addition, in Preferred Embodiment 6, description overlapping with Preferred Embodiment 5 will be omitted.

Figure 31A:
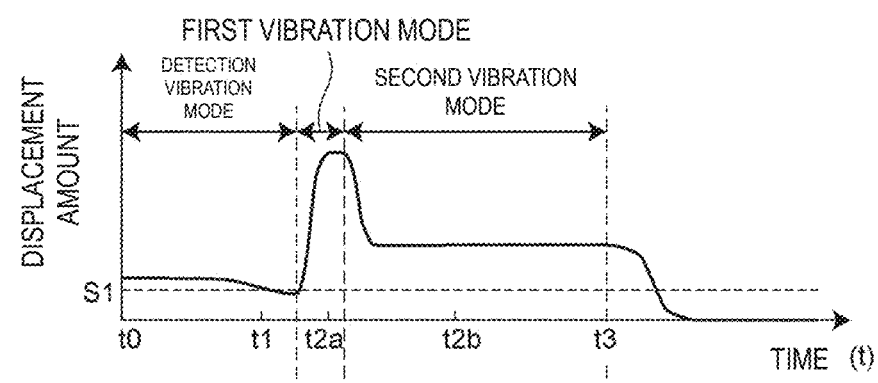
FIGS. 31A to 31C are schematic diagrams illustrating an example of an operation of a vibration device according to Preferred Embodiment 6 of the present invention.
Figure 31B:
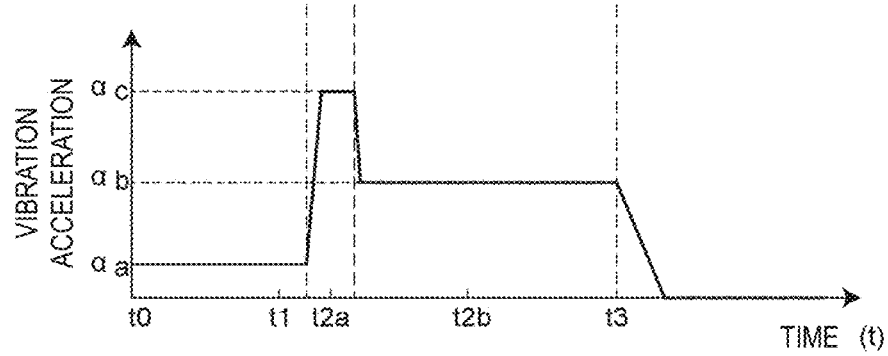
Figure 31C:
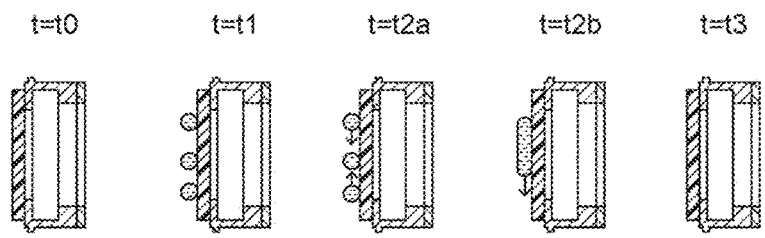

FIG. 30 is a flowchart of a non-limiting example of a vibration control method according to Preferred Embodiment 6 of the present invention. Since steps ST50 to ST53 and ST55 illustrated in FIG. 30 are the same or substantially the same as steps ST40 to ST44 illustrated in FIG. 27 of Preferred Embodiment 5, detailed description thereof will be omitted. FIGS. 31A to 31C are schematic diagram illustrating an example of an operation of a vibration device according to Preferred Embodiment 6 of the present invention. FIG. 31A illustrates an example of a temporal change in the displacement amount of the light-transmissive body 2. FIG. 31B illustrates an example of a temporal change in vibration acceleration of the vibrator 3. FIG. 31C illustrates an example of the operation of the vibration device at each time.

Preferred Embodiment 6 is different from Preferred Embodiment 5 in that the vibration control method is switched to a second vibration mode after a first vibration mode is performed. Note that the second vibration mode corresponds to the liquid droplet removal vibration mode according to Preferred Embodiment 5.

In the vibration device according to Preferred Embodiment 6, the controller 4 includes the first vibration mode and the second vibration mode. Other configurations of the vibration device according to Preferred Embodiment 6 are the same or substantially the same as those of the vibration device 205 according to Preferred Embodiment 5.

The first vibration mode is a vibration mode in which the light-transmissive body 2 is vibrated at the vibration acceleration of, for example, equal to or more than about $8.1 \times 10^5$ m/s$^2$ and equal to or less than about $1.7 \times 10^6$ m/s$^2$. The second vibration mode is a vibration mode in which the light-transmissive body 2 is vibrated at the vibration acceleration of, for example, equal to or more than about $1.5 \times 10^5$ m/s$^2$ and equal to or less than about $8.0 \times 10^5$ m/s$^2$. After executing the first vibration mode, the controller 4 executes the second vibration mode.

Operation

An example of an operation of the vibration device according to Preferred Embodiment 6, that is, an example of a vibration control method will be described.

As illustrated in FIG. 30 and FIGS. 31A to 31C, in step ST50, the light-transmissive body 2 is vibrated in a detection vibration mode by the vibrator 3.

In step ST51, information related to the displacement amount of the light-transmissive body 2 is detected by the displacement detection sensor 10. In Preferred Embodiment 5, since the displacement detection sensor 10 is a laser Doppler displacement meter, information of a voltage value is acquired as information related to a displacement amount.

In step ST52, information related to the displacement amount is transmitted to the controller 4 by the displacement detection sensor 10.

In step ST53, the controller 4 determines whether or not the displacement amount of the light-transmissive body 2 is smaller than the threshold S1. In step ST53, in the case where the displacement amount is equal to or greater than the threshold S1, the flow returns to step ST51. In the case where the displacement amount is smaller than the threshold S1, flow proceeds to ST54.

In step ST54, the light-transmissive body 2 is vibrated in the first vibration mode by the vibrator 3. The first vibration mode is a vibration mode in which liquid droplets are collected on the surface of the light-transmissive body 2. In the first vibration mode, the controller 4 controls the vibrator 3 to vibrate the light-transmissive body 2 at first vibration acceleration $\alpha_c$ of, for example, equal to or more than about $8.1 \times 10^5$ m/s$^2$ and equal to or less than about $1.7 \times 10^6$ m/s$^2$.

Step ST54 includes step ST54a of controlling, by the controller 4, a value of a voltage applied to the piezoelectric element 6. In step ST54a, the value of the voltage applied to the piezoelectric element 6 is controlled by the controller 4 to be, for example, equal to or more than about 16 Vp-p and equal to or less than about 60 Vp-p. Thus, the light-transmissive body 2 can be vibrated at the first vibration acceleration $\alpha_c$ of equal to or more than about $8.1 \times 10^5$ m/s$^2$ and equal to or less than about $1.7 \times 10^6$ m/s$^2$.

As illustrated in FIGS. 31A to 31C, the liquid droplets may be scattered and adhere to the surface of the light-transmissive body 2 (t=t1). In the first vibration mode, the liquid droplets scattered on the surface of the light-transmissive body 2 are collected at a portion of the light-transmissive body 2 where the displacement amount is maximum due to vibration (t=t2b). In Preferred Embodiment 6, the light-transmissive body 2 has a circular or substantially circular plate shape and vibrates in a state where an outer edge of the light-transmissive body 2 is supported. Therefore, the portion where the displacement amount of the light-transmissive body 2 is maximum is the center of the light-transmissive body 2.

After vibrating the light-transmissive body 2 for a predetermined time in the first vibration mode, the controller 4 switches to the second vibration mode. A period when the first vibration mode is executed is shorter than a period when the second vibration mode is executed. The period when the first vibration mode is executed can be arbitrarily set. For example, in a case where liquid droplets adhere to the light-transmissive body 2 in many cases, the period when the first vibration mode is executed may be extended. In a case where liquid droplets are less likely to adhere to the light-transmissive body 2, the period when the first vibration mode is executed may be shortened.

In step ST55, the light-transmissive body 2 is vibrated in the second vibration mode by the vibrator 3. The second vibration mode is the liquid droplet removal vibration mode according to Preferred Embodiment 5, and is a vibration mode in which liquid droplets adhering to the surface of the light-transmissive body 2 slide down. In the second vibration mode, the controller 4 controls the vibrator 3 to vibrate the light-transmissive body 2 at second vibration acceleration $\alpha_b$ of, for example, equal to or more than about $1.5 \times 10^5$ m/s$^2$ and equal to or less than about $8.0 \times 10^5$ m/s$^2$.

Step ST55 includes step ST55a of controlling, by the controller 4, the value of the voltage applied to the piezoelectric element 6. In step ST55a, the value of the voltage applied to the piezoelectric element 6 is controlled by the controller 4 to be, for example, equal to or more than about 2 Vp-p and equal to or less than about 15 Vp-p. Thus, the light-transmissive body 2 can be vibrated at the second vibration acceleration $\alpha_b$ of equal to or more than about $1.5 \times 10^5$ m/s$^2$ and equal to or less than about $8.0 \times 10^5$ m/s$^2$.

Figure 32:
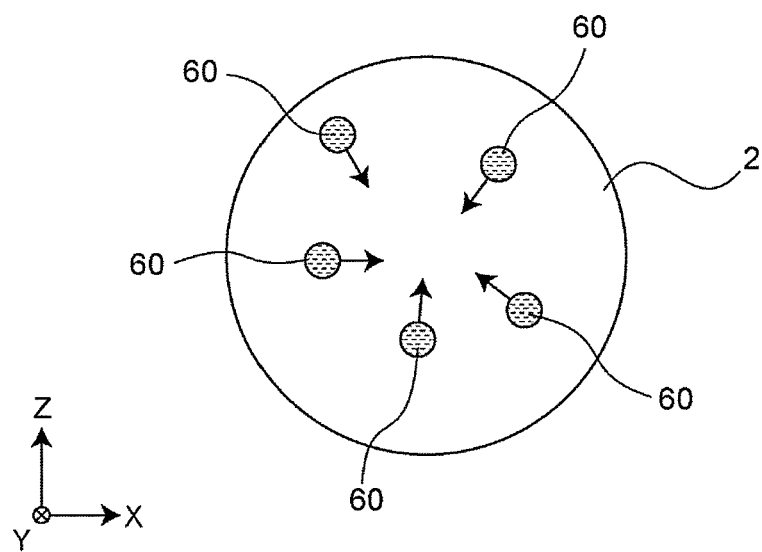
FIG. 32 is a schematic diagram illustrating an example of behavior of a liquid droplet in the vibration control method of FIG. 30.
Figure 33:
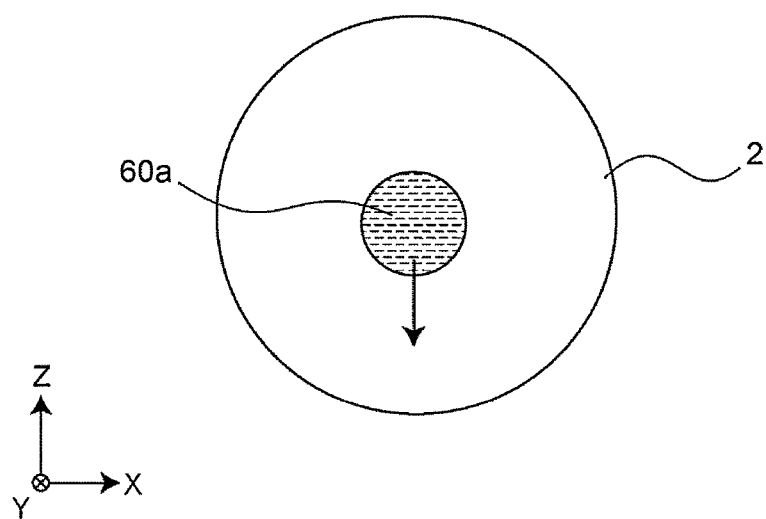
FIG. 33 is a schematic diagram illustrating an example of behavior of a liquid droplet in the vibration control method of FIG. 30.

FIG. 32 and FIG. 33 are schematic diagrams illustrating an example of behavior of a liquid droplet in the vibration control method of FIG. 30. FIG. 32 illustrates an example of the behavior of a liquid droplet in step ST54 of FIG. 30. FIG. 33 illustrates an example of the behavior of a liquid droplet in step ST55 of FIG. 30. As illustrated in FIG. 32, in step ST54, by vibrating the light-transmissive body 2 in the first vibration mode, a plurality of the liquid droplets 60 scattered on the surface of the light-transmissive body 2 gathers at the center of the light-transmissive body 2. As a result, the plurality of droplets 60 gathers to form a large liquid droplet 60a. Since the weight of the liquid droplet 60a is larger than that of the liquid droplet 60, the liquid droplet 60a easily slides down in the direction of gravity. Thereafter, as illustrated in FIG. 33, in step ST55, by vibrating the light-transmissive body 2 in the second vibration mode, the liquid droplet 60a collected at the center of the light-transmissive body 2 slides down in the direction of gravity.

As described above, in the vibration control method according to Preferred Embodiment 6, the liquid droplets 60 are collected on the surface of the light-transmissive body 2 in the first vibration mode, and the liquid droplet 60a collected in the second vibration mode slides down from the light-transmissive body 2.

Relationship Between Sliding Angle and Vibration Acceleration

Figure 34:
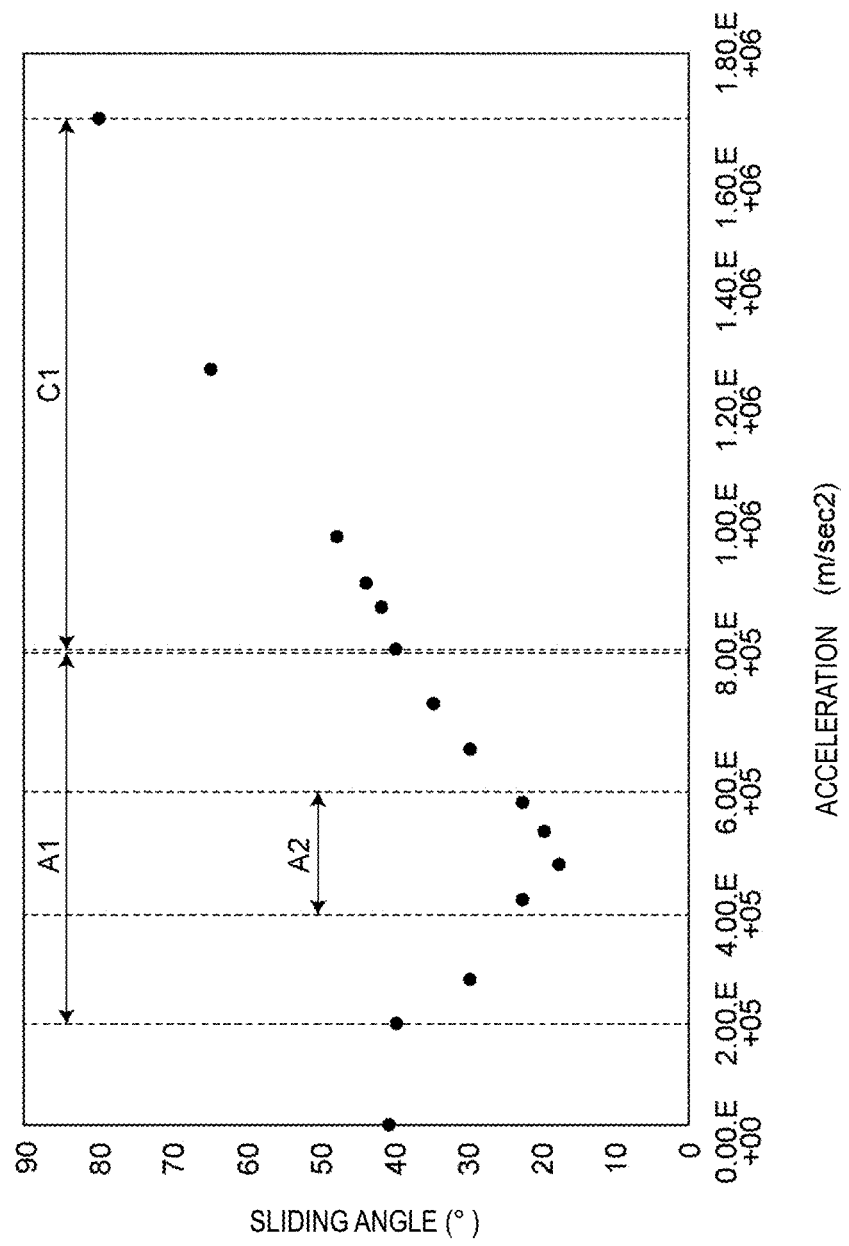
FIG. 34 is a schematic diagram illustrating an example of a relationship between a sliding angle and acceleration.

FIG. 34 is a schematic diagram illustrating an example of the relationship between the sliding angle and the vibration acceleration. FIG. 34 illustrates a change in the sliding angle with respect to a change in the vibration acceleration. Note that the vibration acceleration was calculated by the method described below.

Signals are supplied to the piezoelectric element 6 of the vibrator 3 in the vicinity of the resonant frequency 60 kHz by a power source (Keysight: E26104A) and a function generator (Tektronix Inc.: AGF1022) to excite vibration. Displacements of the light-transmissive body 2 excited by vibration of the vibrator 3 were detected by a laser displacement meter (Olympus Corporation: BX51M), and measured by a multimeter (Keysight: 2110) and an oscilloscope (Tektro: Oscilloscope TBS1104). The vibration acceleration was calculated by an equation $\alpha=(2\pi f)^2 A$, where $\alpha$ is vibration acceleration, f is frequencies, and A is amplitude (displacement amount).

As described in Preferred Embodiment 1, when the sliding angle $\theta$ is larger than about 40 degrees, the adhesion energy E of the liquid droplet is larger than the force with which the liquid droplet slides down from the surface of the light-transmissive body 2 to the outside. Therefore, the liquid droplets gather at a portion where the displacement amount is maximum in the light-transmissive body 2, that is, a central portion of the light-transmissive body 2. Referring to FIG. 34, when the vibration acceleration $\alpha$ is equal to or more about $8.1 \times 10^5$ m/s$^2$, the sliding angle $\theta$ is larger than about 40 degrees. Note that when the vibration acceleration $\alpha$ is larger than about $1.7 \times 10^6$ m/s$^2$, the sliding angle $\theta$ is close to about 90 degrees. When the sliding angle is close to about 90 degrees, the liquid droplet behaves like a vertical drop, and the behavior of the liquid droplet does not change even when the sliding angle is further increased. That is, when the sliding angle is close to about 90 degrees, the behavior of the liquid droplet is saturated. Further, when the vibration acceleration $\alpha$ is too large, the load applied to the vibration device itself increases. For this reason, the vibration acceleration of about $1.7 \times 10^6$ m/s$^2$ at which the sliding angle for saturating the behavior of the liquid droplet is close to about 90 degrees was set as the maximum value of the vibration acceleration.

Therefore, in the first vibration mode, the vibration acceleration $\alpha$ is preferably equal to or more than about $8.1 \times 10^5$ m/s$^2$ and equal to or less than about $1.7 \times 10^6$ m/s$^2$ (see "Cl" in FIG. 34). By controlling the vibration acceleration $\alpha$ within the predetermined range, it is possible to collect liquid droplets adhering to the surface of the light-transmissive body 2.

In Preferred Embodiment 6, the controller 4 controls the vibration acceleration $\alpha$ by controlling the value of a voltage applied to the piezoelectric element 6 of the vibrator 3. Specifically, the controller 4 applies a voltage to the piezoelectric element 6 via the power supply conductor 5. The controller 4 controls the peak-to-peak value (Vp-p) of the AC voltage applied to the piezoelectric element 6.

Figure 35:
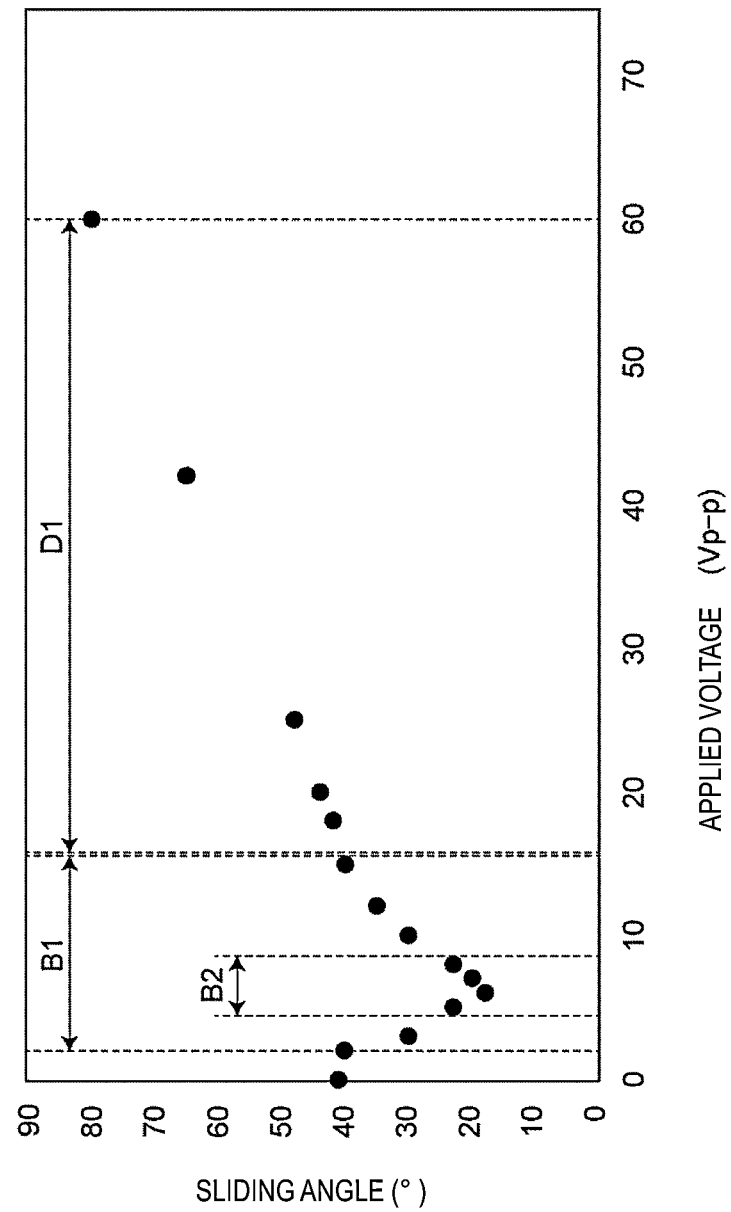
FIG. 35 is a schematic diagram illustrating an example of a relationship between a sliding angle and an applied voltage.

FIG. 35 is a schematic diagram illustrating an example of the relationship between the sliding angle and the applied voltage. As illustrated in FIG. 35, by controlling the voltage applied to the piezoelectric element 6 to be, for example, equal to or more than about 16 Vp-p and equal to or less than about 60 Vp-p, the controller 4 can set the vibration acceleration $\alpha$ to be equal to or more than about $8.1 \times 10^5$ m/s$^2$ and equal to or less than about $1.7 \times 10^6$ m/s$^2$ (see "Dl" in FIG. 35).

Advantageous Effects

According to the vibration device and the vibration control method of Preferred Embodiment 6, the following advantageous effects can be achieved.

The controller 4 according to Preferred Embodiment 6 has the first vibration mode and the second vibration mode. In the first vibration mode, the light-transmissive body 2 is vibrated at the vibration acceleration of equal to or more than about $8.1 \times 10^5$ m/s$^2$ and equal to or less than about $1.7 \times 10^6$ m/s$^2$. In the second vibration mode, the light-transmissive body 2 is vibrated at the vibration acceleration of equal to or more than about $1.5 \times 10^5$ m/s$^2$ and equal to or less than about $8.0 \times 10^5$ m/s$^2$. The controller 4 controls the vibrator 3 to execute the second vibration mode after executing the first vibration mode. To be specific, the controller 4 controls the value of the voltage applied to the piezoelectric element 6 to be equal to or more than about 16 Vp-p and equal to or less than about 60 Vp-p in the first vibration mode, and controls the value of the voltage applied to the piezoelectric element 6 to be equal to or more than about 2 Vp-p and equal to or less than about 15 Vp-p in the second vibration mode.

In the vibration control method of Preferred Embodiment 6, the step of vibrating includes step ST54 of vibrating the light-transmissive body 2 in the first vibration mode and step ST55 of vibrating the light-transmissive body 2 in the second vibration mode. Step ST54 of vibrating the light-transmissive body 2 in the second vibration mode is performed after the light-transmissive body 2 is vibrated in the first vibration mode. To be specific, step ST54 includes step ST54a of controlling, by the controller 4, the value of the voltage applied to the piezoelectric element 6 to be equal to or more than about 16 Vp-p and equal to or less than about 60 Vp-p, and step ST55 includes step ST55a of controlling, by the controller 4, the value of the voltage applied to the piezoelectric element 6 to be equal to or more than about 2 Vp-p and equal to or less than about 15 Vp-p.

With such a configuration, it is possible to further improve the liquid droplet removal performance. In Preferred Embodiment 6, liquid droplets can be collected on the surface of the light-transmissive body 2 by executing the first vibration mode. By collecting the liquid droplets, the plurality of liquid droplets coalesce. Since the combined liquid droplets increase in weight, they tend to slide down in the direction of gravity. As described above, in Preferred Embodiment 6, after the liquid droplets are collected on the surface of the light-transmissive body 2 in the first vibration mode, the collected liquid droplets can be caused to slide down from the surface of the light-transmissive body 2 in the second vibration mode. As a result, in Preferred Embodiment 6, the liquid droplet removal performance can be improved compared to a case where liquid droplets are caused to slide down in a state where the liquid droplets are scattered on the surface of the light-transmissive body 2. In other words, in Preferred Embodiment 6, it is possible to more easily remove the liquid droplets adhering to the light-transmissive body 2 and also to remove the liquid droplets in a shorter time.

In addition, in Preferred Embodiment 6, even when liquid droplets including a foreign matter adhere to the light-transmissive body 2, the liquid droplets can be easily removed without using a cleaning liquid. For example, liquid droplets including solids such as muddy water tend to be less likely to slide down by vibration than liquid droplets including relatively no solids such as rainwater. In Preferred Embodiment 6, even when the liquid droplet adhering to the surface of the light-transmissive body 2 is a liquid droplet including the foreign matter such as muddy water, the liquid droplet can be removed without using the cleaning liquid.

Further, in Preferred Embodiment 6, the water-repellent coating layer 20 may be provided on the surface of the light-transmissive body 2 as in Preferred Embodiment 4. Even when liquid droplets including the foreign matter such as muddy water adhere to the light-transmissive body 2, the liquid droplets can be removed in a short time, and thus wear of the water-repellent coating layer 20 due to the liquid droplets can be reduced or prevented. As a result, the coating life of the water-repellent coating layer 20 can be extended.

Figure 36:
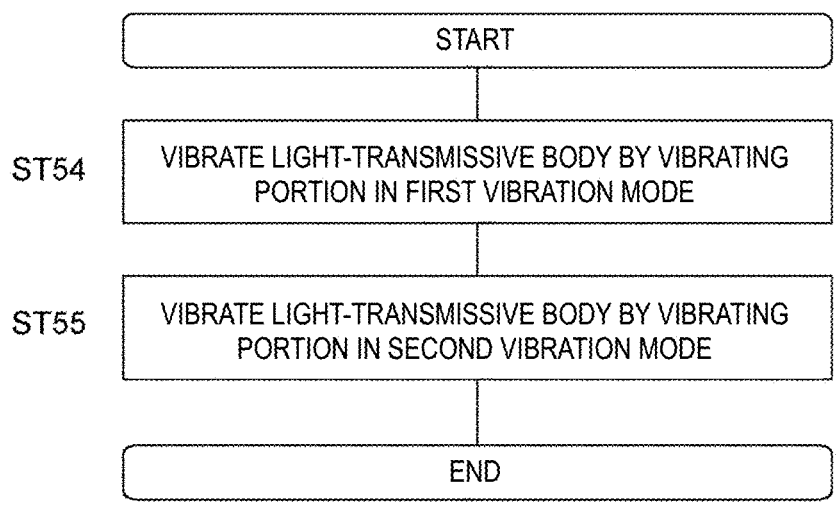
FIG. 36 is a flowchart of an example of a vibration control method according to a modification of Preferred Embodiment 6 of the present invention.

Note that although an example in which the vibration control method includes steps ST50 to ST53 has been described in Preferred Embodiment 6, the present invention is not limited thereto. FIG. 36 is a flowchart of an example of a vibration control method according to a modification of Preferred Embodiment of the present invention. As illustrated in FIG. 36, the vibration control method of Preferred Embodiment 6 may include steps ST54 and ST55, and may not include steps ST50 to ST53. In this case, steps ST54 and ST55 may be performed periodically or may be performed based on information input by a user.

EXAMPLES

As an example, performance evaluation was performed using the vibration device and the vibration control method according to Preferred Embodiment 6, and a coating wear time, a removal rate of muddy water, and a used amount of a cleaning liquid were measured. In addition, as a comparative example, the same performance evaluation as in the example was performed using a vibration device in which vibration acceleration was not controlled, and the coating wear time, the removal rate of muddy water, and the used amount of the cleaning liquid were measured. The comparative example is the same or substantially the same as the vibration device of the example except that the vibration acceleration is not controlled and that the cleaning liquid is discharged.

The performance evaluation in the example and the comparative example was performed by performing the following procedures (1) to (9).
 (1) Rain X sold by Kinyudo Co., Ltd. was applied as the water-repellent coating layer 20 to the surface of the light-transmissive body 2 of the vibration device used for performance evaluation.
 (2) The initial contact angle of the light-transmissive body 2 was measured. As for the contact angle, an image obtained by photographing the light-transmissive body 2 to which a water droplet is applied is read by a computer, and thus the contact angle of the water droplet with respect to the surface of the light-transmissive body 2 is measured.
 (3) A laser Doppler displacement meter (Laser Vibrometer LV-1800, manufactured by Ono Sokki Co., Ltd.) was used for monitoring the displacement amount of the light-transmissive body 2.
 (4) The muddy water of about 10 µl was applied to the surface of the light-transmissive body 2.
 (5) The vibration device was driven. Note that in the comparative example, since it is difficult to remove the muddy water by vibration, the cleaning liquid was discharged onto the surface of the light-transmissive body 2. Further, in the comparative example, a measuring cup received the cleaning liquid discharged onto the light-transmissive body 2.
 (6) After the driving device was driven for about 20 seconds, the vibration device was stopped.
 (7) The coating wear time of the water-repellent coating layer 20 was calculated by measuring the contact angle and calculating the reduction speed of the contact angle. Specifically, the amount of decrease in the contact angle and the time taken to decrease the contact angle were measured, and the reduction speed of the contact angle was calculated. The coating wear time was calculated by calculating the time until the original contact angle of the light-transmissive body 2 was obtained from the reduction speed of the contact angle.
 (8) The muddy water remaining in the light-transmissive body 2 was collected, and the removal rate of the muddy water was calculated.
 (9) The weight of the cleaning liquid received by the measuring cup was measured and quantified to measure the used amount of the cleaning liquid.

In the examples, evaluation results obtained by the performance evaluation procedures (7) to (9) are referred to as Example 1, Example 2, and Example 3, respectively. In the comparative examples, evaluation results obtained by the performance evaluation procedures (7) to (9) are referred to as Comparative Example 1, Comparative Example 2, and Comparative Example 3, respectively.

Figure 37:
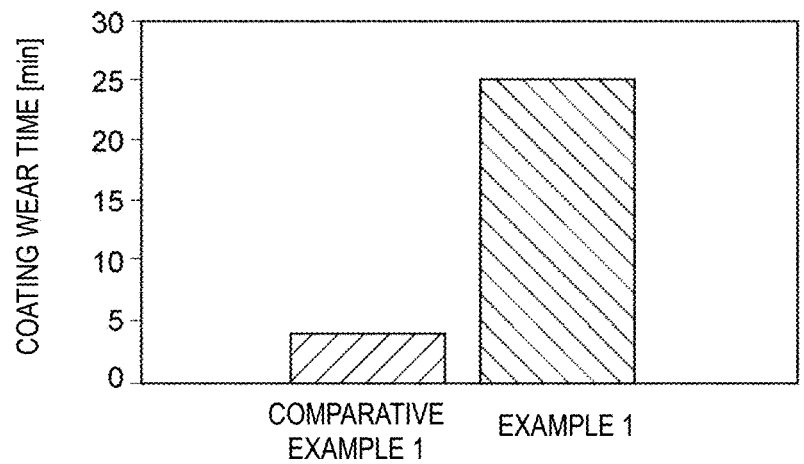
FIG. 37 is a graph illustrating a coating wear time of Example 1 and Comparative Example 1.

FIG. 37 is a graph illustrating the coating wear time of Example 1 and Comparative Example 1. The coating wear time is a time until the water-repellent coating layer 20 is peeled off, and means a life of the water repellent coating layer 20. As illustrated in FIG. 37, the coating wear time in Comparative Example 1 was about 4 minutes, whereas the coating wear time in Example 1 was about 25 minutes. In Example 1, the coating wear time was about 6.2 times longer than that in Comparative Example 1. This illustrates that the life of the water-repellent coating layer 20 in Example 1 is longer than that in Comparative Example 1.

Figure 38:
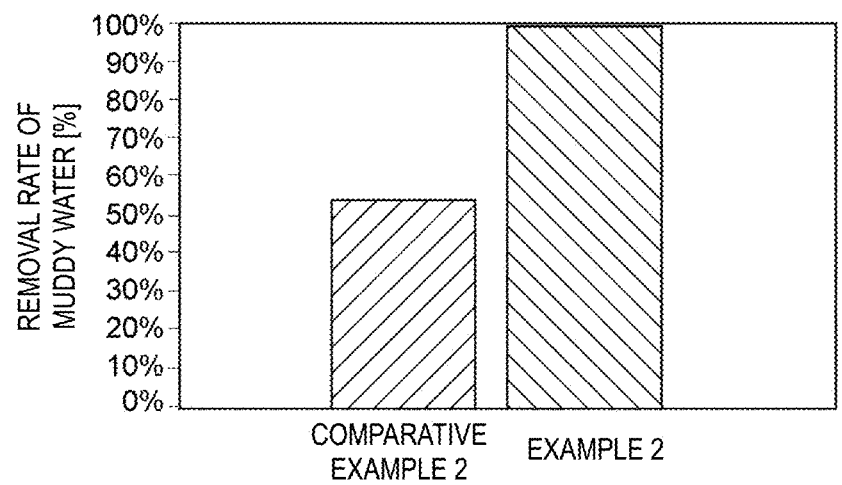
FIG. 38 is a graph illustrating a removal rate of muddy water in Example 2 and Comparative Example 2.

FIG. 38 is a graph illustrating the removal rate of the muddy water in Example 2 and Comparative Example 2. As illustrated in FIG. 38, the removal rate of the muddy water in Comparative Example 2 is about 53%, whereas the removal rate of the muddy water in Example 2 is about 98%. In Example 2, the removal rate of muddy water is about 1.8 times larger than that in Comparative Example 2. This shows that the removal efficiency of the muddy water is improved in Example 2 compared to Comparative Example 2.

Figure 39:
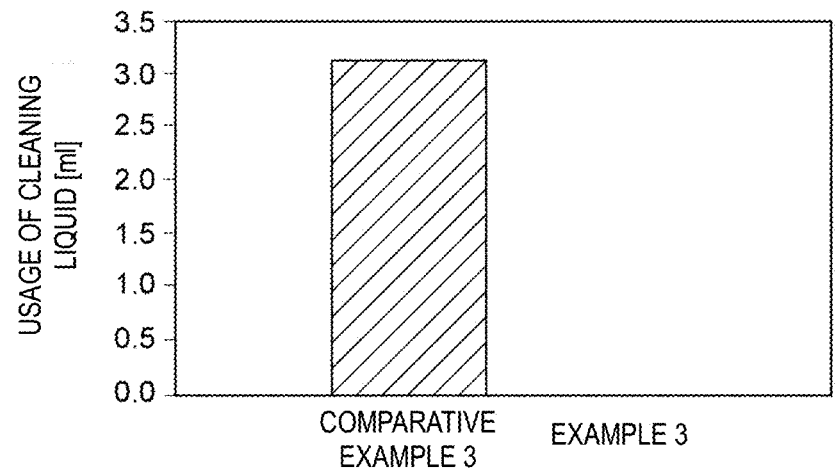
FIG. 39 is a graph illustrating a used amount of a cleaning liquid used in Example 3 and Comparative Example 3.

FIG. 39 is a graph illustrating the used amount of the cleaning liquid in Example 3 and Comparative Example 3. As illustrated in FIG. 39, the used amount of the cleaning liquid in Comparative Example 3 is about 3.0 mL. In Example 3, since the cleaning liquid was not used, the used amount of the cleaning liquid is about 0 mL. This shows that the muddy water adhering to the light-transmissive body 2 can be removed in Example 3 without using a cleaning liquid, different from Comparative Example 3.

Preferred Embodiment 7

A vibration device according to Preferred Embodiment 7 of the present invention will be described. Note that in Preferred Embodiment 7, differences from Preferred Embodiment 1 will be mainly described. In Preferred Embodiment 7, configurations that are the same as or equivalent to those of Preferred Embodiment 1 are denoted by the same reference numerals. In addition, in Preferred Embodiment 7, description overlapping with Preferred Embodiment 1 will be omitted.

Figure 40:
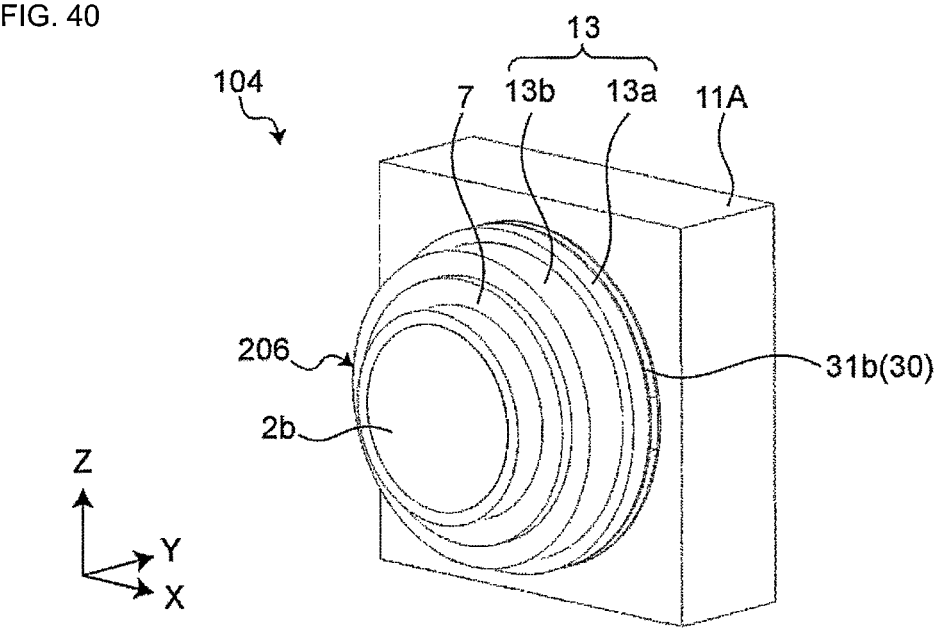
FIG. 40 is a schematic perspective view illustrating an example of an imaging unit including a vibration device according to Preferred Embodiment 7 of the present invention.
Figure 41:
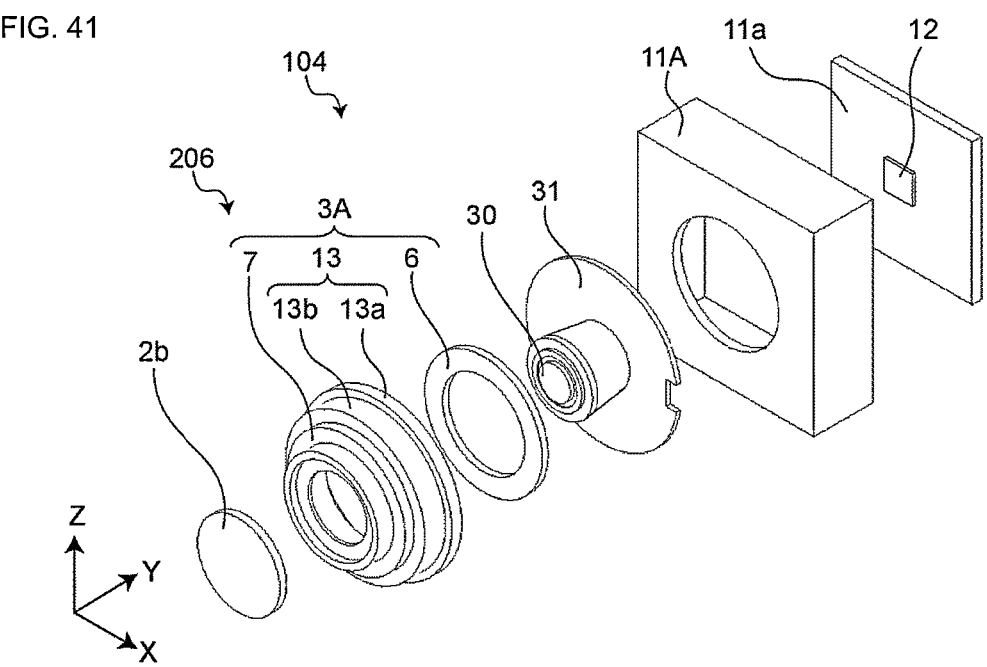
FIG. 41 is an exploded perspective view of the imaging unit of FIG. 40.
Figure 42:
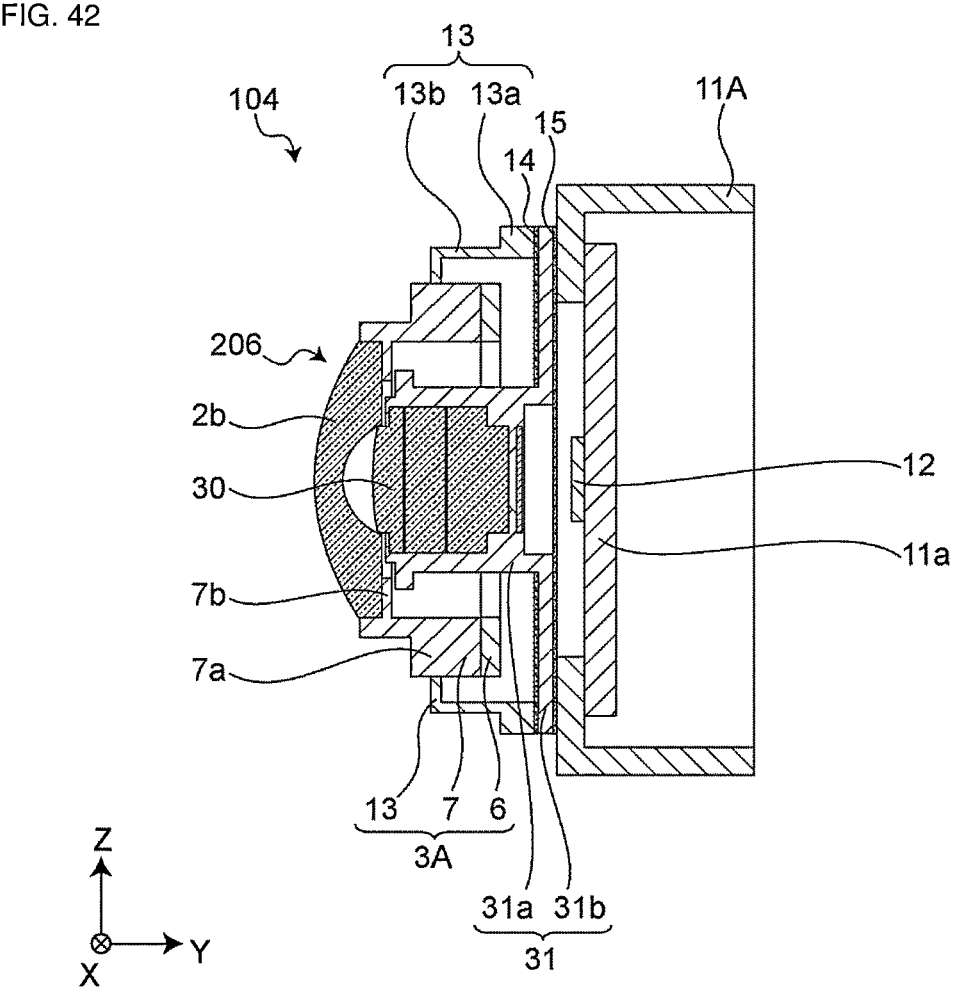
FIG. 42 is a schematic cross-sectional view of the imaging unit of FIG. 40.

FIG. 40 is a schematic perspective view illustrating an example of an imaging unit 104 including a vibration device 206 according to Preferred Embodiment 7 of the present invention. FIG. 41 is an exploded perspective view of the imaging unit 104 illustrated in FIG. 40. FIG. 42 is a schematic cross-sectional view of the imaging unit 104 of FIG. 40.

Preferred Embodiment 7 is different from Preferred Embodiment 1 in that the vibration device 206 includes an inner layer lens 30 and an inner layer lens barrel 31. Further, Preferred Embodiment 7 is different from Preferred Embodiment 1 in that a light-transmissive body 2b is a lens.

As illustrated in FIG. 40 to FIG. 42, the imaging unit 104 includes a housing 11A, the imaging portion 12, and the vibration device 206.

The housing 11A houses the imaging portion 12. For example, the housing 11A has a cylindrical or substantially cylindrical shape including an end portion provided with an opening, and is made of, for example, metal, synthetic resin, or the like. In Preferred Embodiment 7, the housing 11A has a rectangular or substantially rectangular tube shape, but may have another shape such as a cylindrical or substantially cylindrical shape, for example.

The imaging portion 12 is provided at the base plate 11a fixed in the housing 11A. Further, a circuit (not illustrated) including an imaging element is built in the imaging portion 12. The imaging element may be, for example, a CMOS, a CCD, a bolometer, a thermopile, or the like that receives light having any wavelength in a visible region to a far-infrared region.

The vibration device 206 is fixed to an end portion of the housing 11A. The vibration device 206 is exposed from the housing 11A and is disposed along an optical path of the imaging portion 12. The vibration device 206 includes the light-transmissive body 2b, a vibrator 3A, a fixing portion 13, the inner-layer lens 30, and the inner layer lens barrel 31.

The light-transmissive body 2b is a lens provided on the outermost layer. In Preferred Embodiment 7, the light-transmissive body 2b is a dome-shaped lens having a continuous curved surface. Note that various lenses can be used for the light-transmissive body 2b. The light-transmissive body 2b is, for example, a glass lens.

The vibrator 3A vibrates the light-transmissive body 2b. The vibrator 3A includes the piezoelectric element 6, the vibrating body 7, and the fixing portion 13. Since the piezoelectric element 6 and the vibrating body 7 are the same or substantially the same as those of Preferred Embodiment 1, description thereof will be omitted.

The fixing portion 13 fixes the vibrator 3A to the inner layer lens barrel 31. The fixing portion 13 is connected to the inner layer lens barrel 31 at a position including a node of vibration at at least one resonant frequency in the vibration device 206. In the present specification, the "node of vibration" means a portion that is equal to or less than about $1/100$ of the maximum amplitude of the light-transmissive body 2b.

For example, the fixing portion 13 has a cylindrical or substantially cylindrical shape, for example. To be specific, the fixing portion 13 includes a cylindrical fixing body 13a and a leaf-spring portion 13b.

The cylindrical fixing body 13a has a cylindrical or substantially cylindrical shape and is fixed to the inner layer lens barrel 31. For example, the cylindrical fixing body 13a is connected to the inner layer lens barrel 31 via a first bonding portion 14. The first bonding portion 14 will be described later. Note that the cylindrical fixing body 13a may be directly connected to the inner layer lens barrel 31.

The leaf-spring portion 13b extends from the cylindrical fixing body 13a to a side where the light-transmissive body 2b is provided, and is connected to the vibrating body 7. The leaf-spring portion 13b extends in a Z direction from an outer surface of the vibrating body 7 and is bent in a Y direction on the housing 11A side. A thickness of the leaf-spring portion 13b is smaller than a thickness (a dimension in the Z direction) of the cylindrical fixing body 13a. The leaf-spring portion 13b absorbs vibration of the vibrating body 7 and reduces or prevents transmission of the vibration to the cylindrical fixing body 13a. To be specific, when receiving the vibration from the vibrating body 7, the leaf-spring portion 13b is elastically deformed to absorb the vibration.

In Preferred Embodiment 7, the fixing portion 13 is integrally provided with the vibrating body 7. Note that the fixing portion 13 may not be integrally provided with the vibrating body 7, and may be separate from the vibrating body 7.

The inner layer lens 30 includes a plurality of lenses inside the vibration device 206. The inner layer lens 30 is inside the vibrator 3A and is disposed along the optical path of the light-transmissive body 2b and the imaging portion 12. The inner layer lens 30 is held by the inner layer lens barrel 31.

The inner layer lens barrel 31 holds the inner layer lens 30. The inner layer lens barrel 31 includes a lens holding portion 31a and a flange portion 31b. The inner layer lens barrel 31 is made of, for example, metal.

The lens holding portion 31a is a tubular member that holds the inner layer lens 30. The lens holding portion 31a has, for example, a cylindrical or substantially cylindrical shape including one end and the other end. The side on which the light-transmissive body 2b is provided is one end of the lens holding portion 31a, and the side on which the imaging portion 12 is provided is the other end of the lens holding portion 31a. Protrusions are provided at an inner wall on one end side and the other end side of the lens holding portion 31a, and the inner layer lens 30 housed inside the lens holding portion 31a is held by the protrusions.

The flange portion 31b is a plate-shaped member extending in an outer peripheral direction from the other end of the lens holding portion 31a. The flange portion 31b has, for example, an annular or substantially annular plate shape. The flange portion 31b is connected to the vibrator 3A and the housing 11A at a position including a node of vibration at at least one resonant frequency in the vibration device 206.

The flange portion 31b is connected to the cylindrical fixing body 13a of the fixing portion 13 via the first bonding portion 14 on an upper surface of the flange portion 31b. Further, the flange portion 31b is connected to an outer surface of the housing 11A via a second bonding portion 15 on a lower surface of the flange portion 31b. In addition, the first bonding portion 14 and the second bonding portion 15 overlap with each other when viewed from the Y direction. Note that the upper surface of the flange portion 31b means the surface on the side where the light-transmissive body 2b is provided, and the lower surface of the flange portion 31b means the surface on the side where the housing 11A is provided.

In Preferred Embodiment 7, the first bonding portion 14 and the second bonding portion 15 are provided at "a position including a node of vibration at at least one resonant frequency in the vibration device 206". For this reason, in the first bonding portion 14 and the second bonding portion 15, the vibration of the vibrator 3A is less likely to be transmitted in the vibration device 206.

The first bonding portion 14 and the second bonding portion 15 are made of, for example, a bonding material such as a UV-curable epoxy adhesive, a heat-curable epoxy adhesive, a two-liquid mixture curable epoxy adhesive, an acrylic adhesive, a urethane-based adhesive, glass frit or the like. The first bonding portion 14 and the second bonding portion 15 have, for example, in an annular or substantially annular shape. Note that a notch may be provided in a portion of the first bonding portion 14 and the second bonding portion 15. The notch may be used to enable an electric wiring or the like connected to the piezoelectric element 6 to pass therethrough. Alternatively, the first bonding portion and the second bonding portion 15 may be, for example, a waterproof member.

The first bonding portion 14 and the second bonding portion 15 may be portions that adjust alignment of the inner layer lens barrel 31. Specifically, the position of the inner layer lens barrel 31 may be adjusted by adjusting thicknesses (lengths in the Z direction) of the first bonding portion 14 and the second bonding portion 15. By adjusting the position of the inner layer lens barrel 31, it is possible to adjust the position of the inner layer lens 30 with respect to the light-transmissive body 2b.

The first bonding portion 14 and the second bonding portion 15 are preferably made of a bonding material having a Young's modulus of equal to or greater than about 1 GPa, for example. In Preferred Embodiment 7, the first bonding portion 14 and the second bonding portion 15 are made of, for example, a UV-curable epoxy adhesive having a Young's modulus of equal to or greater than about 1 GPa, for example. As a result, it is possible to achieve both reduction or prevention of vibration transmission from the vibrator 3A and highly accurate alignment of the light-transmissive body 2b and the inner layer lens barrel 31. For example, in a case where the first bonding portion 14 and the second bonding portion 15 are made of a member that absorbs vibration such as rubber, it is possible to reduce or prevent transmission of vibration, but it is difficult to achieve highly accurate alignment between the light-transmissive body 2b and the inner layer lens barrel 31. On the other hand, in a case where the first bonding portion 14 and the second bonding portion 15 are made of a relatively hard member, it is possible to perform highly accurate alignment adjustment, but it is difficult to achieve reduction or prevention of transmission of vibration.

Vibration Analysis

Figure 43:
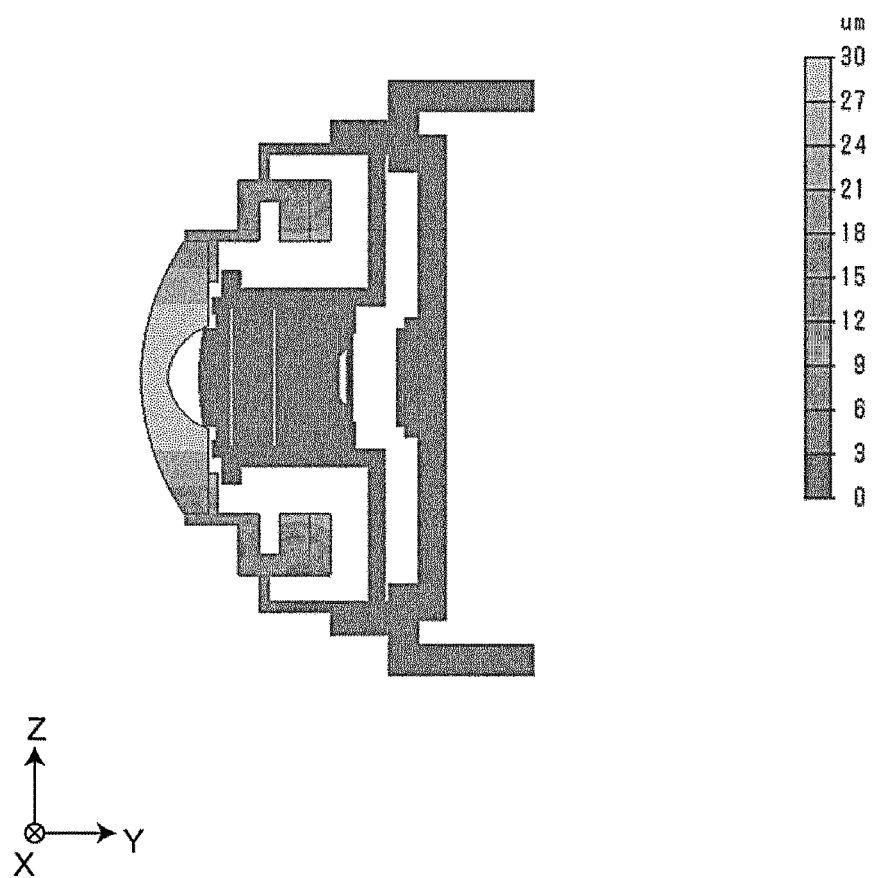
FIG. 43 is a diagram illustrating an example of a simulation result of vibration analysis of the imaging unit according to Preferred Embodiment 7 of the present invention.

FIG. 43 is a diagram illustrating an example of a simulation result of vibration analysis of the imaging unit 104 according to Preferred Embodiment 7 of the present invention. Note that in the vibration analysis, piezoelectric analysis (resonance analysis) using Femtet manufactured by Murata Software Co., Ltd. was performed. The voltage applied to the piezoelectric element 6 was about 20 V. As boundary conditions of the piezoelectric element 6, voltages at one end and the other end were set to about 20 V and about 0 V, respectively. Further, FIG. 43 shows the magnitude of the vibration amplitude by the shading of the colors of white and black, and shows that the closer the color is to white, the larger the vibration is, and the closer the color is to black, the smaller the vibration amplitude is.

As illustrated in FIG. 43, in the vibration device 206, the amplitudes of the light-transmissive body 2b, the piezoelectric element 6, and the vibrating body 7 are large, and it can be seen that the light-transmissive body 2b, the piezoelectric element 6, and the vibrating body 7 vibrate. On the other hand, the inner layer lens 30, the inner layer lens barrel 31, and the housing 11A have the amplitudes smaller than those of the light-transmissive body 2b, the piezoelectric element 6, and the vibrating body 7, and it can be seen that the inner layer lens 30, the inner layer lens barrel 31, and the housing 11A hardly vibrate.

When attention is paid to the vicinity of the fixing portion 13, it can be seen that vibration is less likely to be transmitted to the cylindrical fixing body 13a because the leaf-spring portion 13b absorbs the vibration. In addition, it can be seen that the cylindrical fixing body 13a is connected to the inner layer lens barrel 31 via the first bonding portion 14 and the inner layer lens barrel 31 is connected to the housing 11A via the second bonding portion 15 at a position where a node of vibration at the resonant frequency is included in the vibration device 206.

Advantageous Effects

According to the vibration device and the imaging unit of Preferred Embodiment 7, the following advantageous effects can be achieved.

The vibration device 206 according to Preferred Embodiment 7 includes the light-transmissive body 2b, the vibrator 3A, the inner layer lens 30, and the inner layer lens barrel 31. The light-transmissive body 2b includes a lens on the outermost layer. The vibrator 3A vibrates the light-transmissive body 2b. The vibrator 3A includes the piezoelectric element 6, the vibrating body 7, and the fixing portion 13.

The piezoelectric element 6 vibrates when a voltage is applied thereto. The vibrating body 7 is provided on the piezoelectric element 6, amplifies vibration of the piezoelectric element 6, and transmits the vibration to the light-transmissive body 2b. The fixing portion 13 is connected to the vibrating body 7 and is connected to the inner layer lens barrel 31. The inner layer lens 30 is provided on the optical path of the light-transmissive body 2b and is held by the inner layer lens barrel 31. The inner layer lens barrel 31 holds the inner layer lens 30 and is connected to the fixing portion 13. The fixing portion 13 and the inner layer lens barrel 31 are connected at a position including a node of vibration at at least one resonant frequency in the vibration device 206.

With such a configuration, it is possible to reduce or prevent vibration of the inner layer lens 30 while vibrating the light-transmissive body 2b. That is, in the case of removing liquid droplets adhering to the light-transmissive body 2b which is a lens on the outermost layer, it is possible to vibrate the light-transmissive body 2b while reducing or preventing the vibration of the inner layer lens 30.

The fixing portion 13 and the inner layer lens barrel 31 are connected via the first bonding portion 14. With such a configuration, the position of the inner layer lens 30 with respect to the light-transmissive body 2b can be adjusted by adjusting the thickness of the first bonding portion 14 between the fixing portion 13 and the inner layer lens barrel 31. As a result, the alignment accuracy between the light-transmissive body 2b and the inner layer lens 30 can be improved.

The first bonding portion 14 is a bonding material having a Young's modulus of, for example, equal to or greater than about 1 GPa. With such a configuration, it is possible to achieve both improvement in alignment accuracy between the light-transmissive body 2b and the inner layer lens 30 and reduction or prevention of vibration.

The fixing portion 13 includes the cylindrical fixing body 13a and the leaf-spring portion 13b. The cylindrical fixing body 13a is connected to the inner layer lens barrel 31. The leaf-spring portion 13b extends from the cylindrical fixing body 13a to the side where the light-transmissive body 2b is provided, and is connected to the vibrating body 7. The thickness of the leaf-spring portion 13b is smaller than the thickness (a length in the Z direction) of the cylindrical fixing body 13a. With such a configuration, the leaf-spring portion 13b absorbs vibration of the vibrating body 7, and transmission of the vibration of the vibrating body 7 to the cylindrical fixing body 13a can be reduced or prevented. Further, a node of vibration is easily generated in the vicinity of the cylindrical fixing body 13a.

The imaging unit 104 includes the housing 11A, the imaging portion 12, and the vibration device 206. The housing 11A has a cylindrical or substantially cylindrical shape with an end portion, and houses the imaging portion 12 therein. The vibration device 206 is connected to the end portion of the housing 11A. The vibration device 206 and the housing 11A are connected at a position including a node of vibration at at least one resonant frequency in the vibration device 206. With such a configuration, similarly to the advantageous effects of the vibration device 206 described above, it is possible to reduce or prevent vibration of the inner layer lens 30 while vibrating the light-transmissive body 2b.

The fixing portion 13 of the vibration device 206 and the housing 11A are connected via the second bonding portion 15. With such a configuration, the position of the imaging portion 12 with respect to the inner layer lens 30 can be adjusted by adjusting the thickness of the second bonding portion 15 between the fixing portion 13 and the housing 11A. As a result, the alignment accuracy between the inner layer lens 30 and the imaging portion 12 can be improved.

The first bonding portion 14 and/or the second bonding portion 15 are/is made of a waterproof member, for example. With such a configuration, it is possible to ensure waterproofing.

The fixing portion 13 and the inner layer lens barrel 31 are made of metal. With such a configuration, excitation efficiency can be improved.

The light-transmissive body 2b is, for example, a glass lens. With such a configuration, the excitation efficiency can be improved.

Although an example in which the first bonding portion 14 includes a node of vibration at at least one resonant frequency in the vibration device 206 has been described in Preferred Embodiment 7, the present invention is not limited thereto. For example, the first bonding portion 14 may include nodes of vibration at a plurality of resonant frequencies in the vibration device 206.

Although an example in which the second bonding portion 15 includes a node of vibration at at least one resonant frequency in the vibration device 206 has been described in Preferred Embodiment 7, the present invention is not limited thereto. For example, the second bonding portion 15 may include nodes of vibration at a plurality of resonant frequencies in the vibration device 206.

Although an example in which the first bonding portion 14 is a bonding material has been described in Preferred Embodiment 7, the present invention is not limited thereto. The first bonding portion 14 may have a structure in which the fixing portion 13 and the inner layer lens barrel 31 can be directly connected. For example, the first bonding portion 14 may be a configuration in which the fixing portion 13 and the inner layer lens barrel 31 are connected by a mechanism, such as a screw, for example. In this case, a female screw may be provided on an inner side of the cylindrical fixing body 13a of the fixing portion 13, and a male screw may be provided on the outer periphery of the inner layer lens barrel 31. With such a configuration, connection between the fixing portion 13 and the inner layer lens barrel 31 is facilitated, and alignment adjustment between the inner layer lens 30 and the light-transmissive body 2b is also facilitated.

Although an example in which the second bonding portion 15 is a bonding material has been described in Preferred Embodiment 7, the present invention is not limited thereto. The second bonding portion 15 may have a structure in which the inner layer lens barrel 31 and the housing 11A can be directly connected. For example, the second bonding portion 15 may have a structure in which the inner layer lens barrel 31 and the housing 11A are connected by a mechanism such as a screw. In this case, a female screw may be provided on an inner side of the housing 11A having a cylindrical or substantially cylindrical shape, and a male screw may be provided on the outer periphery of the inner layer lens barrel 31. With such a configuration, connection between the inner layer lens barrel 31 and the housing 11A is facilitated, and alignment adjustment between the inner layer lens 30 and the imaging portion 12 is also facilitated.

In Preferred Embodiment 7, an example in which the vibrator 3A and the inner layer lens barrel 31 are separate bodies has been described, but the present invention is not limited thereto. The vibrator 3A and the inner layer lens barrel 31 may be integrally provided. In this way, accuracy can be improved by integral molding.

Although an example in which the light-transmissive body 2b is a dome-shaped or substantially dome-shaped lens having a continuous curved surface has been described in Preferred Embodiment 7, the present invention is not limited thereto. The light-transmissive body 2b may be, for example, a lens having a curved surface in at least a portion thereof. Alternatively, the light-transmissive body 2b may be a lens having a flat surface.

Figure 44:
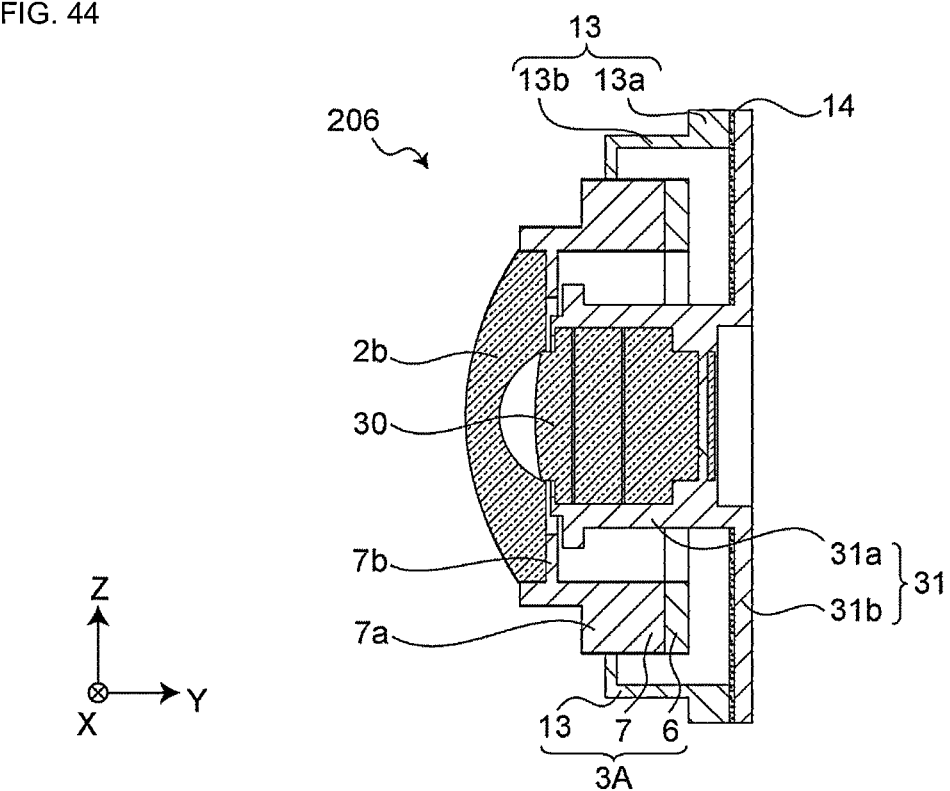
FIG. 44 is a schematic cross-sectional view of an example of a vibration device according to Preferred Embodiment 7 of the present invention.

Although an example of the imaging unit 104 to which the vibration device 206 is connected has been described in Preferred Embodiment 7, the present invention is not limited thereto. FIG. 44 is a schematic cross-sectional view of an example of the vibration device 206. As illustrated in FIG. 44, the vibration device 206 may be a single body. For example, the vibration device 206 may be manufactured and sold as a single unit. Further, the vibration device 206 may be used for a device other than the imaging unit 104.

Figure 45:
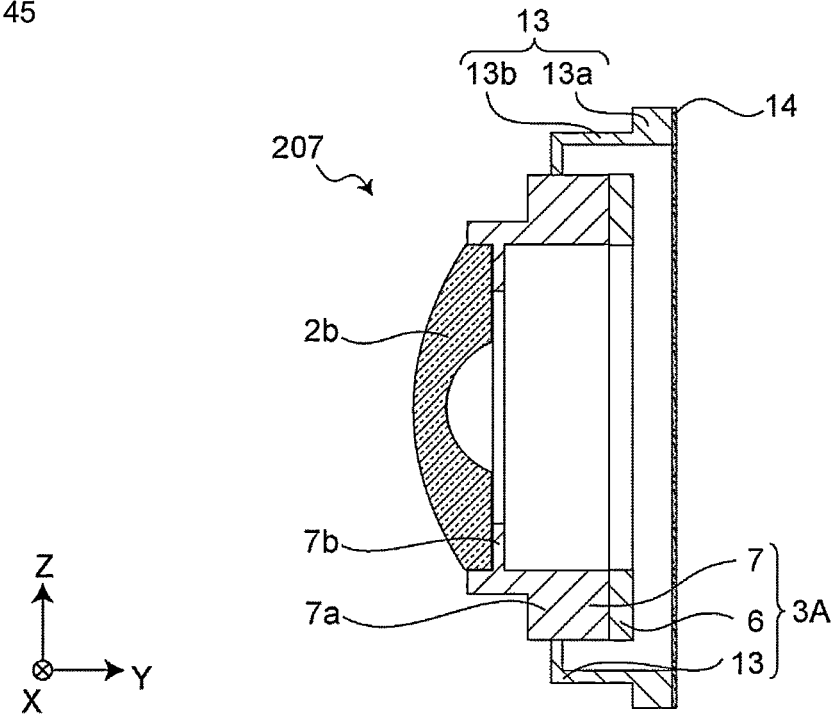
FIG. 45 is a schematic cross-sectional view of another example of a vibration device according to Preferred Embodiment 7 of the present invention.

Although an example in which the vibration device 206 includes the inner layer lens 30 and the inner layer lens barrel has been described in Preferred Embodiment 7, the present invention is not limited thereto. In the vibration device 206, the inner layer lens 30 and the inner layer lens barrel 31 may not be necessary elements. FIG. 45 is a schematic cross-sectional view of another example of the vibration device. As illustrated in FIG. 45, a vibration device 207 may not include the inner layer lens 30 and the inner layer lens barrel 31.

Although an example in which the fixing portion 13 is connected to the flange portion 31b of the inner layer lens barrel has been described in Preferred Embodiment 7, the present invention is not limited thereto. For example, the fixing portion 13 may be connected to the lens holding portion 31a of the inner layer lens barrel 31.

Modification

Figure 46:
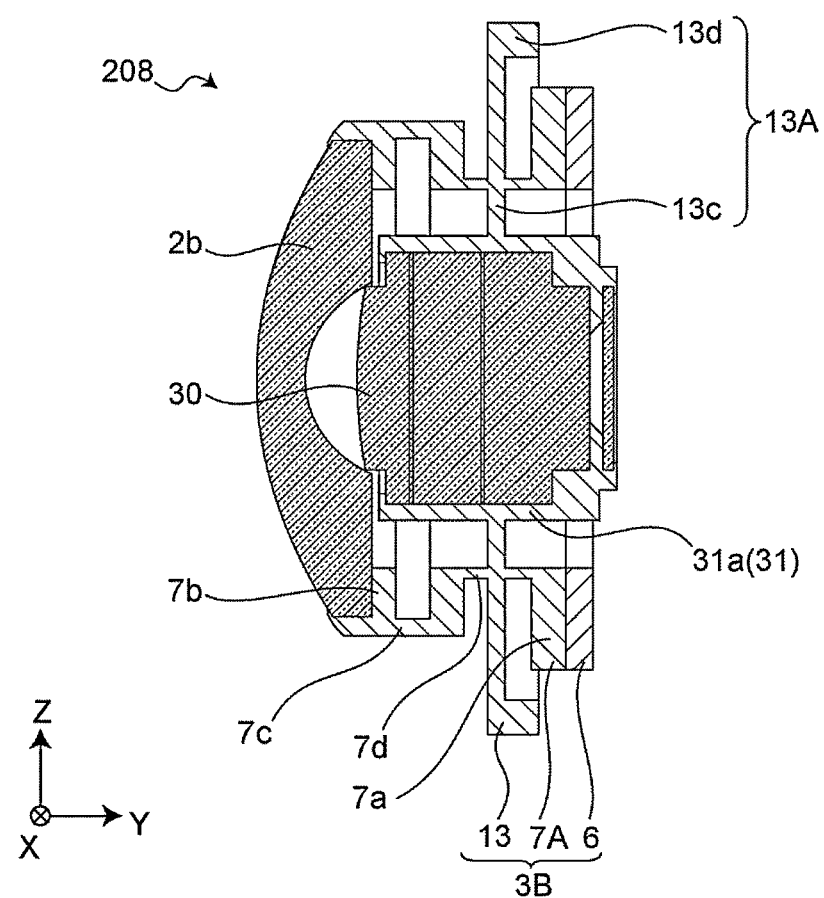
FIG. 46 is a schematic cross-sectional view of a vibration device according to a modification of Preferred Embodiment 7 of the present invention.

FIG. 46 is a schematic cross-sectional view of a vibration device 208 according to a modification of Preferred Embodiment 7 of the present invention. As illustrated in FIG. 46, the vibration device 208 is different from the vibration device 206 of Preferred Embodiment 7 in that a fixing portion 13A is connected to the lens holding portion 31a of the inner layer lens barrel 31. Further, the vibration device 208 is different from the vibration device 206 of Preferred Embodiment 7 in that the inner layer lens barrel 31 does not include the flange portion 31b.

In the vibration device 208, a connecting portion 7d connected to the fixing portion 13A is provided in a vibrating body 7A of a vibrator 3B. The connecting portion 7d is provided between a cylindrical body 7a and an annular or substantially annular plate-shaped portion 7b. The connecting portion 7d has a cylindrical or substantially cylindrical shape. A thickness of the connecting portion 7d is smaller than a thickness (a length in the Z direction) of the cylindrical body 7a. In the vibration device 208, a node of vibration at the resonant frequency is formed near the connecting portion 7d.

The fixing portion 13A includes a first fixing body 13c and a second fixing body 13d.

The first fixing body 13c extends from an inner side of the connecting portion 7d of the vibrator 3B toward the lens holding portion 31a of the inner layer lens barrel 31, and is connected to the inner layer lens barrel 31. The first fixing body 13c has an annular or substantially annular plate shape. The first fixing body 13c is integrally provided with the vibrator 3B and the inner layer lens barrel 31.

In the vibration device 208, the first fixing body 13c and the inner layer lens barrel 31 are connected in the vicinity of the connecting portion 7d where a node of vibration at the resonant frequency is generated.

The second fixing body 13d extends to the outside of the connecting portion 7d of the vibrator 3B and bends toward the housing 11A side. The second fixing body 13d has a tubular or substantially tubular shape and is connected to the housing 11A. The second fixing body 13d is integrally provided with the vibrator 3B. In addition, the second fixing body 13d is connected to the housing 11A via the second bonding portion 15.

The vibration device 208 includes nodes of vibration at a plurality of resonant frequencies. To be specific, in the vibration device 208, nodes of vibration are at a position near the connecting portion 7d between the light-transmissive body 2b and the piezoelectric element 6 and a position where the fixing portion 13A and the housing 11A are connected.

In the vibration device 208, the first fixing body 13c is connected to the inner layer lens barrel 31 at a position of the node of vibration at the resonant frequency in the vibration device 208. Accordingly, it is possible to reduce or prevent the vibration of the vibrator 3B to be transmitted to the inner layer lens barrel 31. In addition, in the vibration device 208, the second fixing body 13d is connected to the housing 11A at a position of the node of vibration at the resonant frequency in the vibration device 208. Accordingly, it is possible to reduce or prevent the vibration of the vibrator 3B to be transmitted to the housing 11A.

Figure 47:
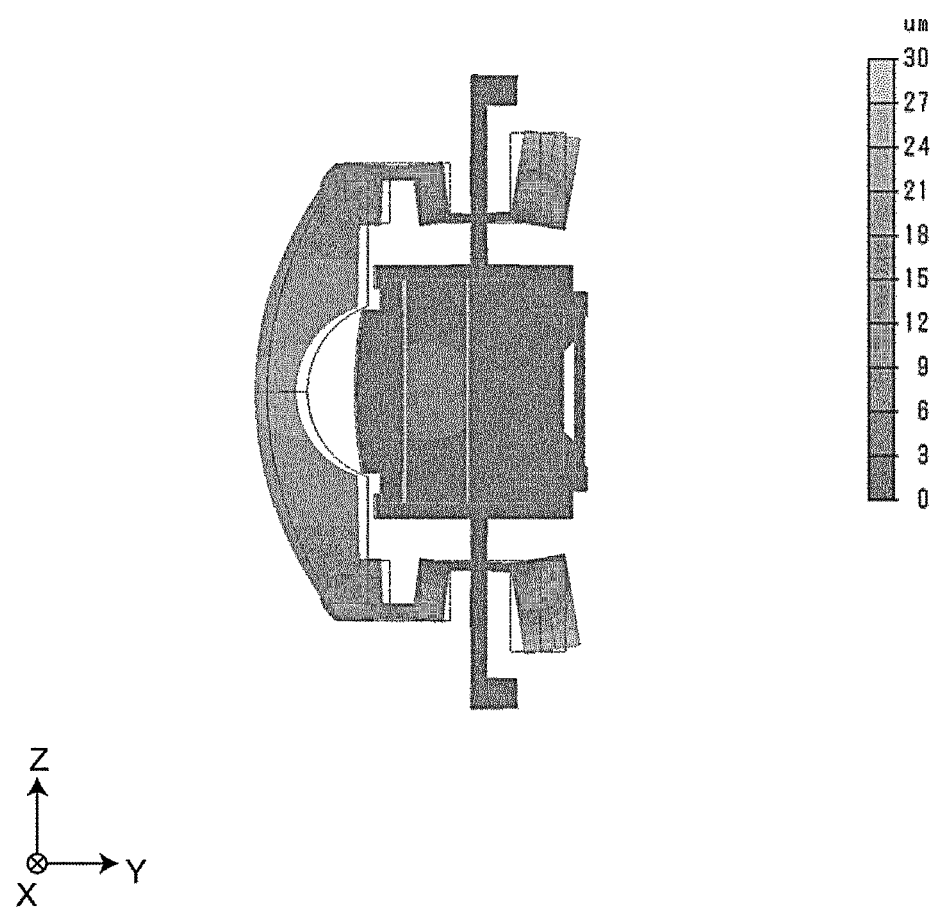
FIG. 47 is a diagram illustrating an example of a simulation result of vibration analysis of the vibration device of FIG. 46.

FIG. 47 is a diagram illustrating an example of a simulation result of vibration analysis of the vibration device 208 of FIG. 46. Note that in the vibration analysis, piezoelectric analysis (resonance analysis) using Femtet manufactured by Murata Software Co., Ltd. was performed. The voltage applied to the piezoelectric element 6 was about 20 V. As boundary conditions of the piezoelectric element 6, voltages at one end and the other end were set to about 20 V and about 0 V, respectively. Further, FIG. 47 shows the magnitude of the vibration amplitude by the shading of the colors of white and black, and shows that the closer the color is to white, the larger the vibration is, and the closer the color is to black, the smaller the vibration amplitude is.

As illustrated in FIG. 47, in the vibration device 208, the amplitudes of the light-transmissive body 2b, the piezoelectric element 6, and the vibrating body 7A (excluding the connecting portion 7d) are large, and it can be seen that the light-transmissive body 2b, the piezoelectric element 6, and the vibrating body 7A vibrate. On the other hand, the connecting portion 7d, the inner layer lens 30, and the inner layer lens barrel 31 have amplitudes smaller than those of the light-transmissive body 2b, the piezoelectric element 6, and the vibrating body 7A (excluding the connecting portion 7d), and it can be seen that the connecting portion 7d, the inner layer lens 30, and the inner layer lens barrel 31 hardly vibrate.

In addition, it can be seen that the first fixing body 13c and the inner layer lens barrel 31 are connected at the position where the node of vibration of the resonant frequency is in the vibration device 208.

Note that an example in which the first fixing body 13c and the inner layer lens barrel 31 are integrally provided in the vibration device 208 has been described, but the present invention is not limited thereto. The first fixing body 13c and the inner layer lens barrel 31 may be connected via the first bonding portion 14. For example, the first bonding portion 14 may have a configuration in which the first fixing body 13c and the inner layer lens barrel 31 are connected by a mechanism such as a screw, for example. In this case, a female screw may be provided at an end portion of the first fixing body 13c, and a male screw may be provided on the outer periphery of the lens holding portion 31a of the inner layer lens barrel 31. With such a configuration, positional adjustment for moving the inner layer lens barrel 31 in the Y direction with respect to the first fixing body 13c becomes possible, and thus the position of the inner layer lens 30 with respect to the light-transmissive body 2b can be easily adjusted. As a result, the alignment accuracy between the light-transmissive body 2b and the inner layer lens 30 can be improved.

While the present invention has been described with reference to preferred embodiments thereof and the accompanying drawings, various changes and modifications will become apparent to those skilled in the art. Such variations and modifications are to be understood as being included within the scope of the present invention as defined by the appended claims unless they depart therefrom.

The vibration devices and the vibration control methods of preferred embodiments of the present invention can be applied to an in-vehicle camera, a monitoring camera, or an optical sensor such as a LiDAR used outdoors, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device comprising:
   a light-transmissive body; and
   a vibrator to vibrate the light-transmissive body at a vibration acceleration of equal to or more than about $1.5 \times 10^5$ m/s$^2$ and equal to or less than about $8.0 \times 10^5$ m/s$^2$.

2. The vibration device according to claim 1, wherein the vibrator vibrates the light-transmissive body at a vibration acceleration of equal to or more than about $3.5 \times 10^5$ m/s$^2$ and equal to or less than about $5.5 \times 10^5$ m/s$^2$.

3. The vibration device according to claim 1, further comprising a controller to control the vibration acceleration of the vibrator.

4. The vibration device according to claim 3, wherein the vibrator includes a piezoelectric element; and
   the controller controls a value of a voltage applied to the piezoelectric element to be equal to or more than about 2 Vp-p and equal to or less than about 15 Vp-p.

5. The vibration device according to claim 4, wherein
   the vibrator includes a vibrating body between the piezoelectric element and the light-transmissive body;
   the piezoelectric element has an annular or substantially annular plate shape;
   the vibrating body has a cylindrical or substantially cylindrical shape; and
   the light-transmissive body has a circular or substantially circular plate shape or a dome or substantially dome shape.

6. The vibration device according to claim 3, wherein the controller includes:
   a first vibration mode in which the light-transmissive body is vibrated at a vibration acceleration of equal to or more than about $8.1 \times 10^5$ m/s$^2$ and equal to or less than about $1.7 \times 10^6$ m/s$^2$; and
   a second vibration mode in which the light-transmissive body is vibrated at a vibration acceleration of equal to or more than about $1.5 \times 10^5$ m/s$^2$ and equal to or less than about $8.0 \times 10^5$ m/s$^2$; and
   the controller controls the vibrator to execute the second vibration mode after executing the first vibration mode.

7. The vibration device according to claim 6, wherein
   the vibrator includes a piezoelectric element; and
   the controller:
   controls a value of a voltage applied to the piezoelectric element to be equal to or more than about 16 Vp-p and equal to or less than about 60 Vp-p in the first vibration mode; and
   controls a value of a voltage applied to the piezoelectric element to be equal to or more than about 2 Vp-p and equal to or less than about 15 Vp-p in the second vibration mode.

8. The vibration device according to claim 3, further comprising:
   a displacement detection sensor to detect information related to a displacement amount of the light-transmissive body and to transmit the information to the controller; wherein
   the controller controls the vibration acceleration of the vibrator based on the information.

9. The vibration device according to claim 1, further comprising a blower to spray gas onto a surface of the light-transmissive body.

10. The vibration device according to claim 1, further comprising a discharger to discharge liquid onto a surface of the light-transmissive body.

11. The vibration device according to claim 1, wherein a water-repellent coating layer is on a surface of the light-transmissive body.

12. A vibration control method for a vibration device including a light-transmissive body and a vibrator to vibrate the light-transmissive body, the vibration control method comprising vibrating, by the vibrator, the light-transmissive body at a vibration acceleration of equal to or more than about $1.5 \times 10^5$ m/s$^2$ and equal to or less than about $8.0 \times 10^5$ m/s$^2$.

13. The vibration control method according to claim 12, wherein the vibrating includes vibrating the light-transmissive body at a vibration acceleration of equal to or more than about $3.5 \times 10^5$ m/s$^2$ and equal to or less than about $5.5 \times 10^5$ m/s$^2$.

14. The vibration control method according to claim 12, wherein
   the vibrator includes a piezoelectric element; and
   the vibrating includes controlling, by a controller, a value of a voltage applied to the piezoelectric element to be equal to or more than about 2 Vp-p and equal to or less than about 15 Vp-p.

15. The vibration control method according to claim 12, wherein
   the vibrator includes a piezoelectric element;
   the vibrating includes:
   vibrating the light-transmissive body in a first vibration mode at a vibration acceleration of equal to or more than about $8.1 \times 10^5$ m/s$^2$ and equal to or less than about $1.7 \times 10^6$ m/s$^2$; and
   vibrating the light-transmissive body in a second vibration mode at a vibration acceleration of equal to or more than about $1.5 \times 10^5$ m/s$^2$ and equal to or less than about $8.0 \times 10^5$ m/s$^2$; and
   the vibrating of the light-transmissive body in the second vibration mode is performed after vibrating of the light-transmissive body in the first vibration mode is performed.

16. The vibration control method according to claim 15, wherein the vibrating of the light-transmissive body in the first vibration mode includes controlling, by a controller, a value of a voltage applied to the piezoelectric element to be equal to or more than about 16 Vp-p and equal to or less than about 60 Vp-p; and the vibrating of the light-transmissive body in the second vibration mode includes controlling, by the controller, a value of a voltage applied to the piezoelectric element to be equal to or more than about 2 Vp-p and equal to or less than about 15 Vp-p.

17. The vibration control method according to claim 12, further comprising:

detecting information related to a displacement amount of the light-transmissive body; wherein the vibrating includes controlling, by a controller, the vibration acceleration of the vibrator based on the information.

18. The vibration control method according to claim 12, further comprising spraying gas onto a surface of the light-transmissive body.

19. The vibration control method according to claim 12, further comprising discharging liquid onto a surface of the light-transmissive body.

* * * * *